US012717755B2

(12) United States Patent
Kashi Visvanathan et al.

(10) Patent No.: US 12,717,755 B2
(45) Date of Patent: Aug. 25, 2026

(54) DYNAMICALLY ENABLING/DISABLING CHANGE TRACKING ON RUNNING REPLICATION FOR A MULTI-CLIENT FILE SYSTEM

(71) Applicant: Oracle International Corporation, Redwood Shores, CA (US)

(72) Inventors: Satish Kumar Kashi Visvanathan, San Jose, CA (US); Viggnesh Venugopal, Santa Clara, CA (US); Michael Robert Frasca, Buffalo, NY (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 18/969,190

(22) Filed: Dec. 4, 2024

(65) Prior Publication Data

US 2026/0037482 A1 Feb. 5, 2026

Related U.S. Application Data

(60) Provisional application No. 63/679,005, filed on Aug. 2, 2024.

(51) Int. Cl.
*G06F 16/11* (2019.01)
*G06F 16/174* (2019.01)
*G06F 16/182* (2019.01)

(52) U.S. Cl.
CPC ........ *G06F 16/128* (2019.01); *G06F 16/1756* (2019.01); *G06F 16/1844* (2019.01)

(58) Field of Classification Search
CPC ........................... G06F 16/128; G06F 16/1844
See application file for complete search history.

(56) References Cited

U.S. PATENT DOCUMENTS 5,806,075 A 9/1998 Jain et al.
6,615,333 B1 9/2003 Hoogerbrugge et al.
(Continued)

FOREIGN PATENT DOCUMENTS

CA 2954888 A1 1/2007
CN 104520869 A 4/2015
(Continued)

OTHER PUBLICATIONS

"About Consistency Group Snapshot Restore", Working with Consistency Groups, Available Online at: https://sort.veritas.com/public/documents/HSO/2.0/linux/productguides/html/hfo_admin_ubuntu/ch07s10.htm, Accessed from Internet on Aug. 11, 2022, 2 pages.
(Continued)

*Primary Examiner* — Tarek Chbouki

(74) *Attorney, Agent, or Firm* — Kilpatrick Townsend & Stockton LLP

(57) ABSTRACT

A change tracking and delta generation (CTDG) system servicing multiple clients is disclosed for enabling the delta generation during replication to be proportional to the number of changes between two snapshots instead of the size of the snapshots. In some embodiments, CTDG can track changes to a file system, where change-tracking can be dynamically switched between two sub-CT modes, file level or directory level. Change-tracking (CT) keys may be generated accordingly and stored in a data structure to be used for delta generation during replications for clients. In some embodiments, change-tracking may be enabled or disabled
(Continued)

for different clients. CTDG can coordinate the CT enablement/disablement to ensure replications can use the information in CT keys properly.

20 Claims, 28 Drawing Sheets

(56) References Cited

U.S. PATENT DOCUMENTS 7,278,049 B2 10/2007 Bartfai et al.
7,308,545 B1 12/2007 Kekre et al.
7,546,431 B2 6/2009 Stacey et al.
8,271,992 B2 9/2012 Chatley et al.
8,326,803 B1 12/2012 Stringham
8,332,375 B2 12/2012 Chatley et al.
8,336,056 B1 12/2012 Gadir
8,464,101 B1 6/2013 Natanzon et al.
8,522,252 B2 8/2013 Chatley et al.
8,548,949 B2 10/2013 Jennas, II et al.
8,700,855 B2 4/2014 Revanuru
8,832,027 B1 9/2014 Bushman
8,856,079 B1 10/2014 Subramanian et al.
9,047,307 B1 6/2015 Ghemawat et al.
9,189,495 B1 11/2015 Hughes et al.
9,489,434 B1 11/2016 Rath
9,535,746 B2 1/2017 Gupta et al.
9,760,358 B2 9/2017 Sapaliga et al.
9,916,203 B1 3/2018 Pogde et al.
9,928,246 B1 3/2018 Xu et al.
9,952,767 B2 4/2018 Zheng et al.
10,089,230 B1 10/2018 Koker et al.
10,459,632 B1 10/2019 Chen et al.
10,503,753 B2 12/2019 Mitkar et al.
10,514,986 B2 12/2019 Bangalore et al.
10,572,452 B1 2/2020 Singh et al.
10,664,358 B1 5/2020 Chen et al.
10,698,941 B2 6/2020 Maybee et al.
10,721,141 B1 7/2020 Verma et al.
10,756,888 B2 8/2020 Han
10,761,941 B1 * 9/2020 Redko ................. G06F 11/1451
10,908,828 B1 2/2021 Meiri et al.
10,922,132 B1 2/2021 Shiramshetti et al.
10,970,257 B2 4/2021 Bono et al.
11,005,935 B1 5/2021 Littlefield et al.
11,036,677 B1 6/2021 Grunwald et al.
11,080,041 B1 8/2021 Ah Kun et al.
11,086,545 B1 8/2021 Dayal et al.
11,119,862 B2 9/2021 Dewey et al.
11,151,092 B2 10/2021 Chmiel et al.
11,372,725 B2 6/2022 Bajaj
11,513,997 B2 11/2022 Keller et al.
11,575,727 B1 2/2023 Woodruff et al.
11,714,782 B2 8/2023 Subramanian et al.
11,809,735 B1 11/2023 Kumar et al.
11,836,110 B2 12/2023 Matsushita et al.
11,860,673 B1 1/2024 Kodakandla et al.
12,001,404 B2 6/2024 Kashi Visvanathan et al.
12,147,394 B2 11/2024 Kashi Visvanathan et al.
12,182,078 B2 12/2024 Kashi Visvanathan et al.
12,197,790 B2 1/2025 Nelson
12,271,625 B1 4/2025 Astolfi
12,341,887 B2 6/2025 Bisht et al.
12,368,588 B2 7/2025 Bisht et al.
12,455,861 B2 10/2025 Kashi Visvanathan et al.
12,487,972 B2 12/2025 Visvanathan et al.
12,530,262 B2 1/2026 Kashi Visvanathan et al.
12,572,513 B2 3/2026 Kashi Visvanathan et al.
12,579,109 B2 3/2026 Kashi Visvanathan et al.
12,608,401 B2 4/2026 Kashi Visvanathan et al.
2002/0112123 A1 8/2002 Becker et al.
2002/0129214 A1 9/2002 Sarkar
2003/0182313 A1 9/2003 Federwisch et al.
2004/0267836 A1 12/2004 Armangau et al.
2005/0165862 A1 7/2005 Loafman et al.
2006/0193474 A1 8/2006 Fransdonk
2006/0271598 A1 11/2006 Wong et al.
2008/0049254 A1 2/2008 Phan et al.
2008/0109496 A1 5/2008 Holenstein et al.
2008/0168218 A1 7/2008 Arakawa et al.
2008/0172542 A1 7/2008 Kaushik
2008/0250234 A1 10/2008 Webber
2008/0256399 A1 10/2008 Erdosi et al.
2009/0138480 A1 5/2009 Chatley et al.
2009/0138481 A1 5/2009 Chatley et al.
2009/0144224 A1 6/2009 Phan et al.
2009/0144284 A1 6/2009 Chatley et al.
2009/0144422 A1 6/2009 Chatley et al.
2009/0307277 A1 12/2009 Grubov et al.
2011/0213765 A1 9/2011 Cui et al.
2011/0231172 A1 9/2011 Gold
2012/0131595 A1 5/2012 Kim et al.
2012/0173830 A1 7/2012 Gundy et al.
2012/0180056 A1 7/2012 Sander et al.
2012/0317079 A1 12/2012 Shoens et al.
2012/0323844 A1 12/2012 Chatley et al.
2013/0005491 A1 1/2013 Cox et al.
2013/0061229 A1 3/2013 Hamada et al.
2013/0110778 A1 5/2013 Taylor et al.
2013/0339407 A1 12/2013 Sharpe et al.
2014/0052692 A1 2/2014 Zhang et al.
2014/0236899 A1 8/2014 Eggers et al.
2015/0066857 A1 3/2015 Dayal et al.
2015/0074536 A1 3/2015 Varadharajan et al.
2015/0120893 A1 4/2015 Sapaliga et al.
2015/0378636 A1 12/2015 Yadav et al.
2016/0188380 A1 6/2016 Eastep et al.
2016/0224259 A1 * 8/2016 Ahrens ................... G06F 3/067
2016/0335278 A1 11/2016 Tabaaloute et al.
2016/0359963 A1 12/2016 Chatley et al.
2016/0359976 A1 12/2016 Chatley et al.
2017/0046093 A1 2/2017 Butt
2017/0212680 A1 7/2017 Waghulde
2018/0101311 A1 4/2018 Koszewnik
2018/0150646 A1 5/2018 Roth et al.
2019/0171497 A1 6/2019 Agarwal et al.
2019/0235917 A1 8/2019 Koneru et al.
2019/0370239 A1 12/2019 Gupta et al.
2019/0384743 A1 12/2019 Lv et al.
2020/0065196 A1 2/2020 Desai et al.
2020/0210223 A1 7/2020 Saka et al.
2020/0210482 A1 7/2020 Becker et al.
2020/0250684 A1 8/2020 Puehse et al.
2020/0257700 A1 8/2020 Xu et al.
2020/0301882 A1 9/2020 Pogde et al.
2020/0310919 A1 10/2020 Bajaj
2020/0333970 A1 10/2020 Mukku et al.
2020/0334111 A1 10/2020 Potnis et al.
2020/0409974 A1 12/2020 Ayzenberg et al.
2021/0004353 A1 1/2021 Jain et al.
2021/0034569 A1 * 2/2021 Xu ...................... G06F 11/2048
2021/0124611 A1 4/2021 Saillet et al.
2021/0157504 A1 5/2021 Hinman
2021/0173588 A1 6/2021 Kannan et al.
2021/0173945 A1 6/2021 Karr et al.
2021/0200771 A1 7/2021 Kuang et al.
2021/0216625 A1 7/2021 Miller et al.
2021/0226861 A1 7/2021 Barsalou et al.
2021/0294775 A1 9/2021 Keller et al.
2021/0342299 A1 11/2021 Kumarasamy et al.
2021/0389883 A1 12/2021 Derryberry et al.
2021/0390078 A1 12/2021 Aahlad et al.
2021/0390113 A1 12/2021 Danilov et al.
2022/0027241 A1 * 1/2022 Shrivastava ........ G06F 11/1469
2022/0058094 A1 2/2022 Gunturu et al.
2022/0060323 A1 2/2022 Payne et al.
2022/0121365 A1 4/2022 Wang et al.
2022/0147490 A1 5/2022 Shivani et al.
2022/0182297 A1 6/2022 Verma et al.
2022/0188267 A1 6/2022 Patil et al.
2022/0198322 A1 6/2022 Kuperman et al.
2022/0222358 A1 7/2022 Sahita et al.
2022/0229734 A1 7/2022 Seela et al.
2022/0263657 A1 8/2022 Chang et al.
2022/0308965 A1 9/2022 Gunda et al.

(56) References Cited

U.S. PATENT DOCUMENTS

| | | | |
|---|---|---|---|
| 2023/0020330 | A1 | 1/2023 | Schwerin et al. |
| 2023/0029677 | A1 | 2/2023 | Gupta et al. |
| 2023/0080691 | A1 * | 3/2023 | Gupta .................. G06F 3/0619 711/162 |
| 2023/0134314 | A1 | 5/2023 | Braganza et al. |
| 2023/0177069 | A1 | 6/2023 | Xiang et al. |
| 2023/0222096 | A1 | 7/2023 | Fan et al. |
| 2023/0297411 | A1 | 9/2023 | Tsirkin |
| 2023/0333777 | A1 | 10/2023 | Shveidel et al. |
| 2023/0385153 | A1 | 11/2023 | George et al. |
| 2023/0409442 | A1 | 12/2023 | Kashi Visvanathan et al. |
| 2023/0409522 | A1 | 12/2023 | Kashi Visvanathan et al. |
| 2023/0409535 | A1 | 12/2023 | Kashi Visvanathan et al. |
| 2023/0409559 | A1 | 12/2023 | Kashi Visvanathan et al. |
| 2023/0409597 | A1 | 12/2023 | Kashi Visvanathan et al. |
| 2023/0412375 | A1 | 12/2023 | Bisht et al. |
| 2024/0028466 | A1 | 1/2024 | Duggal et al. |
| 2024/0094937 | A1 | 3/2024 | Kashi Visvanathan et al. |
| 2024/0104062 | A1 | 3/2024 | Kashi Visvanathan et al. |
| 2024/0134828 | A1 | 4/2024 | Kashi Visvanathan et al. |
| 2024/0176520 | A1 | 5/2024 | Tatsumi et al. |
| 2024/0281413 | A1 | 8/2024 | Kashi Visvanathan et al. |
| 2026/0037482 | A1 | 2/2026 | Kashi Visvanathan et al. |

FOREIGN PATENT DOCUMENTS

| | | | |
|---|---|---|---|
| CN | 104641365 | A | 5/2015 |
| CN | 105245328 | A | 1/2016 |
| CN | 117215721 | A | 12/2023 |
| JP | 2017531256 | A | 10/2017 |
| WO | 2015110171 | A1 | 7/2015 |
| WO | 2023244601 | A1 | 12/2023 |

OTHER PUBLICATIONS

"About HyperScale Consistency Groups", Working with Consistency Groups, Available Online at: https://sort.veritas.com/public/documents/HSO/2.0/linux/productguides/html/hfo_admin_ubuntu/ch07s02.htm, Accessed from Internet on Aug. 11, 2022, 1 page.
"Amazon EFS Replication", Amazon Elastic File System, Available Online at: https://docs.aws.amazon.com/efs/latest/ug/efs-replication.html, Oct. 3, 2022, 18 pages.
"Announcing Amazon Elastic File System Replication", Available Online at: https://aws.amazon.com/about-aws/whats-new/2022/01/amazon-elastic-file-system-replication/, Jan. 25, 2022, 3 pages.
"AWS KMS Concepts", Amazon Web Services Key Management Service, Available Online at: https://docs.aws.amazon.com/kms/latest/developerguide/concepts.html, Oct. 3, 2022, 36 pages.
"Caringo Swarm Hybrid Cloud for Azure", Caringo Swarm, Available Online at: https://azure.github.io/Storage/docs/storage-partners/partners/MultiProtocol/Caringo-Azure.pdf, 2017, 1 page.
"Caringo's Swarm Hybrid Cloud Object Storage Platform Now Integrated with Reach Engine by Levels Beyond and Microsoft Azure", Available Online at: https://www.broadcastbeat.com/caringos-swarm-hybrid-cloud-object-storage-platform-now-integrated-with-reach-engine-by-levels-beyond-and-microsoft-azure/, Oct. 3, 2022, 10 pages.
"CephFS Mirroring", Ceph Internals, Available online at: https://docs.ceph.com/en/reef/dev/cephfs-mirroring/, 9 pages.
"Create Amazon EBS Snapshots", Available Online at: https://docs.aws.amazon.com/AWSEC2/latest/UserGuide/ebs-creating-snapshot.html, 2022, 4 pages.
"Create Consistency Groups", Available Online at: https://library.netapp.com/ecmdocs/ECMP12404965/html/GUID-AA34DCF7-6827-4ACC-AA5E-63B1FEA8EFCE.html, Jan. 2016, 2 pages.
"Google Scholar/patents Search—Text Refined", 2024, 2 pages.
"How AWS Data Sync Works", Amazon Web Services DataSync, Available Online at: https://docs.aws.amazon.com/datasync/latest/userguide/how-datasync-works.html, Oct. 3, 2022, 5 pages.
"How File Replicator Works", Veritas, Accessed from Internet on Oct. 3, 2022, 1 page.
"Replication for File System Agents", Available Online at: https://documentation.commvault.com/v11/essential/129963_replication_for_file_system_agents.html, Dec. 7, 2021, 2 pages.
"Snapshot Schedules and Snapshot Consistency Groups", Available Online at: https://thinksystem.lenovofiles.com/storage/help/index.jsp?topic=%2Fthinksystem_system_manager_11.50.1%2F34EADFOC-B783-4FED-B187-28B016EE22B6_.html, Accessed from Internet on Aug. 11, 2022, 2 pages.
"SnapshotIQ", Available online at: https://infohub.delltechnologies.com/en-us/l/high-availability-and-data-protection-with-dell-powerscale-scale-out-nas/snapshots-116/, 4 pages.
"Snapshotting a Consistency Group", Available Online at: https://www.IBM.com/docs/en/xiv-storage-system?topic=commands-snapshotting-consistency-group, Jun. 12, 2022, 5 pages.
"The Definitive Guide to Rubrik Cloud Data Management", Available Online at: https://www.rubrik.com/content/dam/rubrik/en/resources/white-paper/Definitive-guide-rubrik-cloud-data-management.pdf, Jun. 8, 2021, 41 pages.
"What is AWS DataSync?", Available Online at: https://docs.aws.amazon.com/datasync/latest/userguide/what-is-datasync.html, Oct. 3, 2022, 3 pages.
U.S. Appl. No. 17/991,688 , Non-Final Office Action, Mailed On Nov. 19, 2024, 11 pages.
U.S. Appl. No. 18/094,302 , Notice of Allowance, Mailed On Nov. 29, 2024, 14 pages.
U.S. Appl. No. 18/162,459 , Notice of Allowance, Mailed On Dec. 9, 2024, 11 pages.
U.S. Appl. No. 18/166,992 , Non-Final Office Action, Mailed On Jun. 20, 2024, 9 pages.
U.S. Appl. No. 18/166,992 , Notice of Allowance, Mailed On Nov. 5, 2024, 9 pages.
U.S. Appl. No. 18/169,121 , Non-Final Office Action, Mailed On Aug. 14, 2024, 29 pages.
U.S. Appl. No. 18/181,414 , Final Office Action, Mailed On Aug. 12, 2024, 22 pages.
U.S. Appl. No. 18/181,414 , Non-Final Office Action, Mailed On Mar. 14, 2024, 78 pages.
U.S. Appl. No. 18/181,414 , Notice of Allowance, Mailed On Sep. 30, 2024, 12 pages.
U.S. Appl. No. 18/304,161 , Notice of Allowance, Mailed On Mar. 19, 2024, 20 pages.
U.S. Appl. No. 18/304,226 , Non-Final Office Action, Mailed On Nov. 19, 2024, 16 pages.
U.S. Appl. No. 18/326,447 , Non-Final Office Action, Mailed On Jun. 12, 2024, 8 pages.
U.S. Appl. No. 18/326,447 , Notice of Allowance, Mailed On Aug. 29, 2024, 10 pages.
U.S. Appl. No. 18/332,462 , Final Office Action, Mailed On Jul. 25, 2024, 26 pages.
U.S. Appl. No. 18/332,462 , Non-Final Office Action, Mailed On Apr. 25, 2024, 18 pages.
U.S. Appl. No. 18/332,475 , Non-Final Office Action, Mailed On Dec. 19, 2024, 15 pages.
U.S. Appl. No. 18/646,676 , Notice of Allowance, Mailed On Jan. 2, 2025, 21 pages.
Chapman et al., "Provenance and the Price of Identity", Available online at: https://www.researchgate.net/profile/Adriane-Chapman/publication/220919088_Provenance_and_the_Price_of_Identity/links/09e4150ac3676a65f5000000/Provenance-and-the-Price-of-Identity.pdf, Jun. 2008, pp. 1-14.
Khurana et al., "Efficient Snapshot Retrieval Over Historical Graph Data", Institute of Electrical and Electronics Engineers, Jul. 24, 2012, pp. 997-1008.
Lapp , "Busting the Buffer Myth for Multicast Media Over IP", Available Online at: https://blogs.cisco.com/sp/busting-the-buffer-myth-for-multicast-media-over-ip, Feb. 22, 2021, 9 pages.
Mahajan et al., "Effective and Efficient Compromise Recovery for Weakly Consistent Replication", Available online at: https://dl.acm.org/doi/pdf/10.1145/1519065.1519080?casa_token=t20agCiLGw4AAAAA:ZMBpdKEfUS_

(56) References Cited

OTHER PUBLICATIONS

8XyfuuUCOrZCKTHA2DkCr_gs7LVAeoxiuXwsctzQZyeAaZ1USEOI_Vb9YzTttL9s, Apr. 2009, pp. 131-144.
Mashtizadeh et al., "Replication, History, and Grafting in the Ori File System", Symposium on Operating Systems Principles, Available Online at: https://www.scs.stanford.edu/~dm/home/papers/mashtizadeh:ori.pdf, Nov. 3-6, 2013, pp. 151-166.
Application No. PCT/US2023/024235 , International Preliminary Report on Patentability, Mailed On Dec. 26, 2024, 9 pages.
Application No. PCT/US2023/024235 , International Search Report and Written Opinion, Mailed On Sep. 4, 2023, 13 pages.
Application No. PCT/US2023/024236 , International Preliminary Report on Patentability, Mailed On Dec. 26, 2024, 9 pages.
Application No. PCT/US2023/024236 , International Search Report and Written Opinion, Mailed On Sep. 6, 2023, 10 pages.
Application No. PCT/US2023/024239 , International Search Report and Written Opinion, Mailed On Aug. 11, 2023, 14 pages.
Application No. PCT/US2023/024835 , International Preliminary Report on Patentability, Mailed On Dec. 26, 2024, 11 pages.
Application No. PCT/US2023/024835 , International Search Report and Written Opinion, Mailed On Aug. 8, 2023, 14 pages.
Application No. PCT/US2023/025194 , International Preliminary Report on Patentability, Mailed On Dec. 26, 2024, 10 pages.
Application No. PCT/US2023/025194 , International Search Report and Written Opinion, Mailed On Aug. 18, 2023, 13 pages.
Tremel et al., "Reliable, Efficient Recovery for Complex Services with Replicated Subsystems", Available online at: https://www.cs.cornell.edu/~weijia/papers/edward-dsn.pdf, Jun. 2020, pp. 172-183.
Google Scholar/Patents Search-Text Refined, Filesystem Delta Snapshot Replication, 2025, 2 pages.
Google Scholar/Patents Search-Text Refined, Pipeline Thread Delete Stage, 2025, 2 pages.
U.S. Appl. No. 17/991,688, Notice of Allowance mailed on Mar. 7, 2025, 8 pages.
U.S. Appl. No. 18/094,302, Notice of Allowance mailed on Mar. 13, 2025, 14 pages.
U.S. Appl. No. 18/169,121, Notice of Allowance mailed on Apr. 28, 2025, 6 pages.
U.S. Appl. No. 18/169,124, Notice of Allowance mailed on Mar. 20, 2025, 13 pages.
U.S. Appl. No. 18/304,226, Final Office Action mailed on Apr. 4, 2025, 20 pages.
U.S. Appl. No. 18/497,877, Non-Final Office Action mailed on Mar. 3, 2025, 25 pages.
U.S. Appl. No. 18/508,990, Non-Final Office Action mailed on Mar. 3, 2025, 11 pages.
U.S. Appl. No. 18/521,176, Non-Final Office Action mailed on Apr. 4, 2025, 6 pages.
Chang et al., Job Scheduling and Data Replication on Data Grids, Future Generation Computer Systems, vol. 23, No. 7, Aug. 2007, pp. 846-860.
U.S. Appl. No. 18/169,121, Notice of Allowance, mailed On Feb. 14, 2025, 12 pages.
U.S. Appl. No. 18/332,462, Notice of Allowance, mailed On Feb. 12, 2025, 5 pages.
U.S. Appl. No. 18/536,067, Non-Final Office Action, mailed On Jan. 29, 2025, 17 pages.
"Google Scholar/Patents Search-Text Refined", File System Delta B-tree Key Pairs, Accessed from internet on Jun. 25, 2025, 2 pages.
U.S. Appl. No. 18/304,226, "Non-Final Office Action", mailed on Jun. 27, 2025, 13 pages.
U.S. Appl. No. 18/332,475, "Final Office Action", mailed on Jun. 18, 2025, 14 pages.
U.S. Appl. No. 18/508,990, "Notice of Allowance", mailed on Jul. 15, 2025, 9 pages.
U.S. Appl. No. 18/536,067, "Final Office Action", mailed on Jul. 1, 2025, 14 pages.
U.S. Appl. No. 18/536,072, "Notice of Allowance", mailed on Jun. 27, 2025, 12 pages.
U.S. Appl. No. 18/943,779, "Non-Final Office Action", mailed on May 30, 2025, 56 pages.
U.S. Appl. No. 18/916,393, Notice of Allowance mailed on Nov. 24, 2025, 10 pages.
"File System Key Pairs Threads", Google Scholar/Patents Search—Text Refined, Accessed from Internet on Oct. 22, 2025, pp. 1-2.
"Pipeline Delete Target Source", Google Scholar/Patents search—text refined 2025, Accessed from Internet on Sep. 19, 2025, pp. 1-2.
U.S. Appl. No. 18/304,226, "Notice of Allowance", mailed on Nov. 12, 2025, 6 pages.
U.S. Appl. No. 18/943,779, "Final Office Action", mailed on Nov. 7, 2025, 22 pages.
International Application No. CN202380043794.7, "Office Action", mailed on Oct. 9, 2025, 20 pages.
International Application No., EP23738250.2, "Intention to Grant", mailed on Oct. 14, 2025, 8 pages.
U.S. Appl. No. 18/969,186, Non-Final Office Action mailed on Sep. 5, 2025, 23 pages.
U.S. Appl. No. 18/497,877, "Notice of Allowance", mailed Aug. 12, 2025, 9 pages.
U.S. Appl. No. 18/916,393, "Non-Final Office Action", mailed Aug. 13, 2025, 16 pages.
U.S. Appl. No. 18/508,990 , Notice of Allowance, Mailed On Mar. 10, 2026, 10 pages.
U.S. Appl. No. 18/969,186 , Notice of Allowance, Mailed On Mar. 16, 2026, 10 pages.
IN202447074268 , "First Examination Report", Feb. 10, 2026, 9 pages.
U.S. Appl. No. 18/332,475, Notice of Allowance, mailed on Jan. 7, 2026, 9 pages.
U.S. Appl. No. 18/536,067, Notice of Allowance mailed on Feb. 3, 2026, 9 pages.
U.S. Appl. No. 18/916,393, Corrected Notice of Allowability mailed on Jan. 27, 2026, 2 pages.
U.S. Appl. No. 18/916,393, Corrected Notice of Allowability mailed on Dec. 19, 2025, 4 pages.
Chinese Application No. 202380043794.7, Office Action mailed on Nov. 29, 2025, 16 pages (8 pages of original document and 8 pages of English Translation).
Chinese Application No. 202380043794.7, Office Action mailed on Jan. 7, 2026, 18 pages (9 pages of original document and 9 pages of English Translation).
Indian Application No. 202447074607, First Examination Report mailed on Jan. 20, 2026, 9 pages.
"Snapshot Tool for Amazon RDS", Available Online at: https://github.com/awslabs/rds-snapshot-tool, 2020, 6 pages.
U.S. Appl. No. 18/332,475 , "Supplemental Notice of Allowability", Mar. 31, 2026, 2 pages.
U.S. Appl. No. 18/508,990 , "Supplemental Notice of Allowability", Mar. 27, 2026, 6 pages.
U.S. Appl. No. 19/179,643 , Non-Final Office Action, Mailed On Mar. 24, 2026, 13 pages.
U.S. Appl. No. 19/206,676 , Non-Final Office Action, Mailed On Mar. 25, 2026, 18 pages.
Malik et al., "Cross-Region Automatic Disaster Recovery on Amazon RDS for Oracle Database Using DB Snapshots and AWS Lambda", AWS Database Blog, 2019, 11 pages.
Application No. PCT/US2023/024239 , International Preliminary Report on Patentability, Mailed On Dec. 26, 2024, 11 pages.
U.S. Appl. No. 18/332,475, Corrected Notice of Allowability mailed on May 26, 2026, 6 pages.
U.S. Appl. No. 18/943,779, Corrected Notice of Allowability mailed on Jun. 2, 2026, 8 pages.
U.S. Appl. No. 18/943,779, Notice of Allowance mailed on Apr. 24, 2026, 11 pages.
U.S. Appl. No. 18/969,186, Corrected Notice of Allowability mailed on May 7, 2026, 8 pages.
U.S. Appl. No. 19/179,643, Corrected Notice of Allowability mailed on May 13, 2026, 2 pages.
U.S. Appl. No. 19/179,643, Corrected Notice of Allowability mailed on Jun. 9, 2026, 3 pages.
U.S. Appl. No. 19/179,643, Notice of Allowance mailed on Apr. 23, 2026, 9 pages.

(56) References Cited

OTHER PUBLICATIONS

U.S. Appl. No. 19/206,676 , "Notice of Allowance", Jun. 11, 2026, 5 pages.
U.S. Appl. No. 19/237,718, Non-Final Office Action mailed on Jun. 1, 2026, 34 pages.
Hu et al., Extracting Deltas from col. Oriented NoSQL Databases for Different Incremental Applications and Diverse Data Targets, Data & Knowledge Engineering, vol. 93, Sep. 2014, pp. 42-59.
Indian Application No. 202447074167, First Examination Report mailed on Apr. 22, 2026, 7 pages.
IN202447073239, "Office Action", Jun. 18, 2026, 9 pages.

* cited by examiner

900

Objects 910 911 930 931

Upload | More Actions | Search by prefix

| Name | Last Modified | Size | Status |
|---|---|---|---|
| ocid1.filesystem.oc1.iad.aaaaaaaaaaaaoed4hnfqwillqojxwiotimfsc2ylefuzaaaaa | - | - | - |
| delta1-2 912 | - | - | - |
| 1 914 | Sun, Sep 13, 2020, 02:54:39 UTC | 8.91 MiB | Available |
| 2 916 | Sun, Sep 13, 2020, 02:52:19 UTC | 8.91 MiB | Available |
| **manifest.mf** 918 | Tue, Sep 15, 2020, 00:06:16 UTC | 0 bytes | Available |
| delta2-3 920 | - | - | - |
| 1 922 | Sun, Sep 13, 2020, 02:54:57 UTC | 8.91 MiB | Available |
| **manifest.mf** 924 | Tue, Sep 15, 2020, 00:07:06 UTC | 0 bytes | Available |
| ocid1.filesystem.oc1.phx.aaaaaaaaaaaaaaxvobuhqllemv3haotqnb4c2ylefuzaaaaa | - | - | - |
| delta1-2 932 | - | - | - |
| 1 | Sun, Sep 13, 2020, 02:56:55 UTC | 15.03 KiB | Available |
| 2 | Sun, Sep 13, 2020, 02:58:43 UTC | 15.03 KiB | Available |
| 3 | Sun, Sep 13, 2020, 02:58:59 UTC | 15.03 KiB | Available |
| **manifest.mf** | Tue, Sep 15, 2020, 00:07:35 UTC | 0 bytes | Available |
| delta1-2 940 | - | - | - |
| 1 | Sun, Sep 13, 2020, 02:59:12 UTC | 15.03 KiB | Available |
| 2 | Sun, Sep 13, 2020, 02:59:24 UTC | 15.03 KiB | Available |
| **manifest.mf** | Tue, Sep 15, 2020, 00:08:22 UTC | 0 bytes | Available |

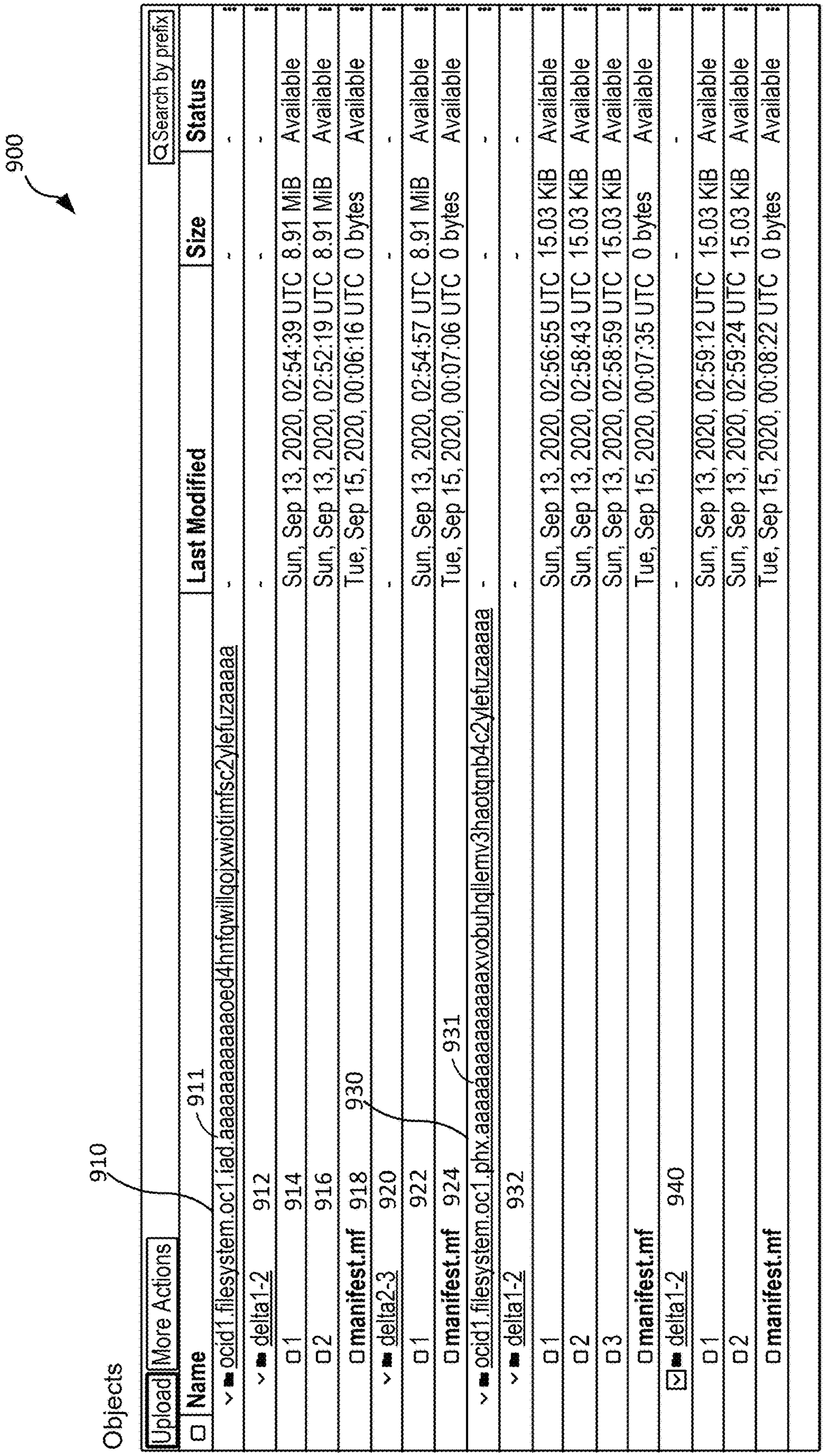

*FIG. 9*

DETERMINE THE TOTAL NUMBER OF FILE-BASED CT KEYS IN A CT B-TREE FOR A PARTICULAR EPOCH 2010

TOTAL NUMBER ABOVE THRESHOLD? 2020

YES

PERFORM DELTA GENERATION BY TRAVERSING AN FSS B-TREE 2030

YES

OBTAIN A LIST OF FILE-BASED CT KEYS FROM THE CT B-TREE, 2040

FOR EACH OF THE FILE-BASED CT KEYS, IDENTIFY THE RELEVANT FS KEYS IN THE FSS B-TREE, 2050

GENERATE DELTAS BETWEEN THE FIRST SNAPSHOT AND THE SECOND SNAPSHOT BASED ON THE RELEVANT FS KEYS IN THE FSS B-TREE 2060

PERFORM REPLICATION USING THE GENERATED DELTAS 2070

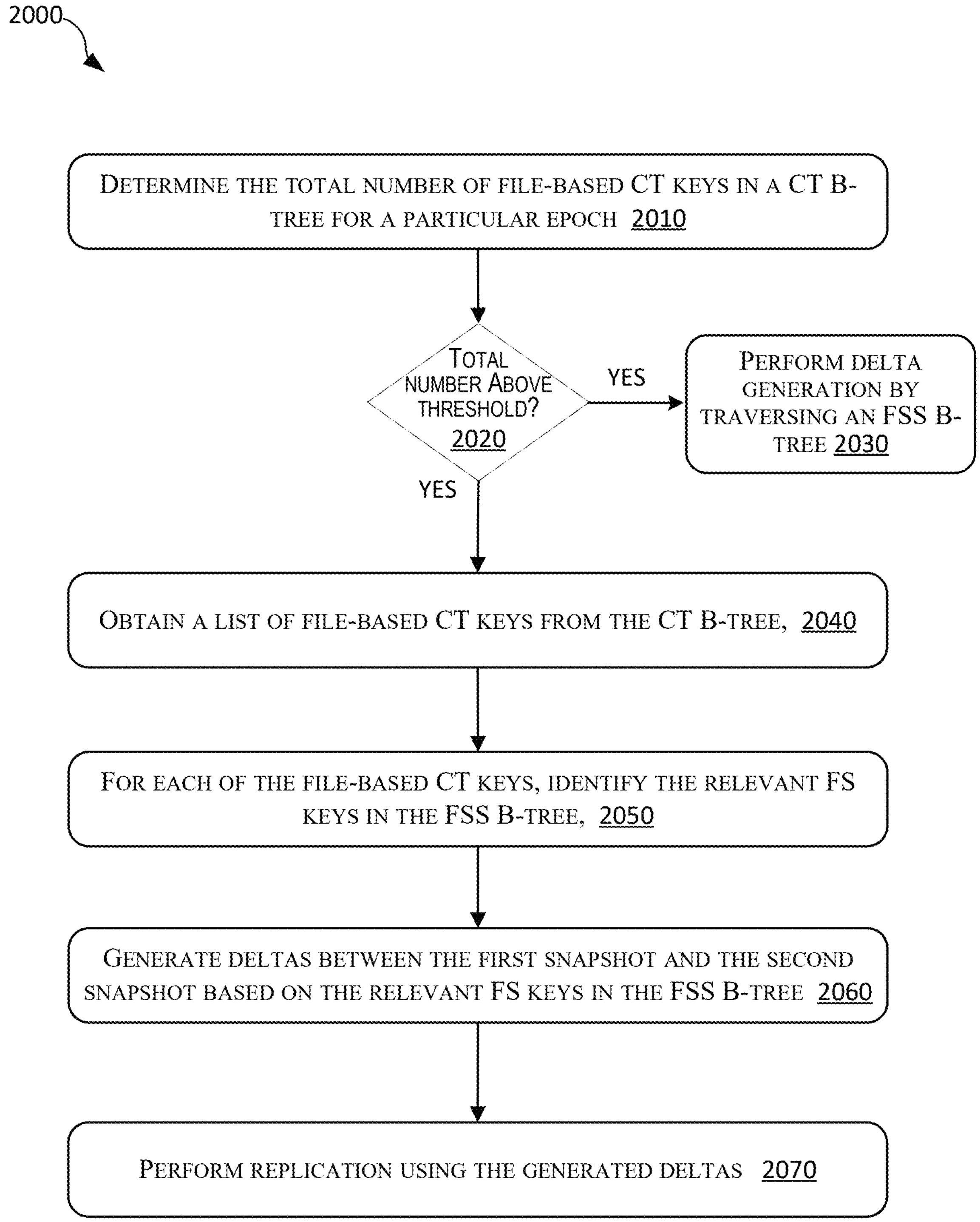

*FIG. 20*

CREATE A CENTRAL CHANGE-TRACKING RECORD, WHERE THE CENTRAL CT RECORD IS USED TO DETERMINE WHEN TO USE THE CHANGE-TRACKING INFORMATION STORED IN A FIRST DATA STRUCTURE 2210

SYNCHRONIZE SNAPSHOT GENERATION AMONG FRONT-END SUBSYSTEMS, EACH GENERATING A SET OF SNAPSHOTS IN A FILE SYSTEM 2220

CONTROL, BY EACH FRONT-END SUBSYSTEM, ITS CHANGE-TRACKING MODE INDIVIDUALLY FOR TRACKING CHANGES MADE TO ITS RESPECTIVE SET OF SNAPSHOTS 2230

USE THE CENTRAL CHANGE-TRACKING RECORD TO IDENTIFY A COMMON EPOCH NUMBER AMONG THE SETS OF SNAPSHOTS, WHERE THE COMMON EPOCH NUMBER IS A SNAPSHOT GENERATION TIME IN WHICH ALL FRONT-END SUBSYSTEMS ARE IN THE SAME CHANGE-TRACKING MODE 2240

PERFORM ONE OR MORE REPLICATIONS, USING CHANGE-TRACKING INFORMATION, STARTING AT OR AFTER THE COMMON SNAPSHOT NUMBER FOR THE SETS OF SNAPSHOTS 2250

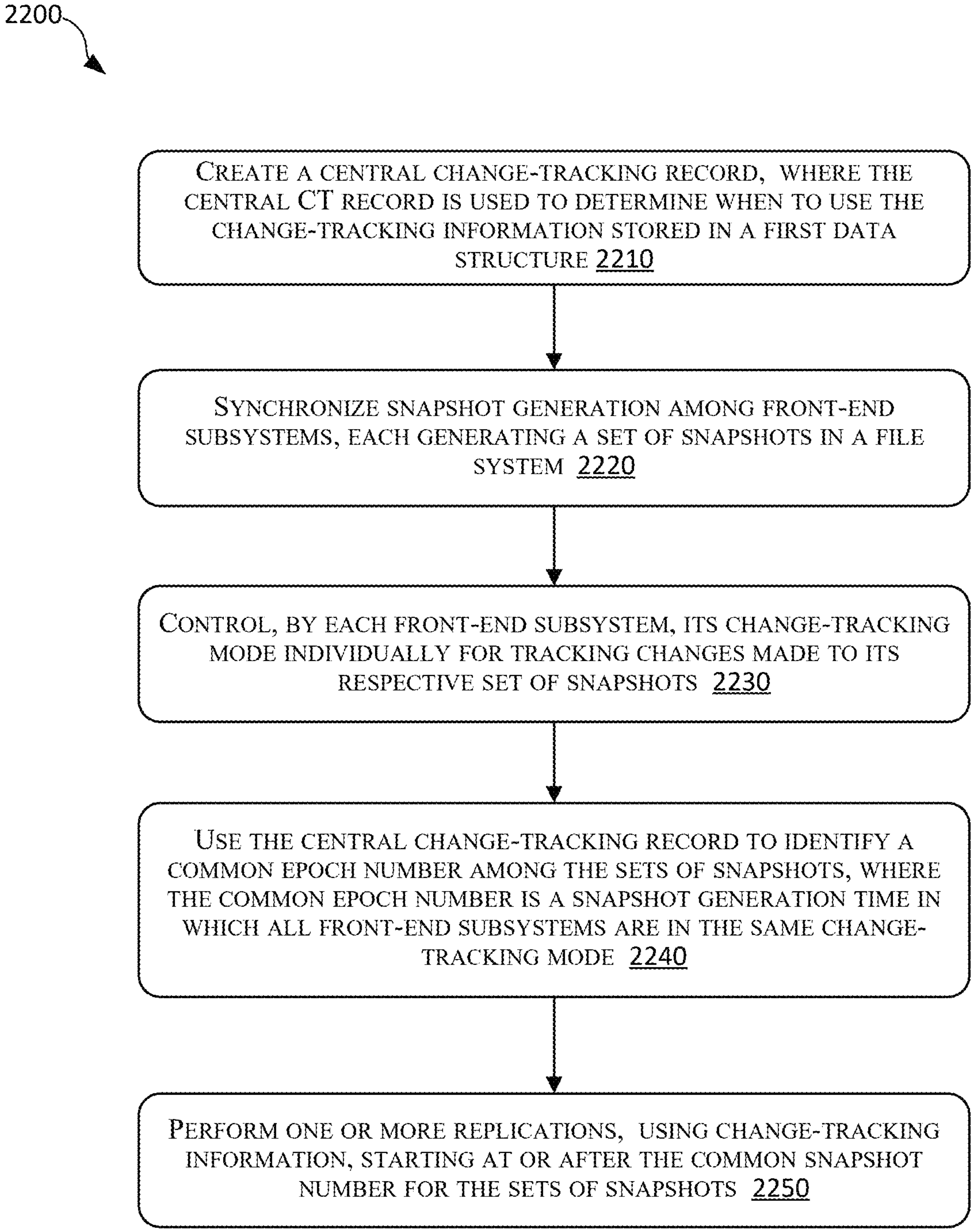

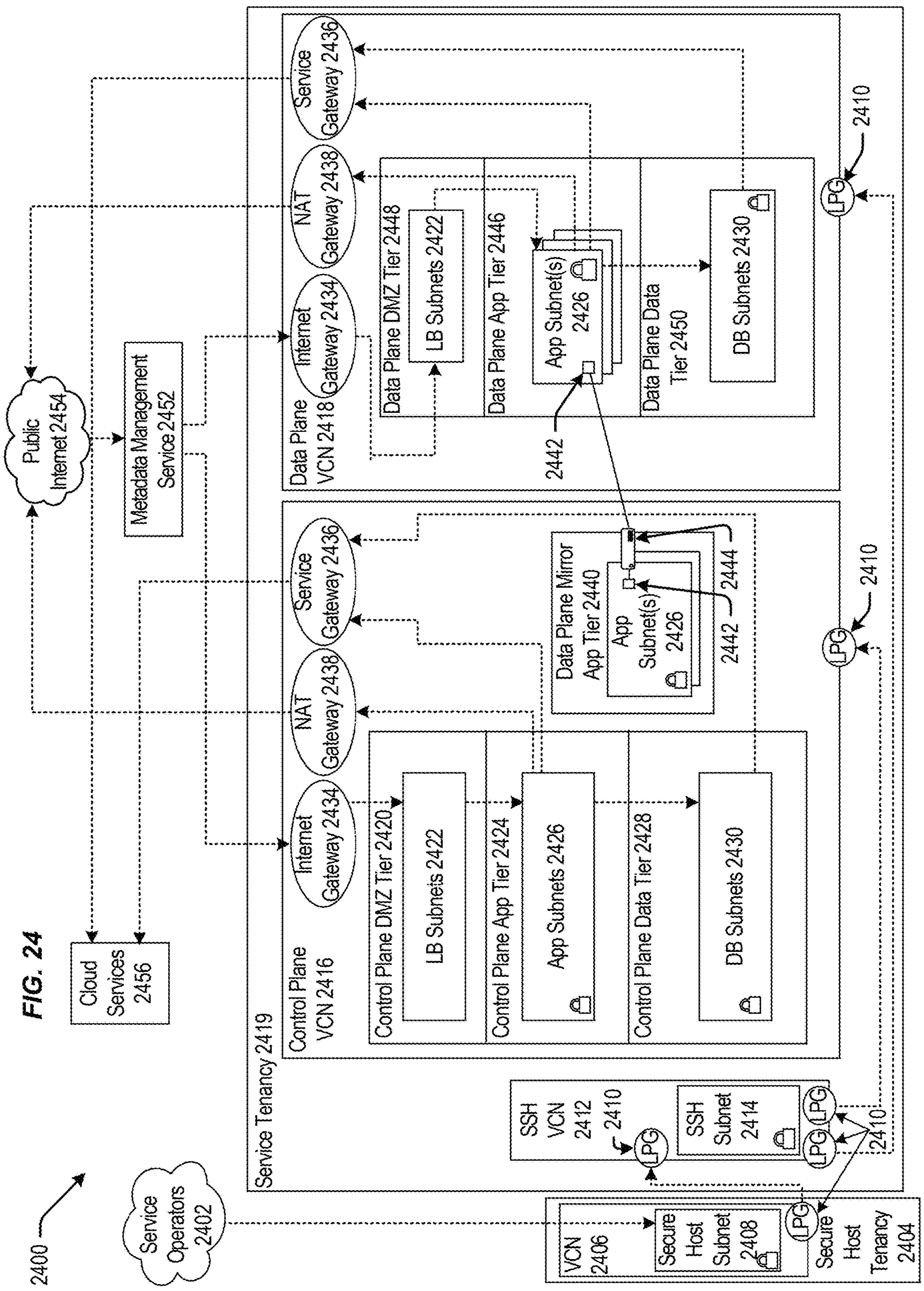

FIG. 24
Public Internet 2454
Cloud Services 2456
Service Operators 2402
Metadata Management Service 2452
Service Tenancy 2419
Control Plane VCN 2416
Internet Gateway 2434
NAT Gateway 2438
Service Gateway 2436
Data Plane VCN 2418
Internet Gateway 2434
NAT Gateway 2438
Service Gateway 2436
Control Plane DMZ Tier 2420
LB Subnets 2422
Control Plane App Tier 2424
App Subnets 2426
Control Plane Data Tier 2428
DB Subnets 2430
Data Plane Mirror App Tier 2440
App Subnet(s) 2426
2442
2444
Data Plane DMZ Tier 2448
LB Subnets 2422
Data Plane App Tier 2446
2442
App Subnet(s) 2426
Data Plane Data Tier 2450
DB Subnets 2430
VCN 2406
Secure Host Subnet 2408
LPG
Secure Host Tenancy 2404
SSH VCN 2412
2410
LPG
SSH Subnet 2414
LPG
LPG
2410
LPG
2410
LPG
2410

2500

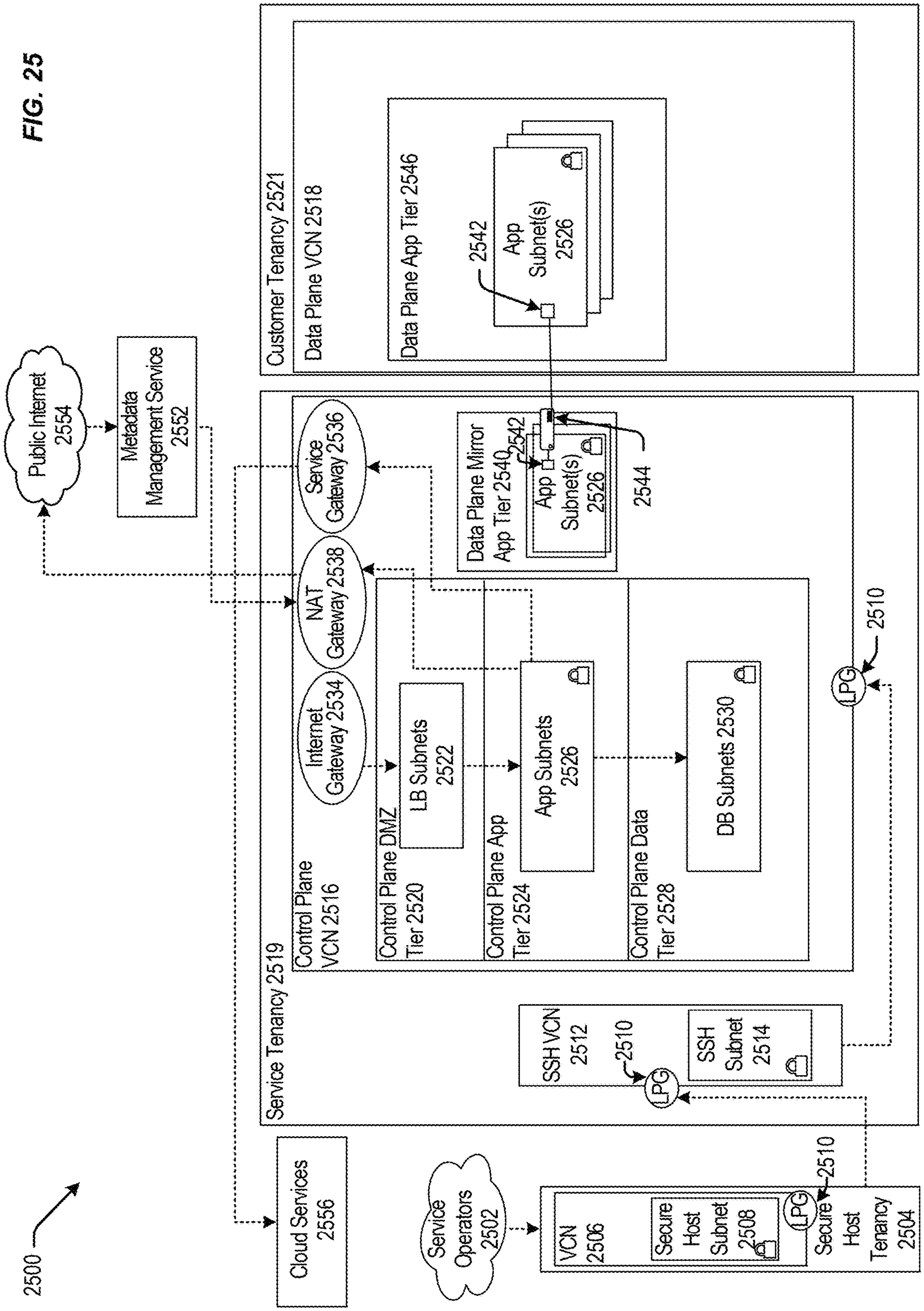

FIG. 25
Public Internet 2554
Metadata Management Service 2552
Cloud Services 2556
Service Tenancy 2519
Control Plane VCN 2516
Internet Gateway 2534
NAT Gateway 2538
Service Gateway 2536
Control Plane DMZ Tier 2520
LB Subnets 2522
Control Plane App Tier 2524
App Subnets 2526
Control Plane Data Tier 2528
DB Subnets 2530
Data Plane Mirror App Tier 2540
2542
App Subnet(s) 2526
2544
Customer Tenancy 2521
Data Plane VCN 2518
Data Plane App Tier 2546
2542
App Subnet(s) 2526
Service Operators 2502
VCN 2506
Secure Host Subnet 2508
LPG
Secure Host Tenancy 2504
2510
SSH VCN 2512
2510
LPG
SSH Subnet 2514
LPG
2510

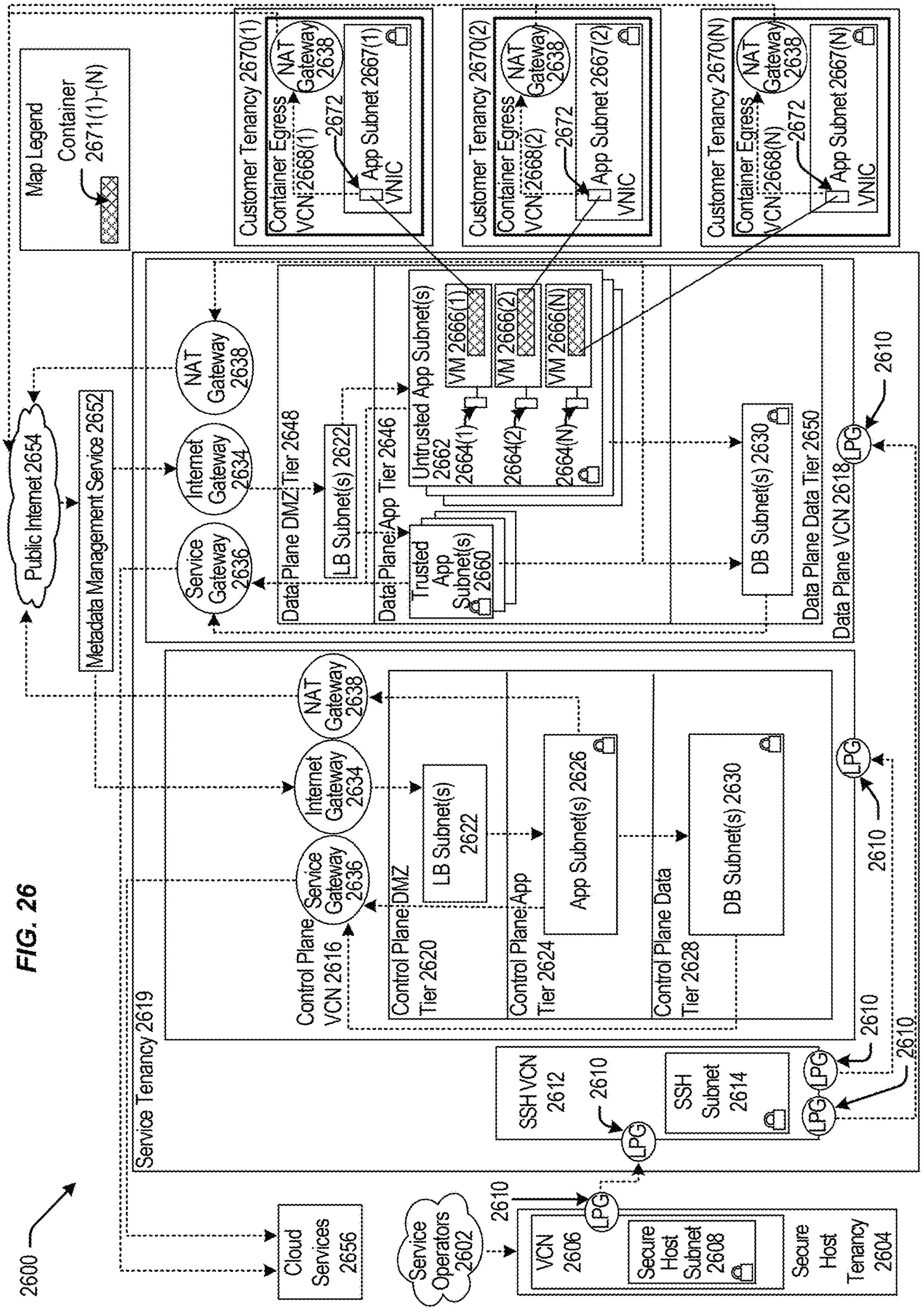

FIG. 26
2600
Map Legend
Container 2671(1)-(N)
Public Internet 2654
Metadata Management Service 2652
Cloud Services 2656
Service Operators 2602
VCN 2606
Secure Host Subnet 2608
Secure Host Tenancy 2604
LPG
2610
Service Tenancy 2619
SSH VCN 2612
SSH Subnet 2614
Control Plane VCN 2616
Control Plane DMZ Tier 2620
Control Plane App Tier 2624
Control Plane Data Tier 2628
Service Gateway 2636
Internet Gateway 2634
NAT Gateway 2638
LB Subnet(s) 2622
App Subnet(s) 2626
DB Subnet(s) 2630
Data Plane VCN 2618
Data Plane DMZ Tier 2648
Data Plane App Tier 2646
Data Plane Data Tier 2650
Trusted App Subnet(s) 2660
Untrusted App Subnet(s) 2662
2664(1)
2664(2)
2664(N)
VM 2666(1)
VM 2666(2)
VM 2666(N)
Customer Tenancy 2670(1)
Customer Tenancy 2670(2)
Customer Tenancy 2670(N)
Container Egress VCN 2668(1)
Container Egress VCN 2668(2)
Container Egress VCN 2668(N)
App Subnet 2667(1)
App Subnet 2667(2)
App Subnet 2667(N)
VNIC
2672

2700

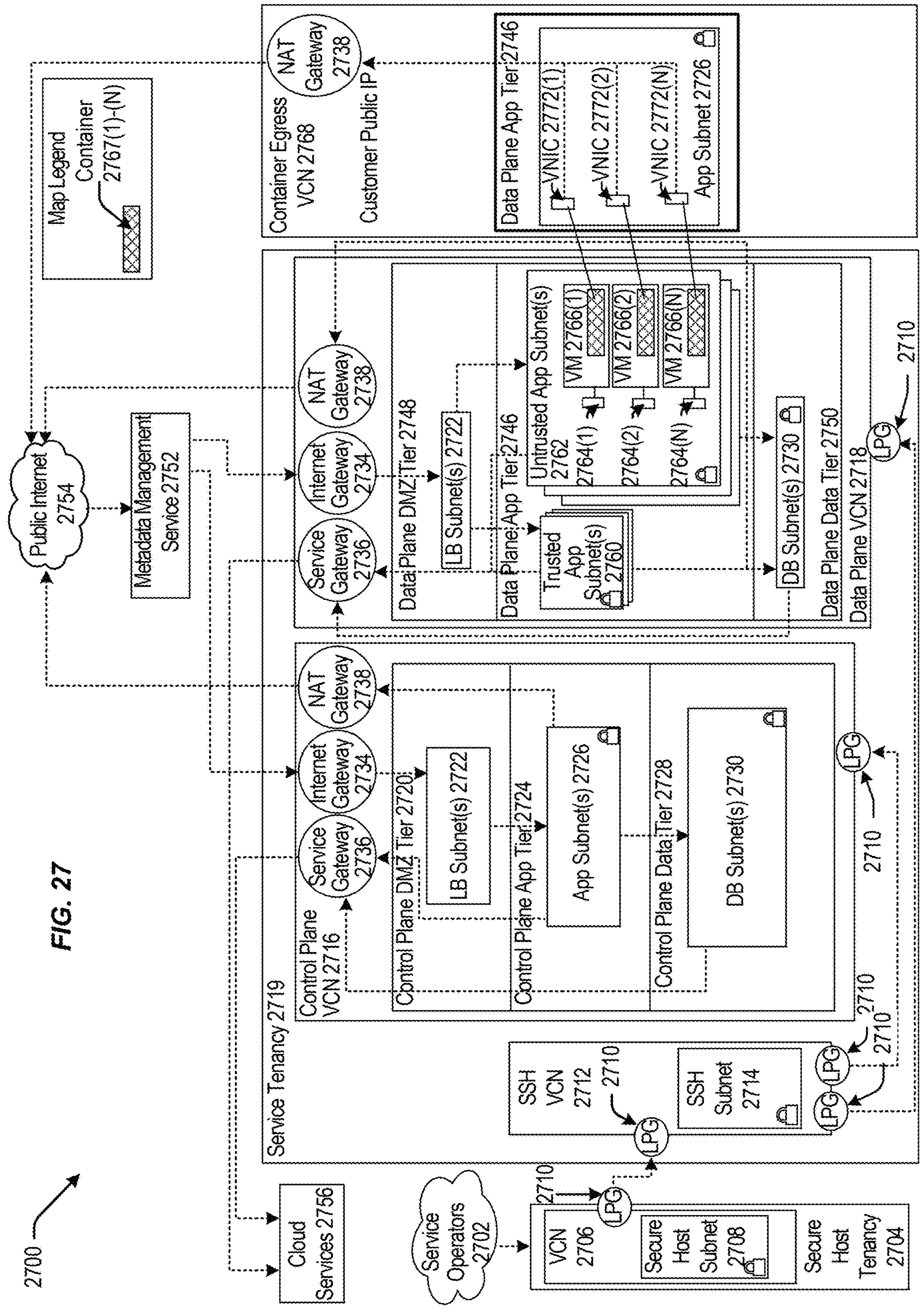

FIG. 27
Public Internet 2754
Map Legend
Container 2767(1)-(N)
Metadata Management Service 2752
Cloud Services 2756
Service Tenancy 2719
Control Plane VCN 2716
Service Gateway 2736
Internet Gateway 2734
NAT Gateway 2738
Control Plane DMZ Tier 2720
LB Subnet(s) 2722
Control Plane App Tier 2724
App Subnet(s) 2726
Control Plane Data Tier 2728
DB Subnet(s) 2730
Service Gateway 2736
Internet Gateway 2734
NAT Gateway 2738
Data Plane DMZ Tier 2748
LB Subnet(s) 2722
Data Plane App Tier 2746
Trusted App Subnet(s) 2760
Untrusted App Subnet(s) 2762
2764(1)
2764(2)
2764(N)
VM 2766(1)
VM 2766(2)
VM 2766(N)
DB Subnet(s) 2730
Data Plane Data Tier 2750
Data Plane VCN 2718
Container Egress VCN 2768
NAT Gateway 2738
Customer Public IP
Data Plane App Tier 2746
VNIC 2772(1)
VNIC 2772(2)
VNIC 2772(N)
App Subnet 2726
Service Operators 2702
VCN 2706
Secure Host Subnet 2708
Secure Host Tenancy 2704
SSH VCN 2712
SSH Subnet 2714
LPG
2710

DYNAMICALLY ENABLING/DISABLING CHANGE TRACKING ON RUNNING REPLICATION FOR A MULTI-CLIENT FILE SYSTEM

CROSS-REFERENCES TO RELATED APPLICATIONS

This application is a non-provisional of and claims the benefit and priority under 35 U.S.C. 119 (e) of U.S. Provisional Application No. 63/679,005, titled "TECHNIQUES FOR OPTIMIZING CHANGE TRACKING OF A FILE SYSTEM," filed on Aug. 2, 2024, which is incorporated herein by reference in its entirety for all purposes.

This application is related to U.S. Non-Provisional application Ser. No. 18/969,186, filed Dec. 4, 2024, the disclosure of which is incorporated by reference in its entirety for all purposes.

FIELD

The present disclosure generally relates to file systems. More specifically, but not by way of limitation, A change tracking and delta generation (CTDG) system is disclosed for enabling the delta generation during replication to be proportional to the number of changes between two snapshots instead of the size of the snapshots. The CTDG can support multiple clients, and enable or disable the change tracking.

BACKGROUND

Enterprise businesses contain critical data. File system replication enhances the availability of critical data and provides fault tolerance. However, there is a need to improve the efficiency of file system replication and the delta generation process during the replication.

BRIEF SUMMARY

Various embodiments are described herein, including methods, systems, non-transitory computer-readable storage media storing programs, code, or instructions executable by one or more processors, and the like. Some embodiments may be implemented by using a computer program product, comprising computer program/instructions which, when executed by a processor, cause the processor to perform any of the methods described in the disclosure.

One general aspect includes a method. The method also includes creating, by a computing system, a first data structure storing change-tracking information used by one or more replications performed by a file system. The method also includes controlling, by a first sub-system of the computing system, a first change-tracking mode for tracking changes made to a first set of snapshots in a file system. The method also includes controlling, by a second sub-system of the computing system, a second change-tracking mode for tracking changes made to a second set of snapshots in the file system, the first change-tracking mode and the second change-tracking mode configured to effectuate storing change-tracking information in the first data structure. The method also includes identifying, by the computing system, a common snapshot generation time between the first set of snapshots and the second set of snapshots, the common snapshot generation time being a particular snapshot generation time in which both the first change-tracking mode and the second change-tracking mode are in a same mode.

Implementations may include one or more of the following features. The method where the first change-tracking mode enables change-tracking. The first sub-system of the file system generates a first portion of the change-tracking information being stored in the first data structure in accordance with the first change-tracking mode being enabled, and where the second sub-system of the file system generates a second portion of the change-tracking information being stored in the first data structure in accordance with the second change-tracking mode being enabled. Change-tracking information used by the one or more replications performed by the file system further may include: accessing the change-tracking information stored in the first data structure to generate deltas based on the first set of snapshots for a first replication of the one or more replications; and accessing the change-tracking information stored in the first data structure to generate deltas based on the second set of snapshots for a second replication of the one or more replications, where the first replication and the second replication are performed in parallel. The method may include searching for committed changes to the file system in a second data structure based at least in part on the change-tracking information stored in the first data structure. Identifying the common snapshot generation time may include: synchronizing snapshot generation between the first sub-system and the second sub-system, such that both the first sub-system and the second sub-system generate snapshots at a same pace; updating value of the common snapshot generation time field in the central change-tracking record atomically to a latest snapshot generation time by either the first sub-system or the second sub-system; and verifying both the first sub-system and the second sub-system have reached the common snapshot generation time. The mode in the common change-tracking mode field is set by the file system, the first sub-system or the second sub-system. The method may include performing the one or more replications at the common snapshot generation time using the mode in the common change-tracking mode field after verifying both the first sub-system and the second sub-system have reached the common snapshot generation time. The change-tracking information stored in the first data structure may include information indicating changes not yet committed to the file system.

In various embodiments, a system is provided that includes one or more data processors and a non-transitory computer readable medium containing instructions which, when executed on the one or more data processors, cause the one or more data processors to perform part or all of one or more methods disclosed herein.

In various embodiments, a non-transitory computer-readable medium, storing computer-executable instructions which, when executed by one or more processors, cause the one or more processors of a computer system to perform one or more methods disclosed herein.

In various embodiments, a computer-program product, comprising computer program/instructions which, when executed by a processor, cause the processor to perform any of the methods disclosed herein.

The techniques described above and below may be implemented in a number of ways and in a number of contexts. Several example implementations and contexts are provided with reference to the following figures, as described below in more detail. However, the following implementations and contexts are but a few of many.

BRIEF DESCRIPTION OF THE DRAWINGS

Features, embodiments, and advantages of the present disclosure are better understood when the following Detailed Description is read with reference to the accompanying drawings.

FIG. 9 depicts an example replication bucket format, according to certain embodiments.

FIG. 20 is an example flowchart depicting an example replication processing using file-based change-tracking (CT) keys stored, according to some embodiments.

FIG. 22 is an example flowchart depicting a method for enabling and disabling change tracking during replications, according to some embodiments.

FIG. 24 is a block diagram illustrating one pattern for implementing a cloud infrastructure as a service system, according to at least one embodiment.

FIG. 25 is a block diagram illustrating another pattern for implementing a cloud infrastructure as a service system, according to at least one embodiment.

FIG. 26 is a block diagram illustrating another pattern for implementing a cloud infrastructure as a service system, according to at least one embodiment.

FIG. 27 is a block diagram illustrating another pattern for implementing a cloud infrastructure as a service system, according to at least one embodiment.

DETAILED DESCRIPTION

Explanation of Terms in Certain Embodiments

Figure 1:
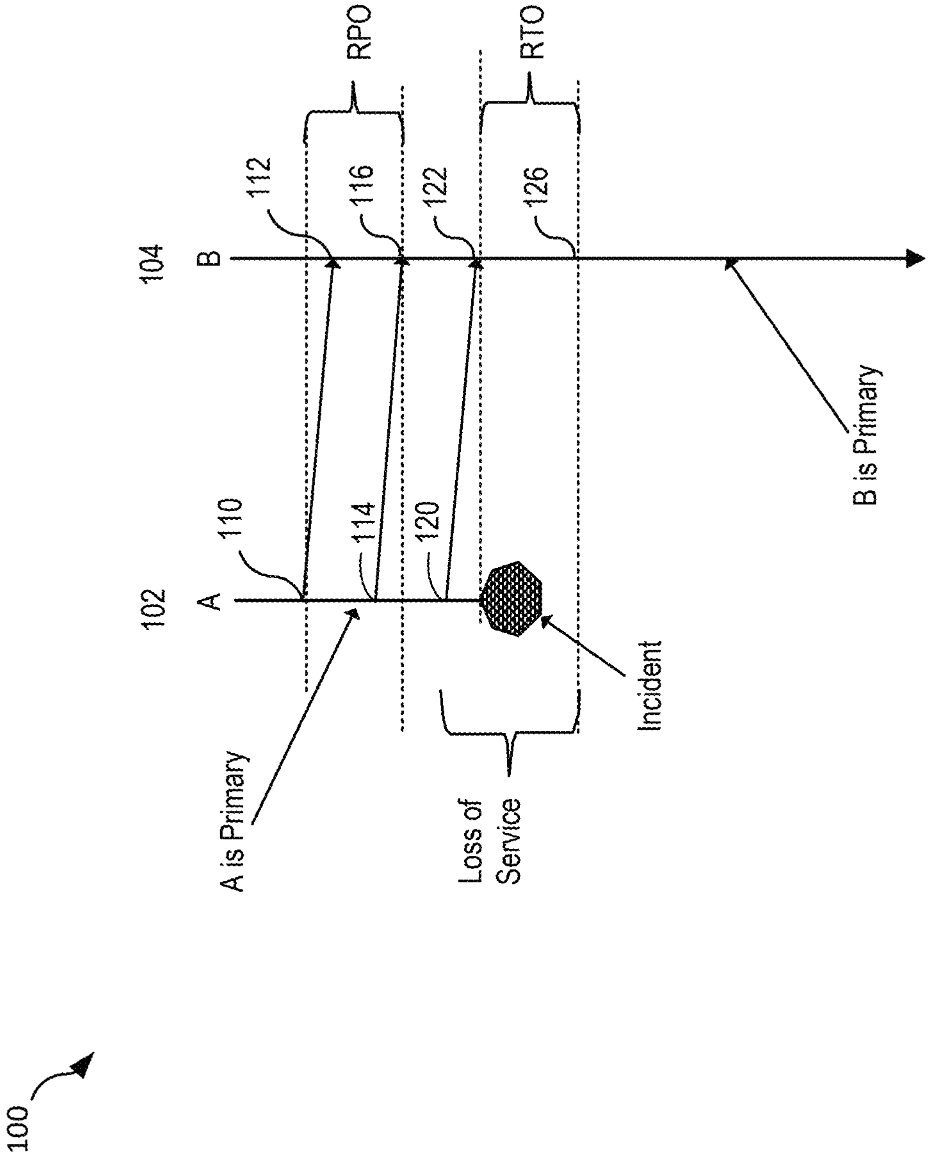
FIG. 1 depicts an example concept of recovery time objective (RTO) and recovery point objective (RPO), according to certain embodiments.

"Recovery time objective" (RTO), in certain embodiments, refers to the time duration users require for their replica to be available in a secondary (or target) region after a failure occurs in a primary (or source) region's availability domain (AD), whether the failure is planned or unplanned.

"Recovery point objective" (RPO), in certain embodiments, refers to a maximum acceptable tolerance in terms of time for data loss between the failure of a primary region (typically due to unplanned failure) and the availability of a secondary region.

A "replicator," in certain embodiments, may refer to a component (e.g., a virtual machine (VM)) in a file system's data plane, comprising cloud infrastructure resources (e.g., servers, storage, network, etc.), for either uploading deltas to a remote Object Store (i.e., an object storage service) if the component is located in a source region or downloading the deltas from the Object Storage for delta application if the component is located in a target region. Replicators may be formed as a fleet (i.e., multiple VMs or replicator threads) called replicator fleet to perform cross-region (or x-region) replication process (e.g., uploading deltas to target region) in parallel.

A "delta generator" (DG), in certain embodiments, may refer to a component in a file system's data plane for either extracting the deltas (i.e., the changes) between the key-values of two snapshots in a balanced tree (B-tree) (or in some embodiments, a binary tree may be used) if the component is located in a source region or applying the deltas to the latest snapshot in a B-tree of the file system if the component is located in a target region. The delta generator in the source region may use several threads (called delta generator threads or range threads for multiple partitioned B-tree key ranges) to perform the extraction of deltas (or B-tree walk) in parallel. The delta generator in the target region may use several threads to apply the downloaded deltas to its latest snapshot in parallel.

A "shared database" (SDB), for the purpose of the present disclosure and in certain embodiments, may refer to a key-value store through which components in both the control plane and data plane (e.g., replicator fleet) of a file system can read and write to communicate with each other. In certain embodiments, the SDB may be part of a B-tree.

A "file system communicator" (FSC), in certain embodiments, may refer to a file manager layer running on the storage nodes in a file system's data plane. The service helps with file create, delete, read, and write requests, and works with a NFS server (e.g., Orca) to service IOs to clients. Replicator fleet may communicate with many storage nodes thereby distributing the work of reading/writing the file system data among the storage nodes.

A "blob," in certain embodiments, may refer to a data type for storing information (e.g., a formatted binary file) in a database. Blobs are generated during replication by a source region and uploaded to an Object Store (i.e., an object storage) in a target region. A blob may include B-tree keys and values and file data. Blobs in the Object Store are called objects. B-tree key-value pairs and their associated data are packed together in blobs to be uploaded to the Object Store in a target region.

A "manifest," in certain embodiments, may refer to information communicated by a file system in a source region (referred to herein as source file system) to a file system in a target region (referred to herein as target file system) for facilitating a cross-region replication process. There are two types of manifest files, master manifest, and checkpoint manifest. A range manifest file (or master manifest file) is created by a source file system at the beginning of a replication process, describing information (e.g., B-tree key ranges) desired by the target file system. A checkpoint manifest file is created after a checkpoint in a source file system informing a target file system of the number of blobs included in a checkpoint and uploaded to the Object Store, such that the target file system can download the number of blobs accordingly.

"Deltas," in certain embodiments, may refer to a collection of changes to a file system by identifying the differences between two given snapshots after replicators recursively visiting every node of a B-tree (also referred to herein walking a B-tree). A delta generator identifies B-tree key-value pairs for the differences and traverses the B-tree nodes to obtain file data associated with the B-tree keys. A delta between two snapshots may contain multiple blobs. The term "deltas" may include blobs and manifests when used in the context of uploading information to an Object Store by a source file system and downloading from an Object Store by a target file system. The key-value pairs of a snapshot in the B-tree may contain metadata, not actual file data, which may be stored on disk.

An "object," in certain embodiments, may refer to a partial collection of information representing the entire deltas during a cross-region replication cycle and is stored in an Object Store. An object may be a few MBs in size stored in a specific location in a bucket of the Object Store. An object may contain many deltas (i.e., blobs and manifests). Blobs uploaded to and stored in the Object Store are called objects.

A "bucket," in certain embodiments, may refer to a container storing objects in a compartment within an Object Storage namespace (tenancy). In the present disclosure, buckets are used by source replicators to store secured deltas using server-side encryption (SSE) and also by target replicators to download for applying changes to snapshots.

"Delta application," in certain embodiments, may refer to the process of applying the deltas downloaded by a target file system to its latest snapshot to create a new snapshot. This may include analyzing manifest files, applying snapshot metadata, inserting the B-tree keys and values into its B-tree, and storing data associated with the B-tree keys (i.e., file data or data portion of blobs) to its local storage. Snapshot metadata is created and applied at the beginning of a replication cycle.

A "region," in certain embodiments, may refer to a logical abstraction corresponding toa geographic area. Each region can include one or more connected data centers. Regions are independent of other regions and can be separated by vast distances.

I. End-to-End Cross-Region Replication Architecture

End-to-end cross-region replication architecture provides novel techniques for end-to-end file storage replication and security between file systems in different cloud infrastructure regions. In certain embodiments, a file storage service generates deltas between snapshots in a source file system, and transfers the deltas and associated data through a high-throughput object storage to recreate a new snapshot in a target file system located in a different region during disaster recovery. The file storage service utilizes novel techniques to achieve scalable, reliable, and restartable end-to-end replication. Novel techniques are also described to ensure a secure transfer of information and consistency during the end-to-end replication.

In the context of the cloud, a realm refers to a logical collection of one or more regions. Realms are typically isolated from each other and do not share data. Within a region, the data centers in the region may be organized into one or more availability domains (ADs). Availability domains are isolated from each other, fault-tolerant, and very unlikely to fail simultaneously. ADs are configured such that a failure at one AD within a region is unlikely to impact the availability of the other ADs within the same region.

Current practices for disaster recovery can include taking regular snapshots and resyncing them to another filesystem in a different Availability Domain (AD) or region. Although resync is manageable and maintained by customers, it lacks a user interface for viewing progress, is a slow and serialized process, and is not easy to manage as data grow over time.

Accordingly, different approaches are needed to address these challenges and others. The cloud service provider (e.g., Oracle Cloud Infrastructure (OCI)) file storage replication disclosed in the present disclosure is based on incremental snapshots to provide consistent point-in-time view of an entire file system by propagating deltas of changing data from a primary AD in a region to a secondary AD, either in the same or different region. As used herein, a primary site (or source side) may refer to a location where a file system is located (e.g., AD, or region) and initiates a replication process for disaster recovery. A secondary site (or target side) may refer to a location (e.g., AD or region) where a file system receives information from the file system in the primary site during the replication process to become a new operational file system after the disaster recovery. The file system located in the primary site is referred to as the source file system, and the file system located in the secondary site is referred to as the target file system. Thus, the primary site, source side, source region, primary file system or source file system (referring to one of the file systems on the source side) may be used interchangeably. Similarly, the secondary site, target side, target region, secondary file system, or target file system (referring to one of the file systems on the target side) may be used interchangeably.

The File Storage Service (FSS) of the present disclosure supports full disaster recovery for failover or failback with minimal administrative work. Failover is a sequence of actions to make a secondary/target site become primary/source (i.e., start serving workloads) and may include planned and/or unplanned failover. A planned failover (may also refer to as planned migration) is initiated by a user to execute a planned failover from the source side (e.g., source region) to the target side (e.g., a target region) without data loss. An unplanned failover is when the source side stops unexpectedly due to, for example, a disaster, and the user needs to start using the target side because the source side is lost. A failback is to restore the primary/source side before failover to become the primary/source again. A failback may occur when, after a planned or unplanned failover and the trigger event (e.g., an outage) has ended, users like to reuse the source side as their primary AD by reversing the failover process. The users can resume either from the last point-in-time on the source side prior to the triggering event, or resume from the latest changes on the target side. The replication process described in the present disclosure can preserve the file system identity after a round-trip replication. In other words, the source file system, after performing a failover and then failback, can serve the workload again.

The techniques (e.g., methods, computer-readable medium, and systems) disclosed in the present disclosure include a cross-region replication of file system data and/or metadata by using consistent snapshot information to replicate the deltas between snapshots to multiple remote (or target) regions from a source region, then walking through (or recursively visit) all the keys and values in one or more file trees (e.g. B-trees) of the source file system (sometimes referred to herein as "walking a B-tree" or "walking the keys") to construct coherent information (e.g., the deltas or the differences between keys and values of two snapshots created at different time). The constructed coherent information is put into a blob format and transferred to a remote side (e.g., a target region) using object interface, for example Object Store (to be described later), such that the target file system on the remote side can download immediately and start applying the information once it detects the transferred information on the object interface. The process is accomplished by using a control plane, and the process can be scaled to thousands of file systems and hundreds of replication machines. Both the source file system and the target file system can operate concurrently and asynchronously. Operating concurrently means that the data upload process by the source file system and the data download process by the target file system may occur at the same time. Operating asynchronously means the source file system and the target file system can each operates at their own pace without waiting for each other at every stage, for example, different start time, end time, processing speed, etc.

In certain embodiments, multiple file systems may exist in the same region and are represented by the same B-tree. Each of these file systems in the same region may be replicated across regions independently. For example, file system A may have a set of parallel running replicator threads walking a B-tree to perform replication for file system A. File system B represented by the same B-tree may have another set of such parallel running replicator threads walking the same B-tree to perform replication for file system B.

With respect to security, the cross-region replication is completely secure. Information is securely transferred, and securely applied. The disclosed techniques provide isolation between the source region and the target region such that keys are not shared unencrypted between the two. Thus, if the source keys are comprised, the target is not affected. Additionally, the disclosed techniques include how to read the keys, convert them into certain formats, and upload and download them securely. Different keys are created and used in different regions, so separate keys are created on the target and applied to information in a target-centric security mechanism. For example, the FSS generates a session key, which is valid for only one replication cycle or session, to encrypt data to be uploaded from the source region to the Object Store, and decrypt the data downloaded from the Object Store to the target region. Separate keys are used locally in the source region and the target region.

In the disclosed techniques, each upload and download process through the Object Store during replication has different pipeline stages. For example, the upload process has several pipeline stages, including walking a B-tree to generate deltas, accessing storage IO, and uploading data (or blobs) to the Object Store. The download process has several pipeline stages, including downloading data, applying deltas to snapshots, and storing data in storage. Each of these pipelines also has parallel processing threads to increase the throughput and performance of the replication process. Additionally, the parallel processing threads can take over any failed processing threads and resume the replication process from the point of failure without restarting from the beginning. Thus, the replication process is highly scalable and reliable.

FIG. 1 depicts an example concept of recovery point objective (RPO) and recovery time objective (RTO) for an unplanned failover, according to certain embodiments. RPO is the maximum tolerance for data loss (usually specified as minutes) between the failure of a primary site and the availability of a secondary site. As shown in FIG. 1, the primary site A 102 encounters an unplanned incident at time 110, which triggers a failover replication process by copying the latest snapshot and its deltas to the secondary site B 104. The initially copied information reaches the secondary site B 104 at time 112. The primary site A 102 completes its copying of information to the secondary site B 104 at time 114, and the secondary site B 104 completes its replication process at time 116. Thus, the secondary site B 104 becomes fully operational at time 116. As a result, the user's data is not accessible in the primary site A 110, starting from point 110 until point 116, when that data is available again. Therefore, RPO is the time between point 110 and point 116. For example, if there is 10-minute worth of data that a user does not care about, then RPO is 10 minutes. If the data loss is more than 10 minutes, the RPO is not met. A zero RPO means a synchronous replication.

RTO is the time it takes for the secondary to be fully operational (usually specified as minutes), so a user can access the data again after the failure happens. It is considered from the secondary site's perspective. Referring back to FIG. 1, the primary site A 102 starts the failover replication process at time 120. However, the secondary site B 104 is still operational until time 122 when it is aware of the incident (or outage) at the primary site A 102. Therefore, the secondary site B 104 stops its service at time 122. Using the similar failover replication process described for RPO, the secondary site B 104 becomes fully operational at time 126. Therefore, the RTO is the time between 122 and 126. The secondary site B 104 can now assume the role of the primary site. However, for customers who use primary site A 102, the loss of service is between time 120 and 126.

The primary (or source) site is where the action is happening, and the secondary (or target) site is inactive and not usable until there is a disaster. However, customers can be provided some point in time for them to continue to use for testing-related activities in the secondary site. It is about how customers set up the replication and how they can start using the target when something goes wrong, and how they come back to the source once their sources have failover.

Figure 2:
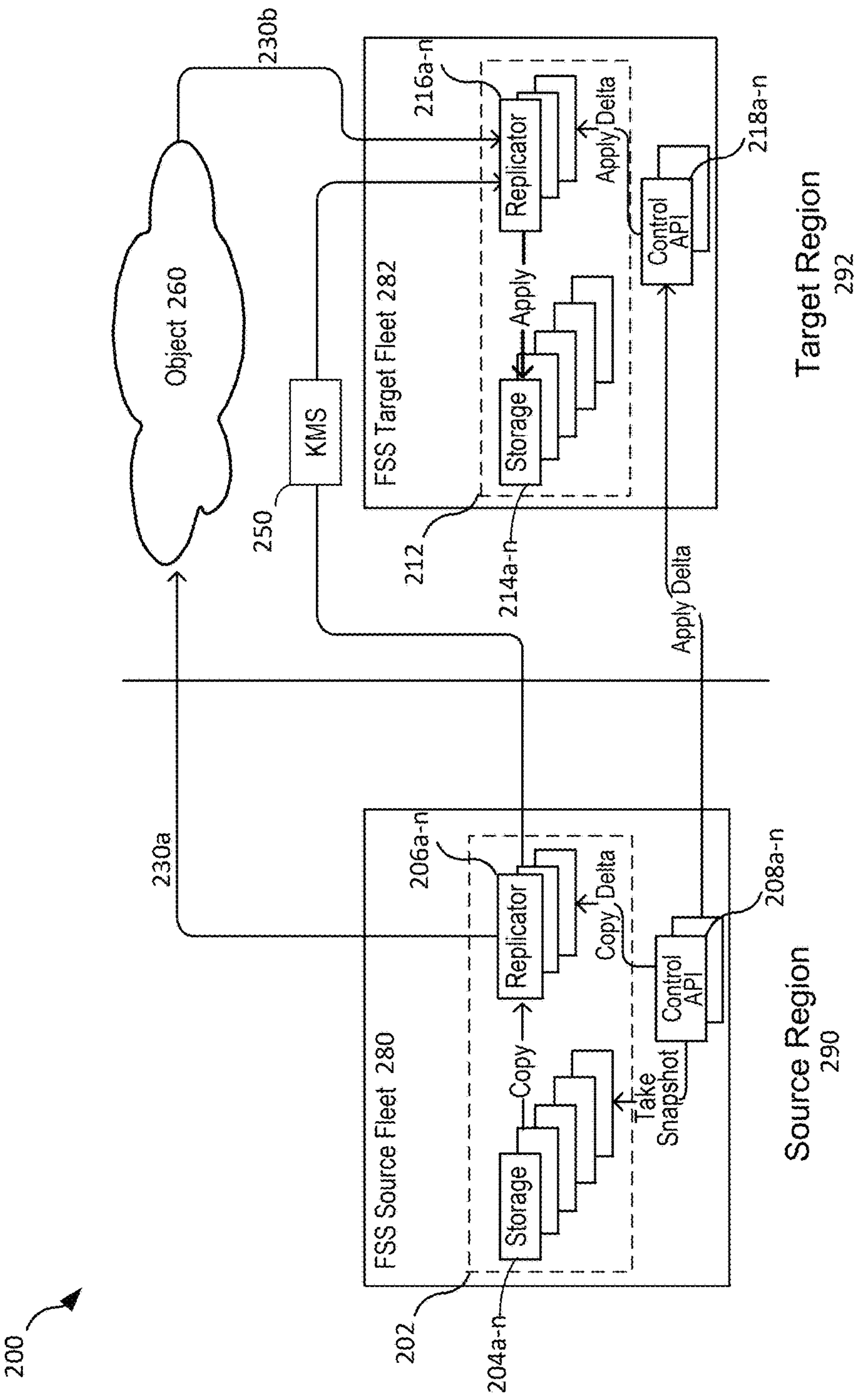
FIG. 2 is a simplified block diagram illustrating an architecture for cross-region remote replication, according to certain embodiments.

FIG. 2 is a simplified block diagram illustrating an architecture for cross-region remote replication, according to certain embodiments. In FIG. 2, the end-to-end replication architecture illustrated has two regions, a source region 290 and a target region 292. Each region may contain one or more file systems. In certain embodiments, the end-to-end replication architecture includes data planes 202 & 212, control planes (only control APIs 208*a-n* & 218*a-n* are shown), local storages 204 & 214, Object Store 260, and Key Management Service (KMS) 250 for both source region 290 and target region 292. FIG. 2 illustrates only one file system 280 in the source region 290, and one file system 282 in the target region 292 for simplicity. If there is more than one file system in a region, the same replication architecture applies to each pair of source and target file systems. In certain embodiments, multiple cross-region replications may occur concurrently between each pair of source and target file systems by utilizing parallel processing threads. In some embodiments, one source file system may be replicated to different target file systems located in the same target region. Additionally, file systems in a region may share resources. For example, KMS 250, Object Store 260, and certain resources in data plane may be shared by many file systems in the same region depending on implementations.

The Data planes in the architecture includes local storage nodes 204*a-n* & 214*a-n* and replicators (or a replicator fleet) 206*a-n* & 216*a-n*. A control API host in each region does all the orchestration between different regions. The FSS receives a request from a customer to set up a replication between a source file system 280 and a target file system 282 to which the customer wants to move its data. The control plane 208 gets the request, does the resource allocation, and informs the replicator fleet 206*a-n* in the source data plane 202 to start uploading the data 230*a* (or may be referred to as deltas being uploaded) from different snapshots to an object storage 260. APIs are available to help customers set replication time objective and recovery time objective (RTO). The replication model disclosed in the present disclosure is a "push based" model based on snapshot deltas, meaning that the source region initiates the replication.

As used herein, the data 230*a* and 230*b* transferred between the source file system 280 and the target file system 282 is a general term, and may include the initial snapshot, keys and values of a B-tree that differ between two snapshots, file data (e.g., fmap), snapshot metadata (i.e., a set of snapshot B-tree keys that reflect various snapshots taken in the source file system), and other information (e.g., manifest files) useful for facilitating the replication process.

Turning to the data planes of the cross-region replication architecture, a replicator is a component in the data plane of a file system. It performs either delta generation or delta application for that file system depending on the region where the file system locates. For example, replicator fleet 206 in a source region file system 280 performs delta 230*a* generation and replication. Replicator fleet 216 in a target region file system 282 downloads deltas 230*b* and applies them to the latest snapshot in the target region file system 282. The target region file system 282 can also use its control plane and workflows to ensure end-to-end transfer.

All the incremental work is based on the snapshot, an existing resource in file storage as a service. A snapshot is a point in time, data point, or picture of what is happening in the file system, and performed periodically in the source region file system 280. For a very first replication, the FSS takes the base snapshot (e.g., no replication has ever been taken), which is a snapshot of all the content of the source file system, and transfers all of that content to the target system. In other words, replicators read from the storage layer for that specific file system and puts all the data in the object storage buckets.

Once the data plane 202 of the source file system 280 uploads all the data 230*a* to the object storage (or Object Store) 260, the source side control plane 208 will notify the target side control plane 218 that there is a new work to be done on the target side, which is then relayed to the replicators of the target side. Target side replicators 216*a-n* then start downloading the objects (e.g., initial snapshot and deltas) from the object storage bucket 260 and applying the deltas captured on the source side.

If it is a base copy (e.g., the whole file system content up to the point of time, for example, ranging from past five days to five years), the upload process may take longer. To help achieve service level objective about time and performance, the source system 280 can take replication snapshot at a specific duration, such as one hour. The source side 280 can then transfer all data within that one hour to the target side 282, and take a new snapshot every one hour. If there are some caches with a lot of changes, the replication may be set to a lower replication interval.

To illustrate the above discussion, consider a scenario that a first snapshot is created in a file system in a source region (called source file system). Replication is performed regularly; thus, the first snapshot is replicated to a file system in a target region (called the target file system). When some updates are performed in the source file system afterward, a second snapshot is created. If an unplanned outage occurs after the second snapshot is created, the source file system will try to replicate the second snapshot to the target file system. During the failover, the source file system may identify the differences (i.e., deltas) between the first and second snapshots, which include the B-tree keys and values and their associated file data in a B-tree representing both the first and second snapshots. The deltas 230*a* & 230*b* are then transferred from the source file system to the target file system through an Object Store 260 in the target region for the target file system to re-create the second snapshot by applying the deltas to its previously established first snapshot in the target region. Once the second snapshot is created in the target file system, the replication process of the failover completes, and the target file system is ready to operate.

Turning to control plan and its Application Programming Interfaces ("API"), a control plane provides instructions for data plane which includes replicators as the executor that performs the instructions. Both storage (204 & 214) and replicator fleet (206 & 216) are in the data planes. Control plane is not shown in FIG. 2. As used herein a "cycle" may refer to a time duration beginning at the time when a source file system 280 starts transferring data 230*a* to a target file system 282 and ending at the time when the target file system 282 receives all data 230*b* and completes its application of the received data. The data 230*a-b* is captured on the source side, and then applied on the target side. Once all changes on the target side are applied for a cycle, the source file system 280 takes another snapshot and starts another cycle.

Control APIs (208*a-n* & 218 *a-n*) are a set of hosts in the control plane's overall architecture, and perform file system configuration. Control APIs are responsible for communicating state information among different regions. State machines that keep track of various state activities within regions, such as the progress of jobs, locations of keys and future tasks to be performed, are distributed among multiple regions. All of these information is stored in control plane of each region, and are communicated among regions through the control APIs. In other words, the state information is about the lifecycle details, details of the delta, and the lifecycle of the resources. The state machines can also track the progress of the replication and work with the data plan to help estimate the time taken for replication. Thus, the state machines can provide status to the users on whether replications are proceeding on time and the health of jobs.

Additionally, the communication between control APIs (208*a-n*) of the source file system 280 and control APIs (218*a-n*) of target file system 218 in different regions includes the transfer of snapshots, and metadata to make exact copies from the source to the target. For example, when a customer takes snapshots periodically in the source file system, the control plane can ensure the same user snapshots are created on the target file system, including metadata tracking, transferring, and recreation.

Object Store 260 (also referred to herein as "Object") in FIG. 2 is an object storage service (e.g., Oracle's object storage service) allowing to read blobs, and write files for archival purposes. The benefits of using Object Store are: first, it is easy to configure; second, it is easy to stream data into the Object Store; and third, it has the benefit of security streaming as a reliable repository to keep information; all because there is no network loss, the data can be immediately downloaded and is permanently there. Although direct communication between Replicators in the source and target regions is possible, direct communication requires a cross-region network setup, which is not scalable and hard to manage.

For example, if there is a large amount of data to be moved from source to target, the source can upload it to the Object Store 260, and the target 282 does not have to wait for all the information to be uploaded to the Object Store 260 to start downloading. Thus, both source 280 and target 282 can operate concurrently and continuously. The use of Object Store allows the system to scale and achieve faster throughput. Furthermore, key management service (KMS) 250 can control the access to the Object Store 260 to ensure security. In other words, the source tries to move the data out of the source region as fast as possible, and persist the data somewhere before the data can be applied to the target such that the data is not lost.

Compared to using a network pipe which has packet loss and recovery issues, the utilization of Object Store 260 between the source and target regions enables continuous data streaming that allows hundreds of file systems from the source region to write to the Object Store, while at the same time, the target region can apply hundreds of files concurrently. Thus, the data streaming through the Object Store can achieve high throughput. Additionally, both the source and target regions can operate at their own rates for uploading and downloading.

Whenever a user changes certain data in the source file system 280, a snapshot is taken, and deltas before and after the change is updated. The changes may be accumulated on the source file system 280 and streamed to the Object Store 260. The target file system 282 can detect that data is available in the Object Store 260 and immediately download and apply the changes to its file system. In some embodiments, only the deltas are uploaded to the object storage after the base snapshot.

In some embodiments, replicators can communicate to many different regions (e.g., Phoenix to Ashburn to other remote regions), and the file system can manage many different endpoints on replicators. Each replicator 206 in the source file system 280 can keep a cache of these object storage endpoints, and also works with KMS 250 to generate transfer keys (e.g., session keys) to encrypt data address for the data in the Object Storage 260 (e.g., Server Side Encryption or SSE) to secure data stored in the buckets. One master bucket is for every AD in a target region. A bucket is a container storing objects in a compartment within an Object Storage namespace (tenancy). All remote clients can communicate to a bucket and write information in a particular format so that each file system's information can be uniquely identified to avoid mixing up the data for different customers or file systems.

The Object Store 260 is a high-throughput system and the techniques disclosed in the present disclosure can utilize the Object Store. In certain embodiments, the replication process has several pipeline stages, B-tree walk in the source file system 280, storage IO access, data upload to the Object Store 260, data download from the Object Store 260, and delta application in the target file system 282. Each stage has parallel processing threads involved to increase the performance of data streaming from the source region 290 to a target region 292 through the Object Store 260.

In certain embodiments, each file system in the source region may have a set of replicator threads 206*a-n* running in parallel to upload deltas to the Object Store 260. Each file system in the target region may also have a set of replicator threads 216*a-n* running in parallel to download deltas from the Object Store 260. Since both the source side and the target side operate concurrently and asynchronously, the source can upload at fast as possible, while the target can start downloading once the target detects the deltas are available in the Object Store. The target file system then applies the deltas to the latest snapshot and deletes the deltas in the Object Store after its application. Thus, the FSS consumes very little space in the Object Store, and the Object Store has very high throughput (e.g., gigabytes of transfer).

In certain embodiments, multiple threads also run in parallel for storage IO access (e.g., DASD) 204*a-n* & 214*a-n*. Thus, all processing related to the replication process, including accessing the storage, uploading snapshots and data 230*a* from the source file system 280 to the Object Store 260, and downloading the snapshots and data 230*b* to the target file system 282, have multiple threads running in parallel to perform the data streaming.

File storage is an AD local service. When a file system is created, it is in a specific AD. For a customer to transfer or replicate data from one file system to another file system within the same region or different regions, an artifact (also referred to as manifest) transfer may need to be used.

As an alternative to transferring data using Object Store, VCN peering may be used to set up network connections between remote machines (e.g., between replicator nodes of source and target) and use Classless Inter-Domain Routing ("CIDR") for each region.

Referring back to FIG. 2, Key Management System (KMS) 250 is a security for the replication, and provides storage service for cloud service providers (e.g., OCI). In certain embodiments, the file systems 280 at the source (or primary) side and target (or secondary) side use separate KMS keys, and the key management is hierarchical. The reason for using separate keys is that if the source is compromised, the bad actor cannot use the same keys to decrypt the target. The FSS has a three-layer key architecture. Because the source and target use different keys when transferring data, the source needs to decrypt the data first, re-encrypt with an intermediate key, and then re-encrypt the data on the target side. FSS defines sessions, and each session is one data cycle. A key is created for that session to transfer data. In other words, a new key is used for each new session. In other embodiments, a key may be used for more than one session (e.g., more than one data transfer) before creating another key. No key is transferred through the Object Store 260, and the keys are available only in the source side, and not visible outside the source for security reasons.

A replication cycle (also referred to as a session) is periodic and adjustable. For example, once every hour, the replicators (206*a-n* & 216*a-n*) perform a replication. A cycle starts when a new snapshot is created in the source side 280, and ends when all deltas 230*b* have been applied in the target side 282 (i.e., the target reaches DONE state). Each session completes before another session starts. Thus, only one session exists at any time, and there is no overlap between sessions.

Secret management (i.e., replication using KMS) handles secret material transfer between the source (primary) file system 290 and the target (or secondary) file system 292 utilizing KMS 250. The source file system 280 computes deltas, reads file data, and then uses local file system encryption keys, and works with Key Management Service to decrypt the file data. Then, the source file system 280 generates a session key (called delta encryption key (DEK)), encrypts it to become an encrypted session key (called delta transfer key (DTK)), and transfers the DTK to the target file system 282 through their respective control planes 208 & 218. The source file system 280 also uses DEK to encrypt data 230*a* and upload them to the Object Store 260 through Transport Layer Security (TLS) protocol. The Object Store 260 then uses server side encryption (SSE) to ensure the security of the data (e.g., deltas, manifests, and metadata) 230*a* for storing.

The target file system 282 obtains the encrypted session key DTK securely through its control plane 218 (using HTTPS via cross-region API communication), decrypts it via KMS 250 to obtain DEK, and places it in a location in the target region 292. When a replication job is scheduled in the target file system 282, the DEK is given to the replicator (one of the replication fleet 216*a-n*), and the replicator uses the key to decrypt the data (e.g., deltas including file data) 230*b* download from the Object Store 260 for application and re-encrypts file data with its local file system keys.

The replication between the source file system 280 and target file system 282 is a concurrent process, and both the source file system 280 and target file system 282 operate at their own pace. When the source side completes the upload, which may occur earlier than the target's download process, the source side cleans up its memory and remove all the keys. The term, cleanup or cleaning up, may refer to removing or deleting. When the target completes its application of the deltas to its latest snapshot, it cleans up its memory and removes all keys as well. The FSS service also releases the KMS key. In other words, there are two copies of the session key, one in the source file system 280 and another in the target file system 282. Both copies are removed by the end of each session, and a new session key is generated in the next replication cycle. This process ensures that the same keys are not used for different purposes. Additionally, the session key is encrypted by a file system key to create a double protection. This is to ensure only a particular file system can use this session key.

Figure 3:
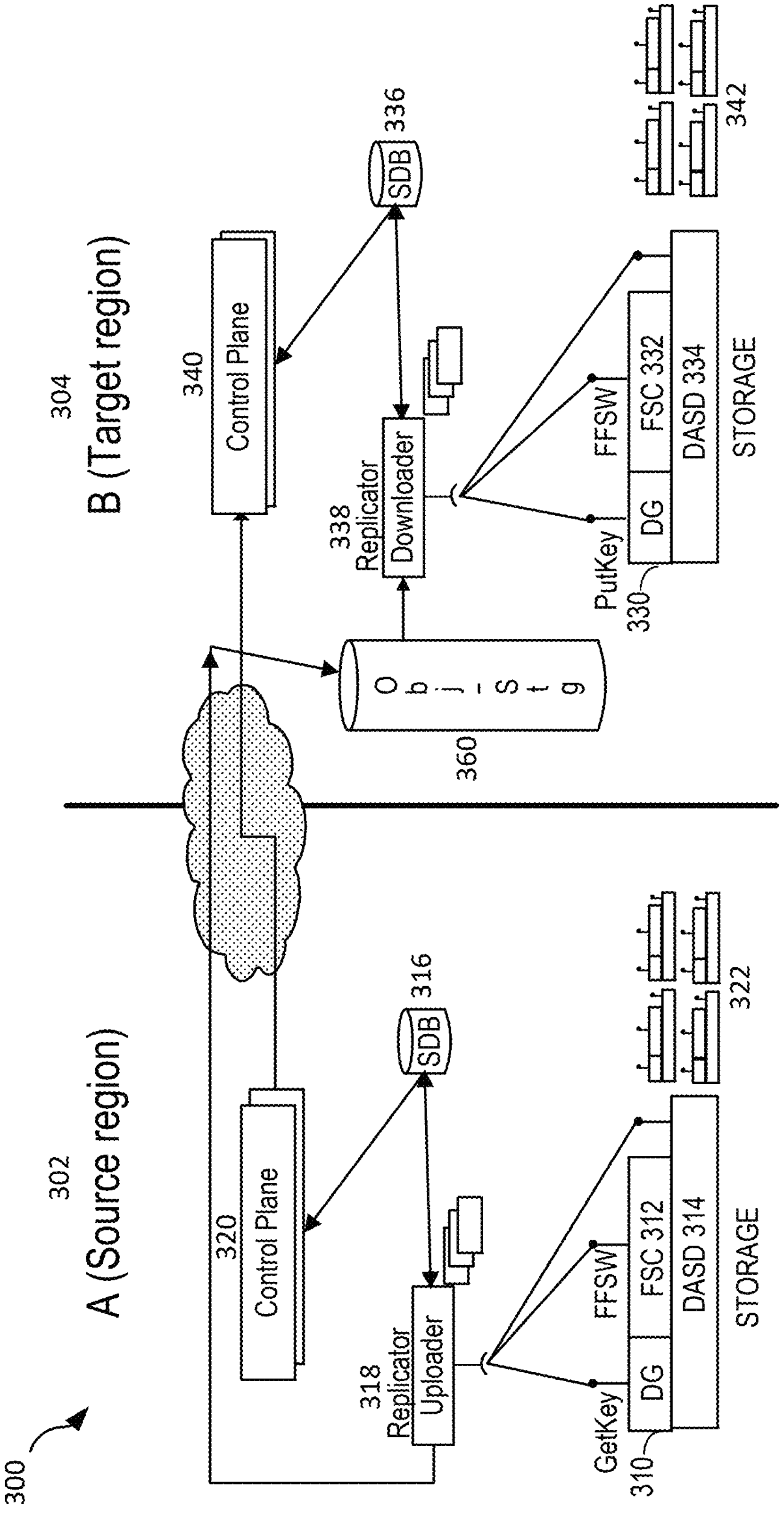
FIG. 3 is a simplified schematic illustration of components involved in cross-region remote replication, according to certain embodiments.

FIG. 3 is a simplified schematic illustration of components involved in cross-region remote replication, according to certain embodiments. In certain embodiments, a component called delta generator (DG) 310 in source region A 302 and 330 in target region B 304 is part of the replicator fleet 318 and runs on thousands of storage nodes in the fleet. A replicator 318 in source region A does Remote Procedural Call (RPC) (e.g., getting key-value set, lock blocks, etc.) to a delta generator 310 to collect B-tree keys and values, and data pages from Direct-Access Storage Device (DASD) 314, which is a replication storage service for accessing the storage, and considered a data server. The DG 310 in source region A is a helper to the replicator 318 to break the key ranges for a delta and pack all the key/values for a given range into a blob to be sent back to the replicator 318. There are multiple storage nodes 322 & 342 attached to DASDs 314 & 334 in both regions, where each node has many disks (e.g., 10 TBs or more).

In certain embodiments, the file system communicators (FSC) 312 & 332 in both regions is a metadata server that helps update the source file system for user updates to the system. FSCs 312 & 332 are used for file system communication, and the delta generator 310 is used for replication. Both the DGs 310 & 330 and the FSCs 312 & 332 are metadata servers. User traffic goes through the FSCs 312 & 332 and DASDs 314 & 334, while replication traffic goes through the DGs. In an alternative embodiment, the FSC's function may be merged into that of DG.

In certain embodiment, a shared databases (SDBs) 316 & 336 of both regions are key-value stores that the components through which both the control plane and data plane (e.g., replicator fleet) can read and write for them to communicate with each other. Control planes 320& 340 of both regions may queue a new job into their respective shared databases 316 & 336, and replicator fleet 318 & 338 may read the queues in the shared databases 316 & 336 constantly and start file system replication once the replicator fleet 318 & 338 detect the job request. In other words, the shared databases 316 & 336 are a conduit between the replicator fleet and the control planes. Further, the shared databases 316 & 336 are a distributed resource throughout different regions, and the IO traffic to/from the shared databases 316 & 336 should be minimized. Similarly, the IO traffic to/from DASD needs to be minimized to avoid affecting the user's performance. However, the replication process may occasionally be throttled because it isa secondary service, compared to the primary service.

Replicator fleet 318 in source region A can work with DG 310 to start walking B-tree in the file system in source region A to collect key-values and convert them into flat files or blobs to be uploaded to the Object Store. Once the data blobs (including key-values and actual data) are uploaded, the target can immediately apply them without waiting for a large number of blobs to be present in the Object Store 360. The Object Store 360 is located in the target region B for disaster recovery reasons. The goal is to push from source to the target region B as soon as possible and keep the data safe.

There are many replicators to replicate thousands of file systems by utilizing low-cost machines with smaller footprints to optimize the space, and scheduling as many replications as possible while ensuring a fair share of bandwidth among them. Replicator fleet 318 & 338 in both regions run on virtual machines that can be scaled up and down automatically to build an entire fleet for performing replication.

The replicators and replication service can dynamically adjust based on the capacity to support each job. If one replicator is heavily loaded, another can pick up to share the load. Different replicators in the fleet can balance load among themselves to ensure the jobs can continue and do not stop due to overloading individual replicators.

Figure 4:
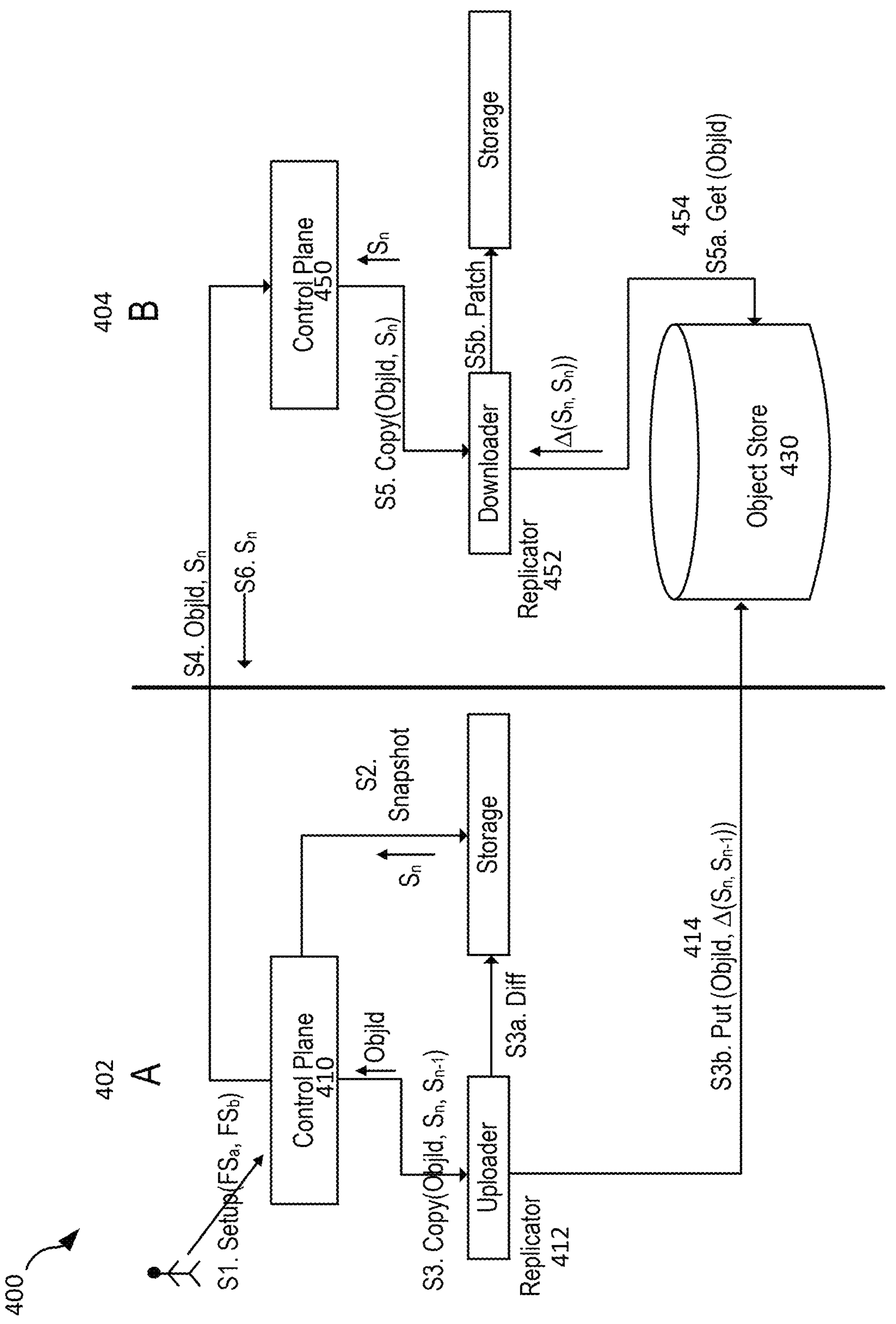
FIG. 4 is a simplified flow diagram illustrating the steps executed during cross-region remote replication, according to certain embodiments.

FIG. 4 is a simplified flow diagram illustrating the steps executed during cross-region remote replication, according to certain embodiments.

Step S1: When a customer sets up replication, the customer provides the source (or primary) file system (A) 402, target (or secondary) file system (B) 404 and the RPO. A file system is uniquely identified by a file system identification (e.g., Oracle Cloud ID or OCID), a globally unique identifier for a file system. Data is stored in the file storage service ("FSS")control plane database.

Step S2: Source (A) control plane (CP-A) 410 orchestrates creating system snapshots periodically at an interval (smaller than RPO) and notifies the data plane (including replicator/uploader 412) the latest snapshot, and the last snapshot that was successfully copied to the target (B) file system 404.

Step S3: CP-A 410 notifies replicator 412 (or uploader), a component in the data plane, to copy the latest snapshot:

S3a: Replicator 412 in Source (A) walks the B-Tree to compute the deltas between the two given snapshots. The existing key infrastructure is used to decrypt the file system data.

S3b: These deltas 414 are uploaded to the Object Store 430 in target (B) region (the data may be compressed, and/or de-duplicated during the copy). This upload may be performed by multiple replicator threads 412 in parallel.

Step S4: CP-A 410 notifies the target (B) control plane (CP-B) 450 about the completion of the upload.

Step S5: CP-B 450 calls the target replicator-B 452 (or downloader) to apply the deltas:

S5a: Replicator-B 452 downloads the data 454 from Object Store 430.

S5b: Replicator-B 452 applies these deltas to the target file system (B).

Step S6: CP-A 410 is notified of the new snapshot now available on target (B) after the delta application is complete.

Step 7: The cross-region remote replication process repeats from step S2 to step S6.

Figure 5:
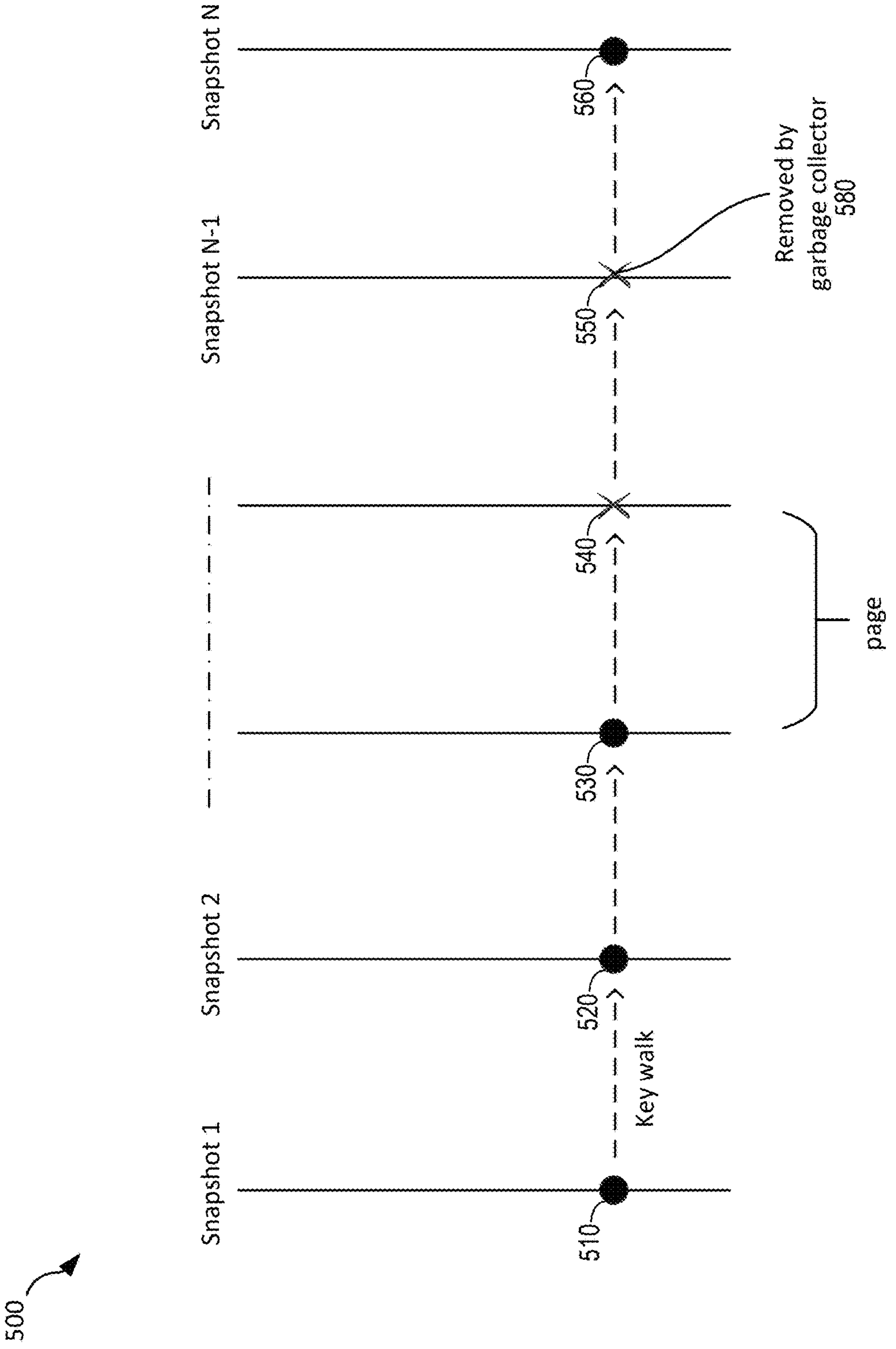
FIG. 5 is a simplified diagram illustrating the high-level concept of B-tree walk, according to certain embodiments.

FIG. 5 is a simplified diagram illustrating the high-level concept of B-tree walk, according to certain embodiments. B-tree structure may be used in a file system. A delta generator walks the B-tree and guarantees consistency for the walk. In other words, the walk ensures that the key-values are what is expected at the end of the walk and captures all information between any two snapshots, such that no data corruption may occur. The file system is a transactional type of file system that may be modified, and the users need to know about the modification and redo the transactions because another user may update the same transaction or data.

Key-values and snapshots are immutable (e.g., cannot be modified except garbage collector can remove them). As illustrated in FIG. 5, there are many snapshots (snapshot 1~snapshot N) in the file systems. When a delta generator is walking the B-tree keys (510~ 560) in a source file system, snapshots may be removed because a garbage collector 580 may come in to clean the keys of the snapshots that deem as garbage. When a delta generator walks the B-tree keys, it needs to ensure the keys associated with the remaining snapshots (e.g., not removed by the garbage collector) are copied. When keys, for example, 540 and 550, are removed by garbage collector 580, the B-tree pages may shrink, for example from two pages before garbage collection down to one page after garbage collection. The way a delta generator can ensure consistency when walking B-tree keys is to confirm that the garbage collector 580 has not modified or deleted any keys for the page (or a section between two snapshots) that the delta generator has just walked (e.g., between two keys). Once the consistency is confirmed, the delta generator collects the keys and sends them to replicator to process and upload.

The B-tree keys may give a picture of what has changed. The techniques disclosed in the present disclosure can determine what B-tree keys are new and what have been updated between two snapshots. A delta generator may collect the metadata part, keys and values, and associated data, then send to the target. The target can figure out that the received information is between two snapshot ranges and applies in the target file system. After the delta generator (or delta generator threads) walks a section between two keys and confirms its consistency, it uses the last ending key as the next starting key for its next walk. The process is repeated until all keys have been checked, and the delta generator collects the associated data every time consistency is confirmed.

For example, in a file system, when a file is modified (e.g., created, deleted, and then re-created), this process creates several versions of corresponding file directory entries. During a replication process, the garbage collector may clean up (or remove or delete) a version of the file directory entry corresponding to the deleted file and cause a consistency problem called whiteout. Whiteout occurs if there is an inconsistency between the source file system and the target file system because the target file system may fail to reconstruct the original snapshot chain involving the modified file. The disclosed techniques can ensure the consistency between the source file system and the target file system by detecting a whiteout file (i.e., a modified file affected by the garbage collector) during B-tree walk, retrieving an unaffected version of the modified file, and providing relevant information to the target file system during the same replication cycle to properly reconstruct the correct snapshot chain.

Figure 6B:
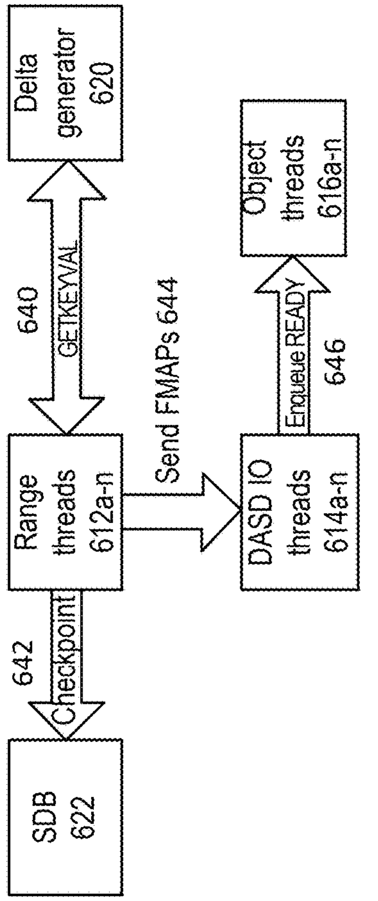
FIG. 6B is a diagram illustrating pipeline stages of cross-region replication, according to certain embodiments.
Figure 6A:
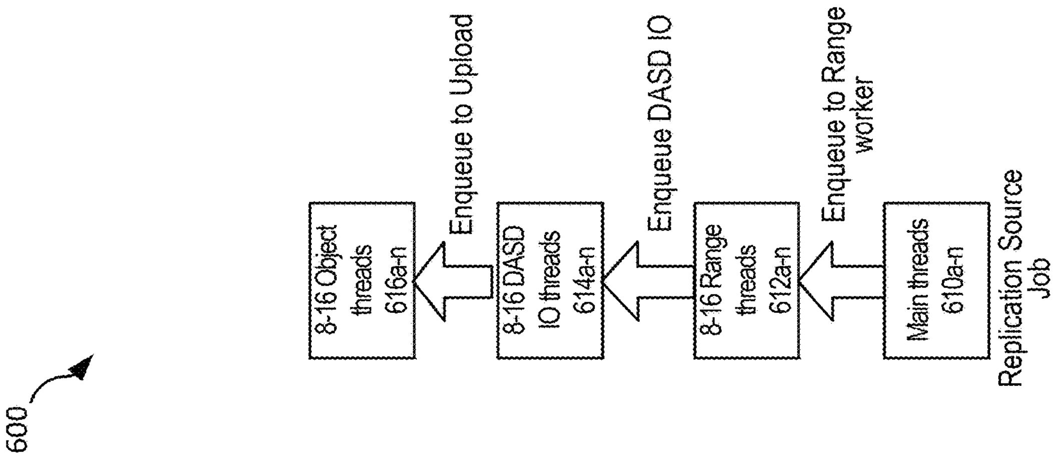
FIG. 6A is a diagram illustrating pipeline stages of cross-region replication, according to certain embodiments.

FIGS. 6A and 6B are diagrams illustrating pipeline stages of cross-region replication, according to certain embodiments. The cross-region replication for a source file system disclosed in the present disclosure has four pipeline stages, namely initiation of the cross-region replication, B-tree walk in the source file system (i.e., delta generation pipeline stage), storage IO access for retrieving data (i.e., data read pipeline stage), data upload to the Object Store (i.e., data upload pipeline stage), in the source file system. The target file system has similar four pipeline stages but in reverse order, namely preparation of cross-region replication, data download from the Object Store, delta application in the target file system, and storage IO access for storing data. FIG. 6A illustrates the four pipeline stages in the source file system, but a similar concept applies to the target file system. FIG. 6B illustrates the interaction among the processes and components involved in the pipeline stages. All of these pipeline stages may operate in parallel. Each pipeline stage may operate independently and hand off information to the next pipeline stage when the processing in the current stage completes. Each pipeline stage is ensured to take a share of the entire bandwidth and not use more than necessary. In other words, resources are allocated fairly among all jobs. If no other job is working in the system, the working job can get as many resources as possible.

The threads in each pipeline stage also perform their tasks in parallel (or concurrently) and independently of each other in the same pipeline stage (i.e., if a thread fails, it will not affect other threads) . . . . Additionally, the tasks (or replication jobs) performed by the threads in each pipeline stage are restartable, which means when a thread fails, a new thread (also referred to as substitute thread) may take over the failed thread to continue the original task from the last successful point.

In some embodiments, a B-tree walk may be performed with parallel processing threads in the source file system 280. A B-tree may be partitioned into multiple key ranges between the first key and the last key in the file system. The number of key ranges may be determined by customers. Multiple range threads (e.g., around 8 to 16) per file system may be used for the B-tree walk. One range thread can perform the B-tree walk for a key range, and all range threads operate concurrently and in parallel. The number of threads to be used depends on factors such as the size of the file system, availability of resources, and bandwidth in order to balance the resource and traffic congestion. The number of key ranges is usually more than the number of range threads available to utilize the range threads fully. Thus, the B-tree walk can be scalable and processed by concurrent parallel walks (e.g., with multiple threads).

If some keys are not consistent after the delta generator walks a page because some keys do not exist, the system may drop a transaction that is in progress and has not been committed yet, and go back to the starting point to walk again. During the repeat B-tree walk due to inconsistency, the delta generator may ignore the missing keys and their associated data by not collecting them to minimize the amount of information to be processed or uploaded to the target side since these associated data are deemed garbage. Thus, the B-tree walk and data transfer can be more efficient. Additionally, a delta generator does not need to wait for the garbage collector to remove the information to be deleted before walking the B-tree keys. For example, keys have dependencies on each other. If a key or an iNode points to a block that is deleted or should be deleted by the garbage collector, the system (or delta generators) can figure out by itself that the particular block is garbage and delta generators do not need to carry it.

Delta generators typically do not modify anything on the source side (e.g., does not delete the keys or blocks of data deemed garbage) but simply does not copy them to the target side. The B-tree walk process and garbage collection are asynchronous processes. For example, when a block of data that a key points to no longer exists, the file system can flag the key as garbage and note that it should not be modified (e.g., immutable), but only the garbage collector can remove it. A delta generator can continue to walk the next key without waiting for the garbage collector. In other words, delta generators and garbage collectors can proceed at their own pace.

In FIG. 6A, when a source region initiates a cross-region replication process, which may involve many file systems, main threads 610*a-n* pick up the replication jobs, one job per file system. A main thread (e.g., 610*a* or 610 for later use) of a file system in the source region (i.e., source file system) communicates to delta generator 620 (shown in FIG. 6B) to obtain the number of key ranges requested by a customer, and update a corresponding record in SDB 622. Once the main thread 610 of the source file system figures out the required number of key ranges, it further creates a set of range threads 612*a-n* based on the required number of key ranges. These range threads 612*a-n* are performed by the delta generator 620. They initialize their GETKEYVAL buffers 640 (shown in FIG. 6B), update their checkpoint records 642 in SDB 622 (shown in FIG. 6B), and perform storage IO access 644 by interacting with DASD IO threads 614*a-n*.

In certain embodiments, each main thread 610 is responsible for overseeing all the range threads 612*a-n* it creates. During the replication, the main thread 610 may generate a master manifest file outlining the whole replication. The range threads 612*a-n* generate a range manifest file including the number of key ranges (i.e., a sub-division of the whole replication), and then checkpoint manifest (CM) files for each range to provide updates to the target file system about the number of blobs per checkpoint, where checkpoints are created during the B-tree walk. One checkpoint is created by a range thread 612. Once the main thread 610 determines all the range threads 612*a-n* have been completed, it creates a final checkpoint manifest (CM) file with an end-of-file marking, and then uploads the CM file to the Object Store for the target file system to figure out the progress in the source file system. The CM file contains a summary of all individual ranges, such as range count, the final state of checkpoint record, and other information.

The range threads 612*a-n* are used for parallel processing to reduce time significantly for the B-tree walk for a big source file system. In certain embodiments, the B-tree keys are partitioned into roughly equal-sized ranges. One range thread can perform the B-tree walk for a key range. The number of range threads 612*a-n* to be used depends on factors such as the size of the file system, availability of resources and bandwidth to balance the resource, amount of data to generate and traffic congestion. The number of key ranges are usually more than the number of range threads 612*a-n* available to fully utilize the range threads, around 2× to 4× ratio. Each of the range threads 612*a-n* has a dedicated buffer (GETKEYVAL) 640 containing available jobs to work on. Each range thread 612 operates independent of other range threads, and updates its checkpoint records 642 in SDB 622 periodically.

When the range threads 612*a-n* are walking the B-tree (i.e., recursively visiting every node of the B-tree), they may need to collect file data associated (e.g., FMAP) with B-tree keys and request IO access 644 to storage. These IO requests are enqueued by each range thread 612 to allow DASD IO threads 614*a-n* (i.e., data read pipeline stage) to work on them. These DASD IO threads 614*a-n* are common threads shared by all range threads 612*a-n*. After DASD IO threads 614*a-n* have obtained the requested data, the data is put into an output buffer 646 to serialize it into blobs for object threads 616*a-n* (i.e., data upload pipeline stage) of the replicators to upload to the Object Store located in the target region. Each object thread picks up an upload job that may contain a portion of all data to be uploaded, and all object threads perform the upload in parallel.

Figure 7:
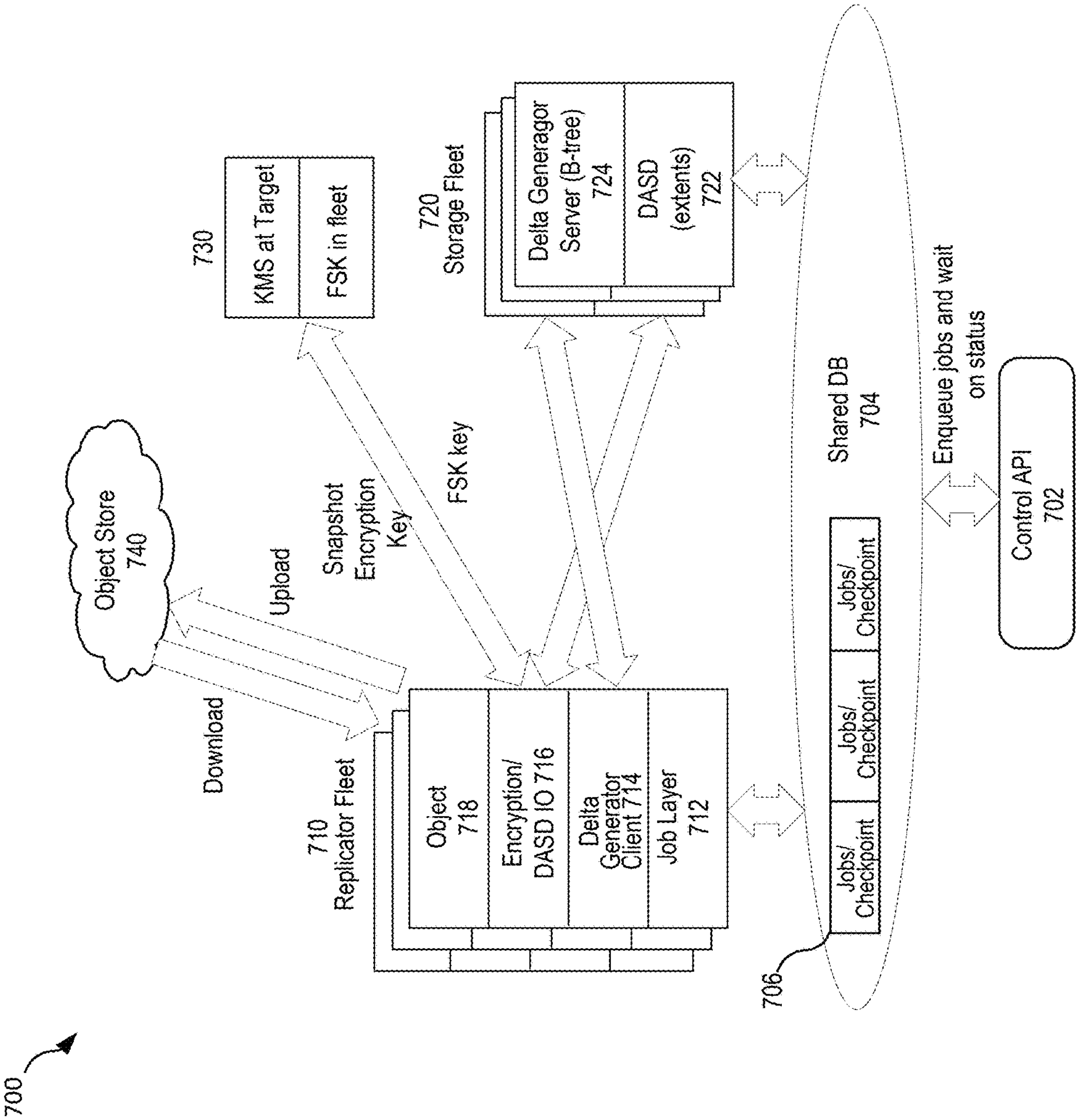
FIG. 7 is a diagram illustrating a layered structure in file storage service (FSS) data plane, according to certain embodiments.

FIG. 7 is a diagram illustrating a layered structure in the FSS data plane, according to certain embodiments. In FIG. 7, the replicator fleet 710 has four layers, job layer 712, delta generator client 714, encryption/DASD IO 716, and Object 718. The replicator fleet 710 is a single process responsible for interacting with the storage fleet 720, KMS 730, and Object Storage 740. In certain embodiments, the job layer 712 polls the SDB 704 for enqueued jobs 706, either upload jobs or download jobs. The replicator fleet 710 includes VMs (or threads) that pick up the enqueue replication jobs to their maximum capacity. Sometimes, a replicator thread may own a part of a replication job, but it will work together with another replicator thread that owns the rest of the same replication job to complete the entire replication job concurrently. The replication jobs performed by the replicator fleet 710 are restartable in that if a replicator thread fails in the middle of replication, another replicator thread can take over and continue from the last successful point to complete the job the failed replicator thread initially owns. If a strayed replicator thread (e.g., fails and wakes up again) conflicts with another replicator thread, FSS can use a mechanism called generation number to avoid the conflict by making both replicator threads update different records.

The delta generator client layer 714 performs B-tree walking by accessing the delta generator server 724, where the B-tree locates, in storage fleet 720. The encryption/DASD IO layer 716 is responsible for security and storage access. After the B-tree walk, the replicator fleet 710 may request IO access through the encryption/DASD IO layer 716 to access DASD extents 722 for file data associated with the deltas identified during the B-tree walk. Both the replicator fleet 710 and storage fleet 720 update control API 702 their status (e.g., checkpoints and leasing for replicator fleet 710) through SDB 704 regularly to allow the control API 702 to trigger alarms or take actions when necessary.

The encryption/DASD IO layer 716 interacts with KMS and FSK fleet 730 at the target side to create session keys (or snapshot encryption key) during a cross-region replication process, and use FSK for encrypting and decrypting the session keys. Finally, object layer 718 is responsible for uploading deltas and file data from the source file system to the Object Store 740 and downloading them to the target file system from the Object Store 740.

The Data plane of FSS is responsible for delta generation. The data plane uses B-tree to store FSS data, and the B-tree has different types of key-value pairs, including but not limited to, leader block, superblock, iNode, file name keys, cookie map (cookie related to directory entries), and block map (for file contents data, also referred to as FMAP).

These B-tree keys are processed by replicators and delta generators in the data plane together. Algorithms for computing the changed key-value pairs (i.e., part of deltas) between two given snapshots in a file system can continuously read the keys, and return the keys back to replicators using transaction budgets, and ensure that transactions are confirmed at the end to get consistent key-value pairs for processing.

In other embodiments, the delta generation and calculation may be scalable. The scalable approach can utilize multiple threads to compute deltas (i.e., the changes of key-value pairs) between two snapshots by breaking a B-tree into many key ranges. A pool of threads (i.e., the delta generators) can perform the scanning of the B-tree (i.e., walking the B-tree) and calculate the deltas in parallel.

Figure 8:
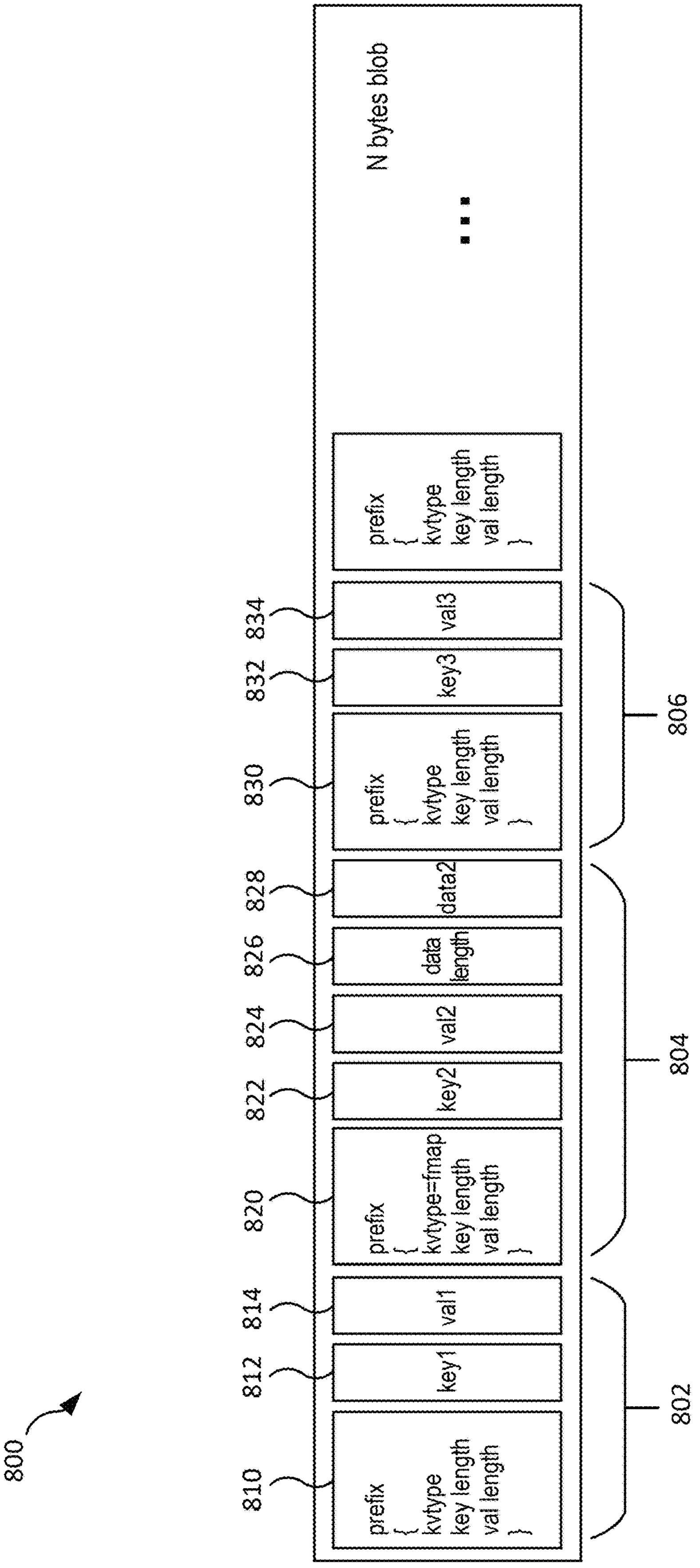
FIG. 8 depicts a simplified example binary large object (BLOB) format, according to certain embodiments.

FIG. 8 depicts a simplified example binary large object (BLOB) format, according to certain embodiments. A blob is a data type for storing information (e.g., binary data) in a database. Blobs are generated during replication by the source region and uploaded to the Object Store. The target region needs to download and apply the blobs. Blobs and objects may be used interchangeably depending on the context.

During the B-tree walk, when a delta generator encounters an iNode and its block map (also referred to as FMAP, data associated with a B-tree key) for a given file (i.e., the data content), the delta generator works with replicators to traverse all the pages in the blocks (FMAP blocks) inside DASD extent that the FMAP points to and read them into a data buffer, decrypt the data using a local encryption file key, put into an output buffer to serialize it into blob for replicators to upload to the Object Store. In other words, the delta generators need to collect all FMAPs for an identified delta to get all the data related to the differences between the two snapshots.

A snapshot delta stored in the Object Store may span over many blobs (or objects if stored in the Object Store). The blob format for these blobs has keys, values, and data associated with the keys if they exist. For example, in FIG. 8, the snapshot delta 800 includes at least three blobs, 802, 804 and 806. The first blob 802 has a prefix 810 indicating the key-value type, key length and value length, followed by its key 812 (key1) and value 814 (val1). The second blob 804 has a prefix 820 (key-value type, key length and value length), key 822 (key2), value 824 (val2), data length 826 and data 828 (data2). In the prefix 820 of this second blob 804, its key-value type is fmap because this blob has additional data 828 associated with the key 822. The third blob 830 has a similar format to that of the first blob 810, for example, prefix 830, key 832 (key3), and value 834 (val3).

Data is decrypted, collected, and then written into the blob. All processes are performed parallelly. Multiple blobs can be processed and updated at the same time. Once all processes are done, data can be written into the blob format (shown in FIG. 8), then uploaded to the Object Store with a format or path names (illustrated in FIG. 9).

FIG. 9 depicts an example replication bucket format, according to certain embodiments. A "bucket" may refer to a container storing objects in a compartment within an object storage namespace. In certain embodiments, buckets are used by source replicators to store secured data using server-side encryption (SSE) technique and also used by target replicators to download for applying changes to snapshots. The replication data for all filesystems for a target region may share a bucket in that region.

The data layout of a bucket in the Object Store has a directory structure that includes, but not limited to, file system ID (e.g., Oracle Cloud ID), deltas with starting snapshot number and ending snapshot number, manifest describing the content of the information in the layout of the objects, and blobs. For example, the bucket in FIG. 9 contains two objects 910 & 930. The first object 910 has two deltas 912 & 920. It starts with a path name 911 using the source file system ID as a prefix (e.g., ocid 1.filesystem.oc 1.iad . . . ), the first delta 912 that is generated from snapshot 1 and snapshot 2, and a second delta 920 generated from snapshot 2 and snapshot 3. Each delta has one or more blobs representing the content for that delta. For the first delta 912, it has two blobs 914 & 916 stored in the sequence of their generation. For the second delta 920, it has only one blob 922. Each delta also has a manifest describing the content of the information in the layout of this delta, for example, manifest 918 for the first delta 912 and manifest 924 for the second delta 920. Manifest in a bucket is content that describes the deltas, for example, the file system numbers and snapshot ranges, etc. The manifest may be a master manifest, range manifest or checkpoint manifest, depending on the stage of replication process.

The second object 930 also has two deltas 932 & 940 with a similar format starting with a path name 931. The two objects 910 & 930 in the bucket come from different source regions, IAD for object 910 and PHX for object 930, respectively. Once a blob is applied, the corresponding information in the layout can be removed to reduce space utilization.

A final manifest object (i.e., the checkpoint manifest, CM file) is uploaded from the source region to the Object Store to indicate to the target region that the source file system has completed the snapshot delta upload for a particular object. The source CP will communicate this event to the target CP, where the target CP can inform the target DP via SDB to trigger the download process for that object by target replicators.

The control plane in a source region or target region orchestrates all of the replication workflows, and drives the replication of data. The control plane performs the following functions: 1) creating system snapshots that are the basis for creating the deltas; 2) deciding when such snapshots need to be created; 3) initiating replication based on the snapshots; 4)monitoring the replication; 5) triggering the deltas to be downloaded by the secondary (or target side), and; 6) indicating to the primary (or source) side that snapshot has reached the secondary.

A file system has a few operations to handle its resources, including, but not limited to, creating, reading, updating, and deleting (CRUD). These operations are generally synchronous within the same region, and take up workflows as the file system gets HTTPS request from API servers, make changes in the backend for creating resources, and get responses back to customers. The resources are split between source and target regions. The states are maintained for the same resources between the source and target regions. Thus, asynchronous communication between the source and target regions exists. Customers can contact the source region to create or update resources, which can be automatically reflected to the secondary or auxiliary resources in the target region. The state machine in control plane also covers recovery in many aspects, including but not limited to, failure in the fleet, key management failure, disk failure, and object failure, etc.

Turning to Application Programming Interface (API) in the control plane, there are different APIs for users to configure the replication. Control APIs for any new resource work only in the region where the object is created. In a target file system, a field called "IsTargetable" in its APIs can be set to ensure that the target file system undergoing replication cannot be accidentally used by a consumer. In other words, setting this field to be false means that although a consumer can see the target file system, no one can export the target file system or access any data in the live system. Any export may change the data because the export is a read/write permission to export, not read-only permission. Thus, export is not allowed to prevent any change to the target file system during the replication process. The consumer can only access data in old snapshots that have already been replicated. All newly created or cloned file systems can have this field set to true. The reason is that a target can only get data from a single source. Otherwise, a collision may occur when data is written or deleted. The system needs to know whether or not the target file system being used is already part of some replication. A "true" setting for the "IsTargetable" field means no replication is on-going, and a "false" setting means the target file system cannot be used.

Regarding cross-region communication between control plane components, a primary resource on the source file system is called application, and an auxiliary (or secondary) source on the target file system is called an application target. When a source object and a target object are created, they have a single replication relationship. Both objects can only be updated from the source side, including changing compartments, editing, or deleting details. When a user wants to delete the target side, the replication can be deleted by itself. For a planned failover, the source side can be deleted, and both the source side and target replication are deleted. For an unplanned failover, the source side is not available, so only the target replication can be deleted. In other words, there are two resources for a single replication, and they should be kept in sync. There are various workflows for updating metadata on both the source and target sides. Additionally, retries, failure handling, and cross-region APIs for failover are also part of the cross-region communication process.

When the source creates necessary security and other related artifacts, it uploads the security and the artifacts to the Object Store, and initiates a job on the target (i.e., notifies the target that a job is available), and the target can start downloading the artifacts (e.g., snapshots or deltas). Thereafter, the target continues to keep looking in the Object Store for an end-of-file marker (also referred to herein as checkpoint manifest (CM) file). The CM file is used as a mechanism for the source side and target side to communicate the completion of the upload of an object during the replication process. At every checkpoint, the source side uploads this CM file containing information, such as the number of blobs that have been uploaded up to this checkpoint, such that the target side can download this number of blobs to apply to its current snapshot. This CM file is a mechanism for the source side to communicate to the target side that the upload of an object to the Object Store is complete for the target to start working on that object. In other words, the target will continue to download until there are no more objects in the Object Storage. Thus, this scheme enables the concurrent processing of both the source side and the target side.

Figure 10:
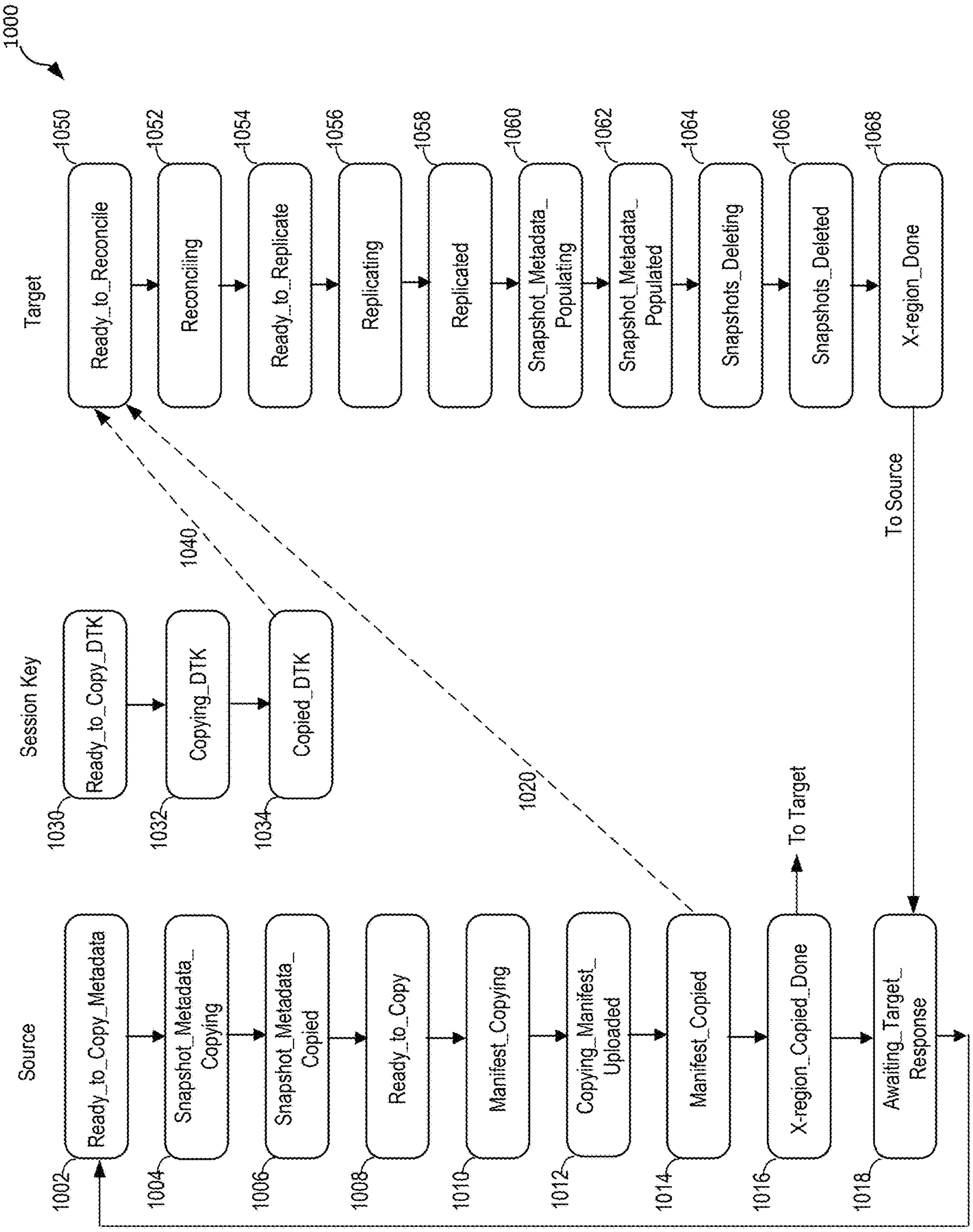
FIG. 10 is a flow chart illustrating state machines for concurrent source upload and target download, according to certain embodiments.

FIG. 10 is a flow chart illustrating state machines for concurrent source upload and target download, according to certain embodiments. As discussed earlier, both the source file system and the target system can perform the replication concurrently and thus have their respective state machines. In certain embodiments, each file system may have its own state machine while sharing some common job level states. In FIG. 10, the source file system has states 1002 to 1018 for performing the data upload plus states 1030 to 1034 for session key generation and transfer. The target file system has states 1050 to 1068 for data download. A session key may be generated at any time in the source file system while the deltas are being uploaded to the Object Storage. Thus, the session key transfer has its own state sequence 1030 to 1034. In FIG. 10, the target file system cannot start the replication download process (i.e., Ready_to_Reconcile state 1050) until it has received the indication that at least an object has been uploaded by the source file system to the Object Storage (i.e., Manifest_Copied state 1014) and that a session key is ready for it to download (i.e., Copied_DTK state 1034).

In a source file system, several functional blocks, such as snapshot generator, control API and delta monitor, are part of the CP. Replicator fleet is part of the DP. The snapshot generator is responsible for periodically generating snapshots. The delta monitor monitors the progress of the replicators on replication-related tasks, including snapshot creation and replication schedule on a periodic basis. Once the delta monitor detects that the replicator has completed the replication jobs, it moves the states to copied state (e.g., Manifest_Copied state 1014) on the source side or replicated state (e.g., Replicated state 1058) on the target side. In certain embodiments, several file systems can perform replication at the same time from a source region to a target region.

Referring to FIG. 10, in certain embodiments, the source file system, in a concurrent mode state machine, a snapshot generator after creating a snapshot signal to a delta monitor that a snapshot has been generated. The delta monitor, which runs a CP replication state (CpRpSt) workflow, is responsible for initiating snapshot metadata upload to the Object Store on the target side. Snapshot metadata may include snapshot type, snapshot identification information, snapshot time, etc. The CpRpSt workflow sets Ready_to_Copy_Metadata state 1002 for the replicator fleet to begin copying metadata. When a replicator gets a replication job, it makes copies of snapshot metadata (i.e., Snapshot_Metadata_Copying state 1004) and uploads the copies to the Object Store. When all replicators complete the snapshot metadata upload, the state is set to Snapshot_Metadata_Copied state 1006. The CpRpSt workflow then continues polling the source SDB for a session key.

Now the CpRtSt workflow hands over control back to the delta monitor to monitor the delta upload process to move into Ready_to_Copy state 1008, which indicates that the delta computation has been scheduled. Then the source CP API sends a request to a replicator to start the next stage of replication by making copies of manifests along with uploading deltas. A replicator that picks up a replication job can start making copies of manifests (i.e., Manifest_Copying state 1010). When the source file system completes the manifest copying, it moves to Manifest_Copied state 1014 and, at the same time, notifies the target file system that it can start its internal state (Ready_to_Reconcile state 1050).

As discussed above, the session key may be generated by the source file system while the data upload is in progress. The replicator of the source file system communicates with the target KMS vault to obtain a master key, which may be provided by customers, to create a session key (referred to herein as delta encryption key or DEK). The replicator then uses a local file system key (FSK) to encrypt the session key (now becomes encrypted DEK which is also referred to herein as delta transfer key (DTK)). DTK is then stored in SDB in the source region for reuse by replicator threads during a replication cycle. The state machine moves to Ready_to_Copy_DTK state 1030.

The source file system transfers DTK and KMS's resource identification to the target API, which then puts them into SDB in the target region. During this transfer process, the state machine is set to Copying_DTK state 1032. When the CpRpSt workflow in the source file system finishes polling the source SDB for the session key, it sends a notification to the target side signaling the session key (DTK) is ready for the target file system to download and use it to decrypt its downloaded deltas for application. The state machine then moves to Copied_DTK state 1034. The target side replicator retrieves DTK from its SDB and requests KMS's API to decrypt it to become a plain text DEK (i.e., decrypted session key).

When the source file system completes the upload of data for a particular replication cycle, including the session key transfer, its delta monitor notifies the target control API of such status as validation information and enters X-region_Copied_Done state 1016. This may occur before the target file system completes the data download and application. The source file system also cleans up its memory and removes all the keys. The source file system then enters Awaiting_Target_Response state 1018 to wait for a response from the target file system to start a new replication cycle.

As mentioned earlier, the target file system cannot start the replication download process until it has received the indication that at least an object has been uploaded by the source file system (i.e., Manifest_Copied state 1014) to the Object Storage and that a session key is ready for it to download (i.e., Copied_DTK state 1034). Once these two conditions are satisfied, the state machine moves to Ready_To_Reconcile state 1050. Then, at Reconciling state 1052, the target file system starts a reconciliation process with the source side, such as synchronizing snapshots of the source file system and the target file system, and also performs some internal CP administrative works, including taking snapshots and generating statistics. This internal state involves communication within the target file system between its delta monitor and CP API.

After the reconciliation process is complete, the replication job is passed to the target replicator (i.e., Ready_to_Replicate state 1054). The target replicator monitors a checkpoint manifest (CM) file that will be uploaded by the source file system. The CM file is marked by the target. The target replicator threads then start downloading the manifests and applying the downloaded and decrypted deltas (i.e., Replicating state 1056). The target replicator threads also read the FMAP data blocks from the blobs downloaded from the Object Store, and communicates to local FSK services to get file system key FSK, which is used to re-encrypt each FMAP data block and store it in its local storage.

If the source file system has finished the data upload, it will update a final CM file by setting an end-of-file (eof) field to be true and upload it to the Object Store. As soon as the target file system detects this final CM file, it will finish the download of blobs, apply them, and the state machine moves to Replicated state 1058.

After the target file system applied all deltas (or blobs), it continues to download snapshot metadata from the Object Store and populates the target file system's snapshots with the information of the source file system's snapshots (i.e., Snapshot_metadata_Populating state 1060). Once the target file system's snapshots are populated, the state machine moves to Snapshot_Metadata_Populated state 1062.

At Snapshot_Deleting state 1064, the target file system deletes all the blobs in the Object Store for those that have been downloaded and applied to its latest snapshot. The target control API will then notify the target delta monitor once the blobs in the Object Store have been deleted, and proceeds to Snapshot_Deleted state 1066. The target file system also cleans up its memory and removes all keys as well. The FSS service also releases the KMS key.

When the target DP finishes the delta application and the clean-up, it validates with the target control API about the status of the source file system and whether it has received the X-region_Copied_Done notification from the source file system. If the notification has been received, the target delta monitor enters X-region DONE state 1068 and sends X-region DONE notification to the source file system. In some embodiments, the target file system is also able to detect whether the source file system has completed the upload by checking whether the end of files has been present for all the key ranges and all the upload processing threads because every object uploaded to the Object Store has a special marker, such as end-of-file marker in a CM file.

Referring back to the source file system state machine, while the source file system is in the Awaiting_Target_Response state 1018, it checks whether the status of the target CP has changed to complete to indicate that the application of all downloaded deltas by the target has been applied and file data has been stored locally. If it does, this concludes a cycle of replication.

The source side and target side operate asynchronously. When the source file system completes its replication upload, it notifies the target control API with X-region_Copied_Done notification. When the target file system later completes its replication process, its delta monitor target communicates back to the source control API with X-region DONE notification. The source file system goes back to Ready_to_Copy_Metadata state 1002 to start another replication cycle.

Figure 11:
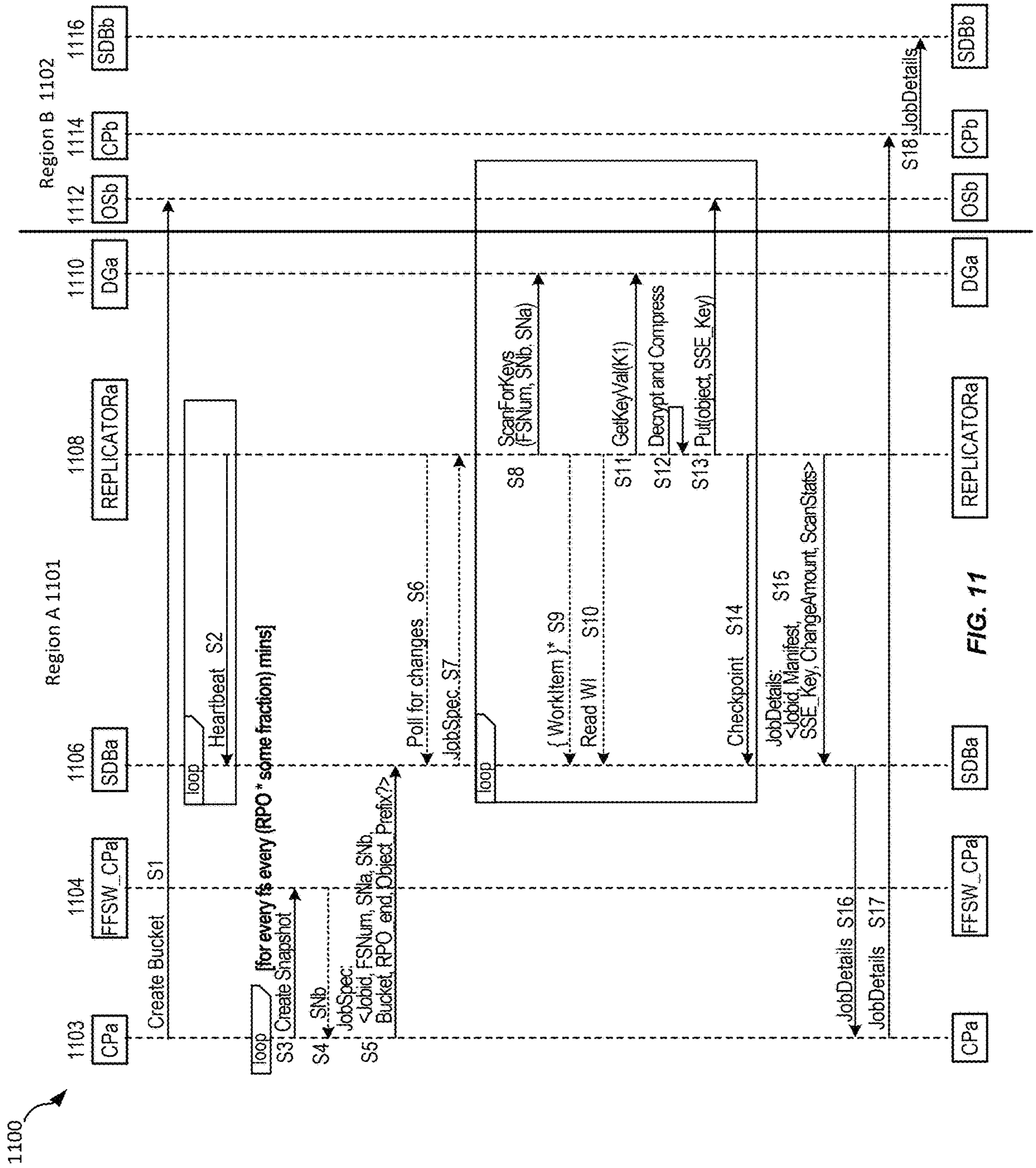
FIG. 11 is an example flow diagram illustrating the interaction between the data plane and control plane in a source region, according to certain embodiments.

FIG. 11 is an example flow diagram illustrating the interaction between the data plane and control plane in a source region, according to certain embodiments. Data plane components and control plane components communicate with each other using a shared database (SDB), for example, 1106. The SDB is a key-value store that both control plane components and data plane components can read and write. Data plane components include replicators and delta generators. The interaction between components in source region A 1101 and target region B 1102 is also illustrated.

In FIG. 11, at step S1, a source control plane (CPa) 1103 requests the Object Store in target region B (OSb) 1112 to create a bucket. At step S2, a source replicator (REPLICATORa) 1108 updates its heartbeat status to the source SDB (SDBa) 1106 regularly. Heartbeat is a concept used to track the replication progress performed by replicators. It uses a mechanism called leasing in which a replicator can keep on updating the heartbeat whenever it works on a job to allow the control plane to be aware of the whole leasing information; for example, the byte count is continuously moving on the job. If a replicator fails to work properly, the heartbeat may become stale, and then another replicator can detect and take over to continue to work on the job left behind. Thus, if a system crash in the middle, the system can start exactly from the last-point-in-time based on the checkpoint mechanism. A checkpoint helps the system know where the last point of progress is to allow it to continue from that point without re-performing the entire work.

At step S3, CPa 1103 also requests file system service workflow (FSW_CPa) 1104 to create a snapshot periodically, and at step S4, FSW_CPa 1104 informs CPa 1103 about the new snapshot. At step S5, CPa 1103 then stores snapshot information in SDBa 1106. At step S6, REPLICATORa 1108 polls SDB 1106 for any changes to existing snapshots, and retrieves job spec at step S7 if a change is detected. At step S8, once REPLICATORa 1108 detects a change to snapshots, this kicks off the replication process. At step S8, REPLICATORa 1108 provides information about two snapshots (SNa and SNb) with changes between them to delta generator (DGa) 1110. At step S9, REPLICATORa 1108 put work items information, such as the number of key ranges, into the SDBa 1106. At step 10, REPLICATORa 1108 checks the replication job queue in SDBa 1106 to obtain work items, and at step S11, assign them to delta generator (DGa) 1110 to scan the B-tree keys of the snapshots (i.e., walking the B-tree) to compute deltas and the corresponding key-value pairs. At step 12, REPLICATORa 1108 decrypts file data associated with the identified B-tree keys, and pack them together with the key-value pairs into blobs. A step 13, REPLICATORa 1108 encrypts the blobs with a session key and uploads them to the OSb 1112 as objects. At step S14, REPLICATORa performs a checkpoint and stores the checkpoint record in SDBa 1106. This replication process (S8 to S14) repeats (as a loop) until all deltas have been identified and data has been uploaded to OSb 1112. At step S15, REPLICATORa 1108 then notifies SDBa 1106 with the replication job details, which is then passed to CPa 1103 at step S16, and further relayed to CPb 1114 as the final CM file at step S17. At step S18, CPb 1114 stores the job details in SDBb 1116.

The interaction between the data plane and control plane in target region B is similar. At the end of the application of deltas to the target file system, the control plane in target region B notifies the control plane in source region A that the snapshot is successfully applied. This enables the control plane in source region A to start all over again with a new snapshot.

Authentication is performed on every component. From replicators to a file system key (FSK), an authentication mechanism exists by using replication ID and file system number. The key can be given to a replicator only when it provides the right content. Thus, the authentication mechanism can prevent an imposter from obtaining decryption keys. Other security mechanisms include blocking network ports. A component called file system key server (FSKS) is a gatekeeper for checking appropriator requesters by checking metadata such as the jobs the requesters will perform and other information. For example, suppose a replicator tries to request a key for a file system. In that case, the FSKS can check whether the replicator is associated with a particular job (e.g., a replication is actually associated with that file system) to validate the requester.

Availability addresses the situation that a machine can be restarted automatically after going down or a service continues to be available while software deployments are going on. For example, all replicators are stateless, so losing a replicator is transparent to customers because another replicator can take over to continue working on the jobs. The states of the jobs are kept in a shared database and other reliable locations, not locally. The shared database is a database-like service that the control plane uses to preserve information about file systems, and is based on B-tree.

Storage availability in the FSS of the present disclosure is high because the system has thousands of storage nodes to allow any storage node to perform delta replication. Control plane availability is high by utilizing many machines that can take over each other in case of any failures. For example, replication progress is not hindered simply due to one control plane's failure. Thus, there is no single point of failure. Network access availability utilizes congestion management involving various types of throttling to ensure source nodes are not overloaded.

Replication is durable by utilizing checkpointing, where replication states are written toa shared database, and the replicators are stateless. The replication process is idempotent. Idempotency may refer to deterministic re-application that when an operation fails, the retry of the same operation should work and lead to the same result, by using, for example, the same key, upload process or walking process, etc.

Operations in several areas are idempotent. In the control plane, an action that has been taken needs to be remembered. For example, if an HTTP request repeats itself, an idempotency cache can help remember that the particular operation has been performed and is the same operation. In the data plane, for example, when a block is allocated, the block and the file system file map key are written together. Thus, when the block is allocated again, it can be identified. If the block has been sealed, a write operation will fail. The idempotent mechanism can know that the block was sealed in the past, and the write operation needs not be redone. In yet another example, the idempotent mechanism remembers the chain of the steps required to be performed for a particular key-value processing. In other words, idempotency mechanism allows to check every operation to see if it is in the right state. Therefore, the system can just move on to the next step without repeating.

Atomic replay allows the application of deltas to start as soon as the first delta object reaches the Object Store when snapshots are rolled back, for example, from snapshot 10 back to snapshot 5. To make a replay atomic, the entire deltas need to be preserved in the Object Store before the deltas can be applied.

With respect to scaling of the replicator, the FSS of the present disclosure allows to add as many replication machines (e.g., replicator virtual machines ("VMs")) as needed to support many file systems. The number of replicators may dynamically increase or decrease by taking into account the bandwidth requirement and availability of resources. With respect to scaling storage, thousands of storage can be used to parallelize the process and increase the speed of work. With respect to inter-region bandwidth, bandwidth rationing ensures each workload does not overuse or cross its predefined throughput limit by automatically throttling, such as, throttling all inter-region bandwidth by figuring out the latency increase and slowing down requests. All replicator processors (or threads) have this capability.

For checkpoint storage scaling, uploaders and downloaders checkpoint their progress to persistent storage, and the shared storage is used as a work queue for splitting key range. If checkpoint workloads overwhelm the shared database, checkpoint storage functionality can be added to delta generators for scaling purposes. Current shared database workloads may consume less than 10 IOPs.

Figure 12:
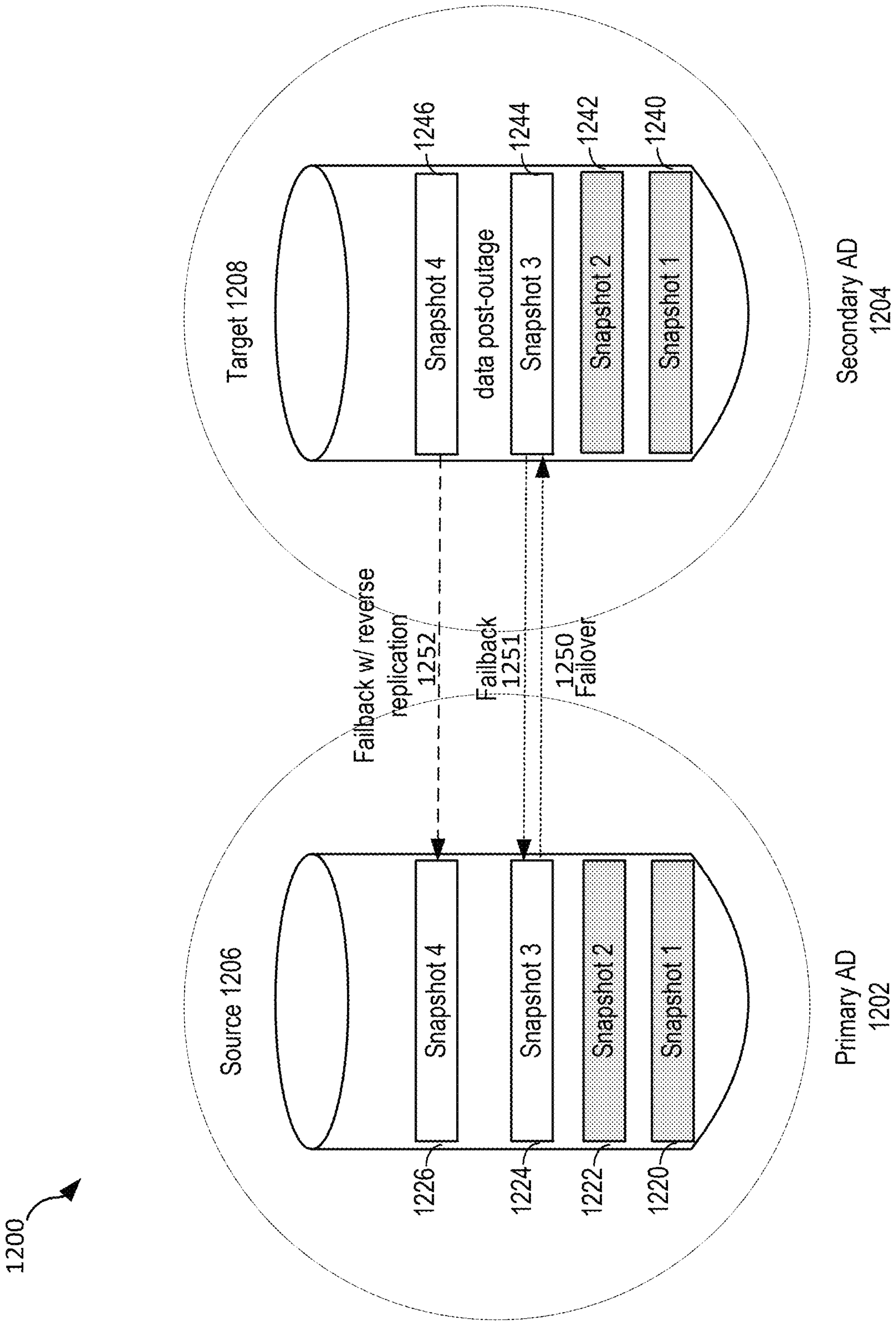
FIG. 12 is a simplified diagram illustrating failback mode, according to certain embodiments.

FIG. 12 is a simplified diagram illustrating failback mode, according to certain embodiments. Failback mode allows restoring the primary/source side before failover to become primary/source again. As shown in FIG. 12, the primary AD 1202 includes a source file system 1206, and the secondary AD 1204 includes a target file system 1208. The secondary AD 1204 may be in the same region or a different region as that of primary AD 1202.

In FIG. 12, snapshot 1 1220 and snapshot 2 1222 in the source file system 1206 exist prior to failover due to an outage event. Similarly, snapshot 1 1240 and snapshot 2 1242 in the target file system 1208 exist prior to failover. When the outage occurred in the primary AD 1202 at snapshot 3 1224, FSS made an unplanned failover 1250, and snapshot 3 1224 in the source file system 1206 was replicated to the target file system 1208 to become a new snapshot 3 1224. After the target file system 1208 went live, a customer might make changes to the target file system 1208, which created a snapshot 4 1246.

If the customer decides to use the source file system again, the FSS service may perform a failback. The user has two options when performing the failback-1) the last point-in-time in the source file system prior to the triggering event 1251, or 2) the latest changes in the target file system 1252.

For the first option, the user can resume from the last point-in-time (i.e., snapshot 31224) in the source file system 1206 prior to the triggering event. In other words, snapshot 31224 will be the one to use after failback because it previously successfully failed over to the target file system 1208. To perform the failback 1251, the state of the source file system 1206 is changed to not accessible. Then, FSS services identify the last point-in-time in the source file system 1206 prior to the successful failover, which is snapshot 3 1224. FSS may perform a clone (i.e., a duplicate in the same region) of snapshot 3 1224 in the primary AD 1202. Now the primary AD 1202 is back to its initial setup before the outage, and the user can reuse the source file system 1206 again. Because snapshot 3 1224 is already in the file system to be used, no data transfer is required from the secondary AD 1204 to the primary AD 1202.

For the second option, the user wants to reuse the source file system with the latest changes in the target file system 1208. In other words, snapshot 4 1246 in the target file system 1208 will be the one to use after failback because it was the latest change in the target file system 1208. The failback process 1252 for this option involves reverse replication (i.e., reversing the roles of the source file system and the target file system for a replication process), and FSS performs the following steps:

Step 1. The state of the source file system 1206 is changed to not accessible.

Step 2. Then, FSS services identify the latest snapshot in the target file system 1208 that has been successfully replicated, for example, snapshot 3 1244.

Step 3. The FSS services also find the corresponding snapshot 3 1224 in the source file system 1206, and perform a clone (i.e., a duplicate in the same region).

Step 4. The FSS services start a reverse replication 1252 with a similar process as discussed in relation to FIG. 4 but in the reverse direction. In other words, both the source file system 1206 and the target file system 1208 need to synchronize, then the target file system 1208 can upload deltas to an Object Store in the primary AD 1202. The source file system 1206 can download the deltas from the Object Store to complete the application to snapshot 3 1224 to create a new snapshot 4 1226.

Now the primary AD 1202 is back to its initial setup before the outage, and the user can reuse the source file system 1206 again without transferring data that is already in both the source file system 1206 and the target file system 1208, for example, snapshots 1~3 (1220-1224) in the source file system 1206. This saves time and avoids unnecessary bandwidth.

II. Change Tracking and Delta Generation (CTDG) System

A. Introduction

A file system replication may involve identifying the differences (referred to as deltas) between two given snapshots (e.g., snapshot 1 (SN1) and snapshot 2 (SN2)), and transferring information that identifies the deltas from a source file system (FS) to a target file system to create SN2 in the target FS that already has SN1. A B-tree may contain or otherwise represent snapshots of one or more file systems.

The current approach of walking every B-tree node to visit all metadata keys (e.g., containing change information to a prior snapshot) in a B-tree to generate deltas between two given snapshots may not be scalable because the time it takes is proportional to the number of keys (i.e., the size of the snapshots of a file system), not the number of changes (i.e., size of the deltas). Therefore, it would be inefficient to perform such delta generation for a large file system with a small amount of change to a snapshot.

Additionally, when tracking changes to a file system, a three-step approach for change tracking may be used, such as pre-change (i.e., a state of the file system before any modifications or changes occur (referred to as uncommitted changes) by recording the goal of such changes, e.g., tracking intention or indication to create a file, and may include allocating resources and updating a change log, such as journaling), actual change (i.e., a state that specific modifications or changes are made or committed (referred to as committed changes), e.g., actually creating the file, such as creating a file entry and writing data), and post-change (i.e., a state after the modifications have been applied, e.g., verifying or confirming the file creation is successful). However, such a three-step approach is complex for recovery when a system encounters a failure.

Finally, in a multi-client environment, some clients may like to enable change tracking while others do not. Under such a situation, a system for generating deltas for replications may need to consider the dynamic nature of enabling/disabling change tracking among different clients. Without proper coordination, data corruption may occur during replications for multiple clients. Thus, there is a need to address these challenges and others.

For the purpose of this disclosure, an epoch may refer to a point in time or an interval when a snapshot is created (or generated) for a file system. For example, at epoch 0, a base snapshot (SN0) may be generated. At epoch 1, snapshot 1 (SN1) may be generated. Thus, in some examples, the epoch number may be the same as the snapshot number. However, a global epoch number (also referred to as snapshot creation time) may be maintained by the file system accessed by multiple clients. The global epoch number may be higher than the local snapshot number maintained by a front-end subsystem associated with a client if that front-end subsystem encounters some issues in delaying generating snapshots. A replication cycle may refer to the duration of a replication that starts after a new snapshot is created in a source file system and ends when deltas between two given snapshots in the source file system are transferred to and applied by a target file system.

In some embodiments, a client may access or make changes to one or more file systems in the CTDG owned or operated by a cloud service provider (CSP). A client may be a customer of the CSP, where the customer may be an individual or a corporation. For a corporate client, one or more users of the client (also referred to as user client) may be given permission to access the one or more file systems on behalf of the client. Each client may be associated with a front-end subsystem of the CTDG for performing change-tracking and changes. Thus, the term client and front-end subsystem may be used interchangeably because of their one-to-one mapping.

The disclosed techniques describe a change tracking and delta generation (CTDG) system, covering one or more file systems, that provides a solution enabling the delta generation (e.g., identifying changes made to a first snapshot to become a second snapshot) to be proportional to the number of changes between two snapshots by identifying and collecting changes at a front-end subsystem to track the changes. Change tracking may be enabled (called enabled CT mode or enabled CT) or disabled (disabled CT mode or disabled CT). Enabled CT mode may include two sub-CT modes, tracking at either a directory level (directory-level CT mode) or individual file level (file-level CT mode) depending on front-end I/O performance (e.g., the number of received changes and rate of change from a user client). Front-end I/O refers to data changes made by a user client of a customer to a file system. The front-end subsystem may generate two types of change-tracking keys (CT keys), file-based CT keys and directory-based CT keys. A file-based CT key may include information indicating one or more intended changes (e.g., type of changes, such as creating a file, deleting a file, renaming a file, permission change, etc.) to a particular file. A directory-based CT key may include information indicating any intended changes (or uncommitted changes) to one or more files under a particular directory. The change tracking sub-CT modes at the front-end subsystem can be dynamically tuned based on the I/O traffic or performance, such that the front-end subsystem can generate either file-based CT keys when I/O traffic is low or directory-based CT keys when I/O traffic is high.

The term change-tracking (CT) mode may refer to enabled or disabled CT mode in the context of multiple clients enabling/disabling their respective change tracking, and respective replications using CT keys. The term CT mode may also refer to sub-CT modes (e.g., directory-level CT mode and file-level CT mode) in the context of responding to front-end I/O traffic when CT is enabled for a particular client.

A storage subsystem between the front-end subsystem and the back-end system may include a set of storage nodes, including metadata servers used for temporarily storing pre-change information (i.e., the CT keys) or actual-change information.

A back-end subsystem replication can work closely with the front-end subsystem to process the collected changes. The back-end subsystem may include two B-trees, a file system service B-tree (FSS B-tree) for storing file system metadata and a change-tracking B-tree (CT B-tree) for storing CT keys. During a replication cycle, a delta generator may access the CT B-tree to obtain pre-change information (either file-based CT keys and directory-based CT keys depending on the tracking mode), and then walk B-tree nodes in the FSS B-tree, containing actual-change information, selectively to generate deltas based on the pre-change information.

The change tracking system uses only a two-step (or two-stage) approach for change tracking, such as pre-change and actual change, to simplify the system design. The CT keys stored in CT B-tree store the pre-change information, while the FSS B-tree stores the actual change information. In some embodiments, actual changes may fail to occur due to some reasons (e.g., network problems), and as a result, such failed actual changes may not reflect in FSS B-tree. Because, during the replication, the back-end subsystem, including the replication engine, may cross-check the CT B-tree and FSS B-tree during replication, to confirm whether the actual changes occur by searching for committed changes to the file system in FSS B-tree based on the CT information stored in the CT B-tree. Thus, the post-change stage becomes part of the replication process.

In some embodiments, the CTDG may detect duplicate changes to the same file or directory of a file system (referred to as duplicate changes). For the purpose of this disclosure, a duplicate change may be an exact duplicate (e.g., a change to the same part of the same file), a duplicate to the same file (e.g., a change to a different part of the same file, referred to as file duplicate change), or a duplicate to the same directory (i.e., a change to a different file of the same directory, referred to as directory duplicate change). If a duplicate change is not an exact duplicate (e.g., file duplicate change), the corresponding CT key (either a file-based CT key or file-based CT key) for that duplicate change may be reused without creating a new CT key, but the relevant field(s) of the CT key's schema may be updated to reflect the requested change. In other words, if a user client has many changes to the same file, only one file-based CT key is generated. If a user client has many changes to the same directory (e.g., different files under the same directory), only one directory-based CT key is generated.

In some embodiments, after detecting the duplicate changes, CTDG may perform de-duplication by removing current duplicates caused by a single client or multiple clients, and avoiding or preventing future duplicates by not generating the same CT keys again by the front-end subsystem associated with each client.

In some embodiments, CTDG, capable of serving multiple clients, may coordinate the enablement/disablement of change tracking by different clients to ensure the back-end subsystem can start delta generation of replications for these clients safely because all CT keys generated by the front-end subsystems associated with the clients may be stored in the same CT B-tree. If the back-end subsystem performs change tracking (i.e., CT mode is enabled) for some clients but not others in a particular replication cycle, such inconsistency could lead to data corruption. In certain embodiments, an epoch synchronizer may be used to synchronize snapshot generation for each set of snapshots for each client to ensure all clients can generate snapshots (or are in the same epoch) at roughly the same pace, or catch up to the latest central epoch if some clients fall behind (e.g., due to system issues). Additionally, all front-end subsystems may atomically update a central change tracking (CT) record that can be read by the back-end subsystem for determining which epoch is safe to start replication in enabled CT mode (i.e., using CT keys in the CT B-tree for traversing/walking FSS B-tree for delta generation). The central CT record can help identify a common epoch number (referred to as snapshot generation time) that all clients have enabled or disabled CT.

Embodiments of the present disclosure provide a number of advantages/benefits. For example, the architecture of CTDG system can improve replication performance and enhance scalability by enabling the delta generation to be proportional to the number of changes between two snapshots. The front-end I/O performance may be enhanced by dynamically switching between file-level CT mode and directory-level CT mode at the front end. The delta generation performance may be enhanced by traversing only FSS B-tree nodes that are needed for generating deltas based on CT keys in the CT B-tree.

Additionally, the CTDG system simplifies the approach for change tracking from three steps to two steps by utilizing the delta generation process to cover the normal post-change stage. Thus, the back-end I/O traffic for confirming the post-change status can be reduced. Furthermore, a single change log per file system accessed by multiple clients can reduce the design complexity for detecting duplicate changes to the file system. Moreover, the CTDG system is highly scalable. Front-end sub-systems can be added or reduced to serve more or fewer clients, and servers per storage node and the number of storage nodes can be increased or reduced to accommodate bigger or smaller file systems.

Finally, in a multi-client CTDG system, an epoch synchronizer and a central change tracking (CT) record for each file system can help coordinate different clients' snapshot generation and identify a common epoch number to ensure replications for multiple clients can be performed properly. Thus, the replication performance is improved with robust delta generation.

B. Architecture

1. Overview

Figure 13:
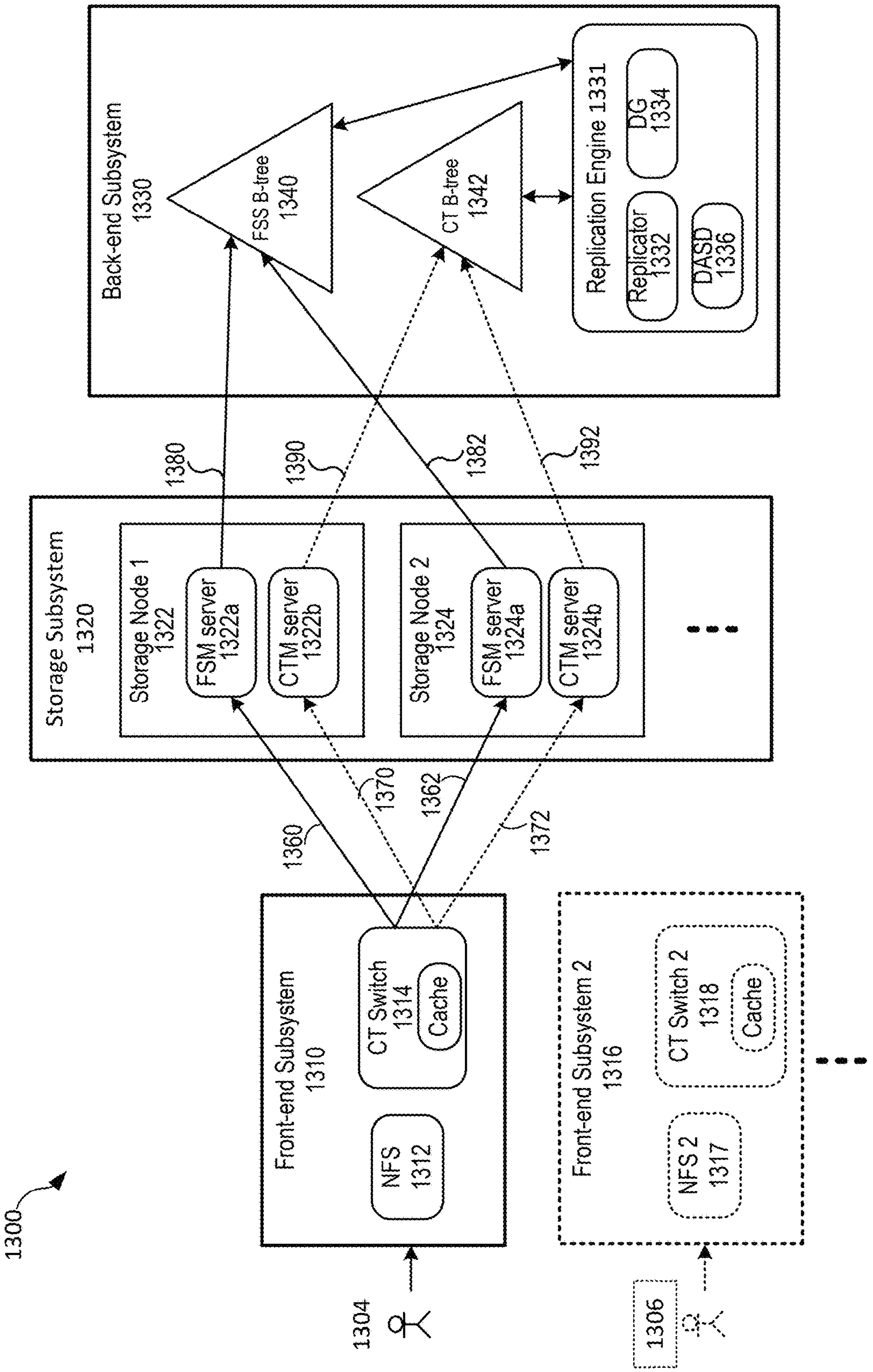
FIG. 13 is a block diagram illustrating an example architecture of the dynamically optimized change tracking and delta generation (CTDG) system for a single client, according to some embodiments.

FIG. 13 is a block diagram illustrating an example architecture of the dynamically optimized change tracking and delta generation (CTDG) system for a single client, according to some embodiments. The example architecture 1300, which may be a distributed environment, depicted in FIG. 13 is merely an example and is not intended to unduly limit the scope of claimed embodiments. Many variations, alternatives, and modifications are possible. For example, in some implementations, the example architecture 1300 may have more or fewer systems or components than those shown in FIG. 13, may combine two or more systems, or may have a different configuration or arrangement of systems. The systems, subsystems, and other components depicted in FIG. 13 may be implemented in software (e.g., code, instructions, program) executed by one or more processing units (e.g., processors, cores) of the respective systems, using hardware, or combinations thereof. The software may be stored on a non-transitory storage medium (e.g., on a memory device).

The change tracking system may include, but not limited to, a front-end subsystem 1310, a set of storage nodes 1322-1324 with one storage node per file system, and a back-end subsystem 1330. The back-end subsystem 1330 may further include two B-trees, a file system B-tree (FSS B-tree) storing metadata keys (may also be referred to as file system keys (FS keys), e.g., actual changes to the source file system), and a change-tracking B-tree (CT B-tree, e.g., change tracking keys before actual changes are made). In some embodiments, the architecture 1300 may be used for multiple source file systems.

In some embodiments, the front-end subsystem 1310 may be a subsystem that implements NFS protocol termination 1312 for a client 1304 (also referred to as a user-client or user) and can route metadata requests to storage servers on storage nodes 1322, 1324, etc. The front-end subsystem can receive front-end I/O traffic from a user client 1304. The I/O traffic may be user's requests (e.g., NFS operations) to modify a file system. Such requests (or NFS operations) may include, but not limited to, name changes (e.g., create, modify, delete) to a file system object (e.g., iNode, FMAP, directory entry, etc.), modify attributes or data of a file. These changes may also be referred to as mutations. A client's request to modify a file system may be referred to as a change request to an object of the file system.

The front-end subsystem further includes a change-tracking switch (CT switch) 1314 that can monitor changes to one or more file systems stored in a file system service B-tree (FSS B-tree). The CT switch may monitor front-end I/O patterns (e.g., I/O latency due to an increase or decrease in the rate of changes to files and directories by the user client 1304). The CT switch 1314 may include a cache that can figure out whether a change to a file system by the user client is a duplicate (e.g., a change to the same file associated with an existing CT key) or a new change. For non-duplicate changes (i.e., first change to a file or a directory), the CT switch 1314 can generate change-tracking keys (CT keys) for pre-change information during the pre-change stage, and file system keys (FS keys) for actual change information, accordingly. The FS keys may be an umbrella term for various types of keys (e.g., directory entry keys, iNode keys, etc.) used in a file system. If no change is detected, the received data may be forwarded to the FSS B-tree via a storage subsystem 1320 without generating any CT keys. Further details regarding duplication detection for multiple clients (e.g., multiple front-end subsystems) may be discussed below.

A storage subsystem 1320, including a fleet of storage nodes 1322-1324, may be used to temporarily store both the pre-change information and the actual change information (e.g., metadata of a changed file or files of a directory). Each storage node (e.g., 1320) may include two metadata servers (1320*a* and 1320*b*), one for storing file system metadata (referred to as file system metadata (FSM) server, e.g., actual changed data), and another for storing pre-change metadata (referred to as change-tracking metadata (CTM) server). Each metadata server may provide metadata service (or process) that implements file system semantics (e.g., file create, delete, read, and write requests, and works with an NFS server to service IOs to clients) via distributed B-trees. The metadata server may include a file manager layer running on the storage nodes in a file system's data plane.

In some embodiments, each storage node may be dedicated to a source file system, for example, storage node 1 1322 for source file system 1, storage node 2 1324 for source file system 2, etc. The pre-change information for source file system 1 may be forwarded via path 1370 to CTM server 1322*b* of storage node 1 1322, and the actual change information for source file system 1 may be forwarded via path 1360 to FSM server 1322*a* of storage node 1 1322. The pre-change information for source file system 2 may be forwarded via path 1372 to CTM server 1324*b* of storage node 2 1324, and the actual change information for source file system 2 may be forwarded via path 1362 to FSM server 1324*a* of storage node 1 1324.

A back-end subsystem 1330 may include a file system service B-tree (e.g., FSS B-tree) and a change-tracking B-tree (e.g., CT B-tree). The FSS B-tree 1340 may store metadata for multiple file systems, such as the metadata key-value pairs of snapshots (e.g., FS keys), forwarded by storage node 1 1322 via path 1380 for source file system 1 and by storage node 2 1324 via path 1382 for source file system 2, etc. The change-tracking B-tree 1342 (referred to as CT B-tree) may provide change-tracking database service to store all change-tracking key-value pairs (referred to CT keys), which may include file-based CT keys and directory-based CT keys (discussed below), forwarded by storage node 1 1322 via path 1390 for source file system 1 and by storage node 2 1324 via path 1392 for source file system 2, etc. In some embodiments, the content of the CT B-tree may be stored on disk or various non-volatile storage.

Figure 14:
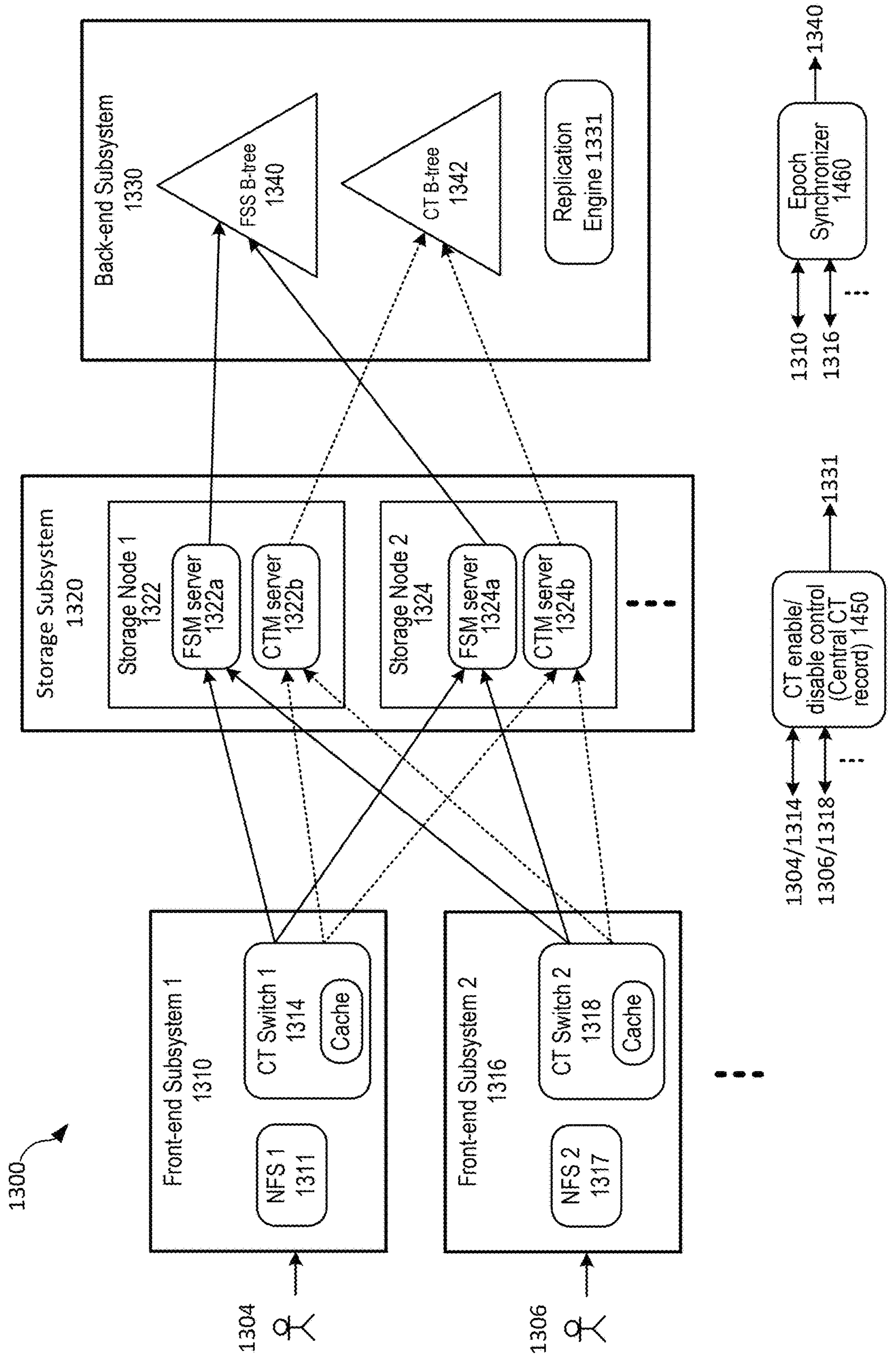
FIG. 14 is a block diagram illustrating an example architecture of the CTDG system with multiple front-end subsystems associated with multiple clients, according to some embodiments.

Referring to FIG. 14. FIG. 14 is a block diagram illustrating an example architecture 1400 of the CTDG system with multiple front-end subsystems associated with multiple clients, according to some embodiments. As discussed above, each storage node may be dedicated to a source file system. A front-end subsystem may be used by an end-user client. In some embodiments, multiple front-end subsystems with multiple CT switches may be used to allow multiple end-user clients to make changes to multiple file systems. For example, in FIG. 14, front-end subsystem 1410 may be used by client 1 1304, and front-end subsystem 1416 may be used by client 2 1306. Even if there are multiple users/clients (e.g., 1304 and 1306) making changes to the same source file system (e.g., storage node 1 1322), their changes may go to the same CTM server 1322*b* for the pre-change information and the same FSM server 1322*a* for the actual change information. In other words, only a single change log is used for a file system, rather than one change log per user client or per mount point. In some embodiments, the change log (referred to global change log for a file system) may be used in a CTM server for pre-change tracking only. Once a replication for a file system has been completed, the content of the change log for that replication may also be deleted to reclaim space.

In some embodiments, each CT switch in its corresponding front-end subsystem can de-duplicate the changes for its user. De-duplication may refer to removing current duplicates, and avoiding or preventing future duplicates. For example, duplicate changes to a particular file system from two CT switches (e.g., 1314 and 1318) are sent to the same storage node (e.g., 1322), the CTM server 1322*b* of the storage node containing a change log for that particular file system can figure out the duplication (e.g., two CT switches generate the same CT key). In some embodiments, the receiving CTM server may notify the CT switch sending the duplicate to update its cache to perform de-duplication by that CT switch in the future by not generating the duplicate CT key again. Although such a situation does not occur often, the directory-level CT mode can minimize such traffic. Because a single change log per file system is shared among multiple front-end subsystems, such a design may simplify the complexity and the de-duplication process. Further details about the duplication detection (or de-duplication process) are described below.

2. Change-Tracking Modes-Directory Level and File Level

Referring back to FIG. 13, as discussed earlier, front-end subsystem can track the changes to one or more file systems by a user in two modes: tracking at either a directory level (called directory-level CT mode) or individual file level (called file-level CT mode) based on I/O performance.

In some embodiments, change tracking (CT) switch may determine whether to use directory-level CT mode or file-level CT mode for each replication cycle (i.e., transferring all deltas of a snapshot from the source FS to the target FS). For example, the default mode may be file-level CT mode. When the front-end I/O traffic is above a certain threshold, the CT switch may switch to or enter the directory-level CT mode by capturing/tracking only the changes at the directory level for the upcoming replication cycle. A threshold for switching sub-CT modes may include, but not limited to, # of file changes per second, the percentage change of latency (e.g., 10% to 20%) within a period of time, and a change pattern indicating a steep increase instead of a short spike, etc. A directory-based CT key may be created for each directory-level change as a result. Thus, directory-level tracking can reduce the impact on the front-end I/O traffic because less processing is required, leaving the back-end subsystem to check the individual file changes under that directory during replication, such as walking/checking nodes relevant to files under that directory in the FSS B-tree 1340. For example, a directory (called parent) may have hundreds of files (called children). A user may make changes to only two files or a lot of files in a directory. By using directory-level CT mode, the front-end subsystem only needs to note or mark that one or more changes related to that directory occur (using a directory-based CT key) instead of marking every affected file in that directory. When a replication starts, the back-end subsystem can figure out all the affected files under that directory based on the directory-based CT key.

In some embodiments, when the front-end I/O traffic is below a certain threshold (e.g., the change pattern indicating a steady decreasing trend, # of file changes per second), the CT switch may enter or switch to file-level CT mode in the next replication cycle and generate a file-based CT key for each file. The file-level CT mode may reduce the workload for delta generation on the FSS B-tree 1340 because the B-tree walk on the FSS B-tree only needs to collect deltas for the affected files based on the information in the file-based CT key without the need to visit every FSS B-tree node. For example, a user may make changes to a large file (e.g., terabyte). The front-end subsystem may create a file-based CT key when the user requests the first change to a particular file. Any subsequent changes (e.g., modify one or more attributes, such as data blocks, file name, permission, linking the file) to the file may be marked and noted in the file-based CT key. In other words, one file-based CT key may encompass multiple intended changes to that particular file. In certain embodiments, FS keys related to various data blocks for the particular file may be stored next to each other in the FSS B-tree based on the schema of FS keys. When a replication starts, the back-end subsystem can use the file-based CT key to figure out all the changes (e.g., affected attributes or data blocks) in that particular file associated with the file-based CT key. The DG 1334 may start from the first data block of the file in the FSS B-tree and traverse (or walk) all surrounding FS keys for that file in the FSS B-tree to construct deltas. Further details regarding delta generation using file-based CT keys and directory-based CT keys are described below.

In some embodiments, the sub-CT mode switching (between file level and directory level) may be configured to occur for a snapshot range (e.g., from snapshot #2 to snapshot #5,also referring to replication cycle 2 to cycle 5 or epoch 2 to epoch 5) instead of every replication cycle once a threshold is reached. In other embodiments, the sub-CT mode switching may be configured by the customer 1304 or considering customer's preference. For example, a customer may prefer low I/O latency. As a result, the CT switch may change from file-level CT mode to directory-level CT mode as soon as an increasing change rate in a short period of time is detected.

3. Delta Generation (Replication Engine)

When a replication cycle starts, in FIG. 13, a replicator 1332 and delta generator 1334 of the replication engine of the source file system may work together to check the CT B-tree 1342 to obtain a list of CT keys by walking nodes of the CT B-tree 1342. If a particular replication cycle is to perform directory-level CT mode, the delta generator may obtain only the directory-based CT keys (e.g., through a batch). Then, the delta generator can walk the FFS B-tree 1340 to identify files under each directory of the directories associated with the list of directory-based CT keys, and obtain the actual changes (deltas or metadata keys) for all identified files.

If a particular replication cycle is to perform file-level CT mode, the delta generator 1334 may obtain a list of file-based CT keys from the CT B-tree 1342, and walk the relevant FS keys in FSS B-tree 1340 to obtain the actual changes (deltas or metadata keys) for those files associated with the list of file-based CT keys to generate deltas for replication. Because the delta generator 1334 does not need to walk every node (and check every FS key in the node) in the FSS B-tree 1340, but just the relevant FS keys corresponding to the file-based CT keys, the delta generation time can be reduced.

In some embodiments, depending on the number of CT keys, the replicator 1332 may partition the number of CT keys into several CT key ranges, create multiple processing threads, and instruct the delta generator 1334 to perform parallel walk on the FFS B-tree 1340 based on the CT key ranges. For example, if 1,000 CT keys (either file-based or directory-based) exist in the CT B-tree 1342, the replicator 1332 may partition the 1,000 CT keys into 20 CT key ranges with 50 CT keys in each CT key range. Then, 20 processing threads may be created for each processing thread to work on 50 CT keys. In other words, the 20 processing threads may walk the FFS B-tree 1340 in parallel, and each processing thread can extract deltas based on their corresponding 50 CT keys. In some embodiments, the CT B-tree 1342 may allow parallel listing (e.g., batch) to minimize frequent access.

In some embodiments, if the CTDG system is performing file-level CT mode but, in the backend, delta generator 1334 finds that there are too many CT keys in CT B-tree 1342 (i.e., (or too many changes), the replicator 1332 and delta generator 1334 may dynamically switch to regular B-tree walk on FSS B-tree to generate deltas between two snapshots, rather than collecting all file-based CT key in CT B-tree 1342 and accessing each corresponding file changes in FSS B-tree 1340 for the particular replication cycle. Such dynamic switching from file-level CT mode to regular B-tree walk on FSS B-tree 1340 (e.g., visiting/traversing every node (and keys) in the FSS B-tree 1340) is referred to as backend tuning. For example, suppose the delta generator 1334 realizes that there are more than 100,000 file-based CT keys it needs to collect because the back-end subsystem may be aware of the number of CT keys and their types stored in the CT B-tree 1342 for each epoch (or replication cycle). In such a scenario, collecting and cross-checking all of these file-based CT keys to walk the FSS B-tree 1340 may generate a lot of back-end I/O traffic in the back-end subsystem, such as between the CT B-tree 1342 and FSS B-tree 1340. As a result, a regular B-tree walk on FSS B-tree 1340 with parallel processing for delta generation may be more efficient. Further details related to B-tree walk on FSS B-tree 1340 with parallel processing for delta generation are described in U.S. Non-Provisional application Ser. No. 18/181,414, filed on Mar. 9, 2023, entitled "Partitioning Mechanism For Parallel Processing In Delta Generation," the entire content of which is incorporated herein by reference for all purposes.

4. Schemas of Change-Tracking Keys

Figure 15:
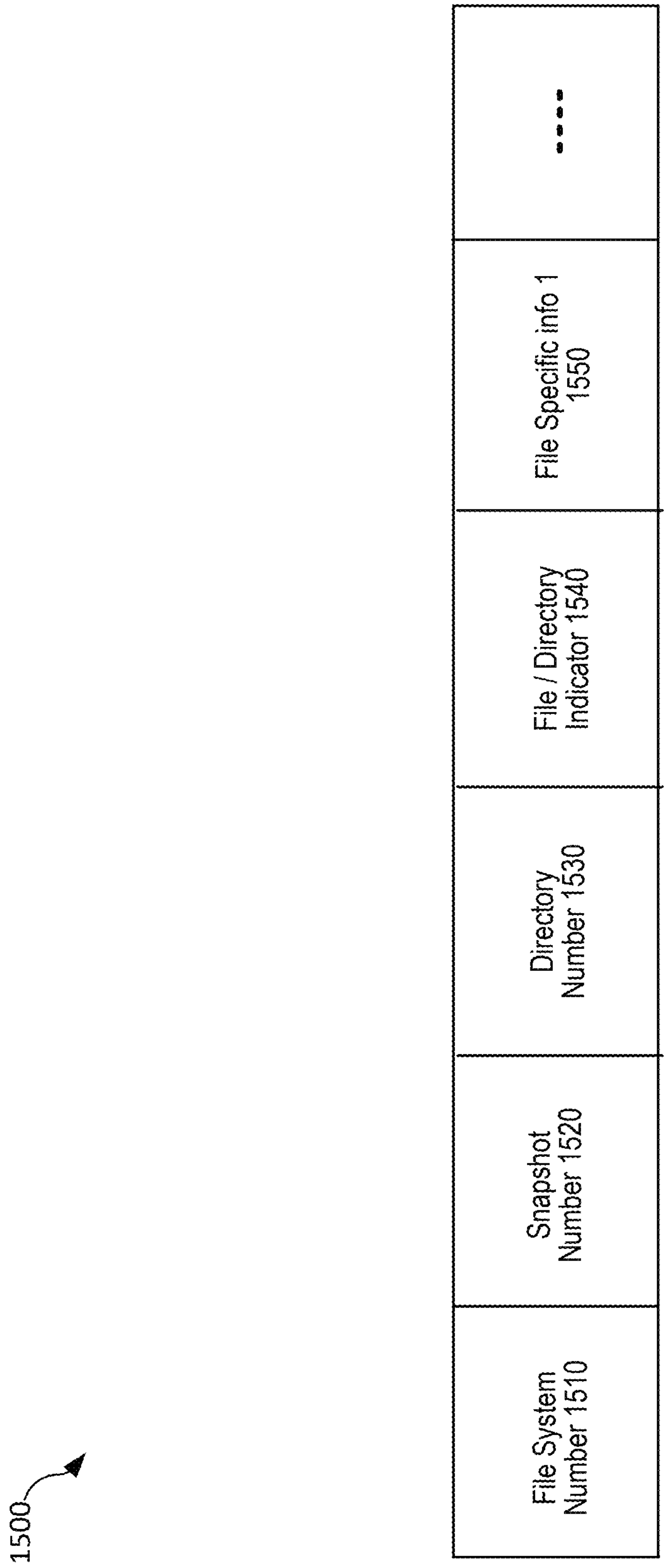
FIG. 15 illustrates an example schema of a change-tracking key, according to some embodiments.

FIG. 15 illustrates an example schema of a change-tracking key, according to some embodiments. An example of a CT key stored in the CT B-tree may have the format shown in FIG. 15. The same schema, which is a condensed version of key structure can be used for both file-based CT key and directory-based CT key.

In FIG. 15, the first field, file system number 1510, may be used for tracking which file system the CT key belongs to. For example, in FIG. 13, client 1 1304 may request changes to one or more file systems. The second field, snapshot number 1520, may be used for tracking the which snapshot the CT key is associated with (i.e., an intended change is made to the particular snapshot) within the file system 1510. The third field, parent directory number 1530, may be used to indicate the parent directory for which any file has changed. The fourth field, file_directory_indicator 1540, may be used for indicating whether this particular CT key is a directory-based CT key for tracking directory change (e.g., setting to value 1) or a file-based CT key for tracking file change (e.g., setting to value 0). If it is a file-based CT key, the remaining fields for file-specific information, such as field 1550, and so on, can be used to identify further the specific changes to the file associated with this file-based CT key. For example, other fields (1550 and more) may include, but not limited to, epoch (indicating the time the CT key is generated), types of changes (e.g., creation, deletion, renaming file, linking), or an iNode number (for referencing a file or a directory) and other information necessary for cross-referencing to FS keys in the FSS B-tree. In some embodiments, different key structures may be used for the directory-based CT keys and file-based CT keys.

To list changes between two snapshots (e.g., N and N+1), one can search for the key prefix containing {file system number, snapshot number}. Such a key structure (or schema) can have the benefit of easily traversing FSS B-tree even when a small number of changes are made to file directory entries in a directory when that directory has a large number of files because the retrieved CT keys from the CT B-tree 1342 can be sorted and arranged to be next each other fora particular snapshot number in a particular file system.

C. Flowcharts

Figure 16:
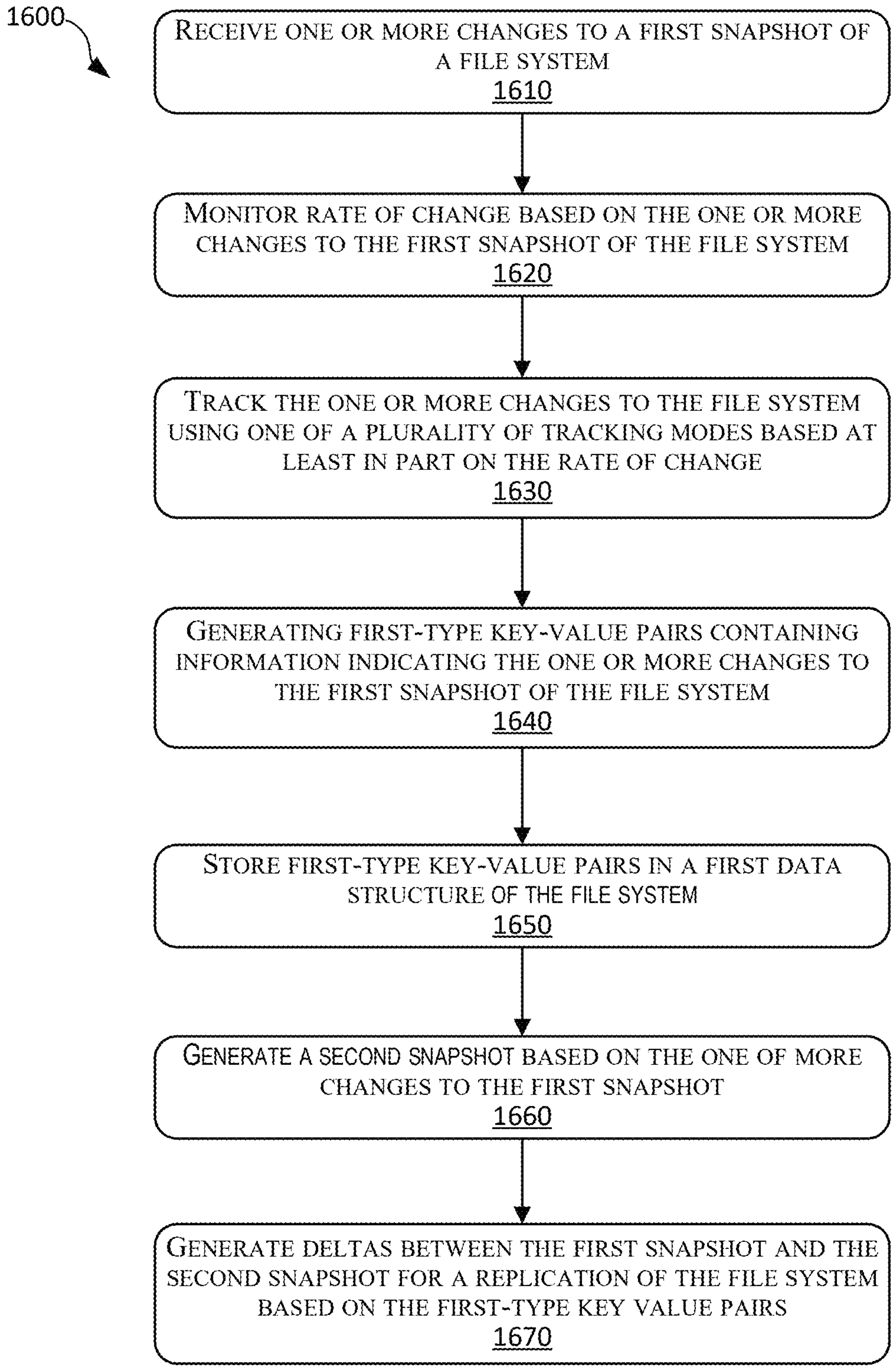
FIG. 16 is an example flowchart depicting processing performed by the CTDG system for one or more file systems, according to some embodiments.

1. General Process Flow of Change Tracking and Delta Generation (CTDG) System FIG. 16 is an example flowchart depicting processing performed by the CTDG system for one or more file systems, according to some embodiments. The processing depicted in FIG. 16 may be implemented in software (e.g., code, instructions, program) executed by one or more processing units (e.g., processors, cores) of the respective systems, using hardware, or combinations thereof. The software may be stored on a non-transitory storage medium (e.g., on a memory device). The method presented in FIG. 16 and described below is intended to be illustrative and non-limiting. Although FIG. 16 depicts the various processing steps occurring in a particular sequence or order, this is not intended to be limiting. In certain alternative embodiments, the processing may be performed in some different order or some steps may also be performed in parallel. It should be appreciated that in alternative embodiments the processing depicted in FIG. 16 may include a greater number or a lesser number of steps than those depicted in FIG. 16.

At step 1610, one or more changes to a first snapshot of a file system may be received. For example, in FIG. 13, a user client 1304 may request one or more changes to a file or many different files under a directory to a file system stored in the FSS B-tree 1340. The client's requests may be the pre-change information (e.g., intention to cause changes) that indicates the one or more changes to the first snapshot. The request for one or more changes to the first snapshot may eventually result in actual changes.

For the purpose of this disclosure, the received one or more changes may go through pre-change, actual change, and post-change stages. The pre-change stage may be the request for one or more changes, which is the intention to make or cause those changes. The actual change stage may occur when the one or more changes are committed in the system (e.g., database of the system). The post-change stage may occur when delta generation process of the replication has confirmed that the corresponding pre-change information (e.g., an indication to change an attribute or a data block in a file) in CT keys stored in the CT B-tree 1342 has been identified (e.g., data block has been changed) or does not exist in the FSS B-tree 1340. Thus, the term "one or more changes" may refer to pre-change information (or stage) in the context of CT keys and CT B-tree 1342, the actual-change stage in the context of FSS B-tree 1340, and the post-change stage in the context of the replication process.

At step 1620, the rate of change based on the received one or more changes to the first snapshot of the file system may be monitored. For example, in FIG. 13, the CT switch 1314 may monitor the rate of change requests (e.g., # of change requests per second) received from the user client 1304.

At step 1630, the one or more changes to the first snapshot of the file system may be tracked using one of a plurality of change-tracking modes (referring to sub-CT modes) based at least in part on the rate of change. For example, in FIG. 13, the CT switch 1314 may use either file-level CT mode or directory-level CT mode when CT is enabled to track the one or more change for each replication cycle depending on the rate of change.

At step 1640, first-type key-value pairs containing information indicating the one or more changes not yet committed to the first snapshot of the file system may be generated. The first-type key-value pairs may be divided into first subtype key-value pairs and second subtype key-value pairs. The first subtype key-value pairs may correspond to any of the one or more changes to a file in the first snapshot, and the second subtype key-value pairs may correspond to any of the one or more changes to files under a directory in the first snapshot. For example, in FIG. 13, change-tracking (CT) keys (an example of keys of the first-type key-value pairs) may be generated. The change-tracking keys may have two types, file-based CT keys (an example of the first subtype key-value pairs) and directory-based CT keys (an example of the second subtype key-value pairs). Each file-based CT key may include pre-change information indicating the one or more uncommitted changes to a file in the first snapshot, as shown in the schema 1500 of FIG. 15. Each directory-based CT key may include pre-change information indicating the one or more uncommitted changes to files under a directory in the first snapshot, as shown in the schema 1500 of FIG. 15.

At step 1650, the first-type key-value pairs may be stored in a first data structure of the file system. For example, the CT keys may be stored in the CT B-tree 1342 (an example of the first data structure) in the back-end subsystem 1330 that includes the file system the user client 1304 is requesting changes to. The first data structure may be configured to store uncommitted changes (i.e., pre-change information for tracking uncommitted changes).

At step 1660, a second snapshot of the file system may be generated based on the one of more changes that are committed to the first snapshot, and the first snapshot and the second snapshot are stored in a second data structure. For example, the file system may create a second snapshot based on the one of more changes (i.e., actual changes or committed changes) to the first snapshot, and both the first and second snapshots are stored in the FSS B-tree 1340 (an example of the second data structure). In other words, the second data structure may be configured to store committed changes.

At step 1670, deltas between the first snapshot and the second snapshot for a replication of the file system may be generated based at least in part on the first-type key-value pairs stored in the first data structure of the file system. The time of generating the deltas being proportional to the number of first-type key-value pairs. For example, the replication engine 1331 may generate deltas between the first snapshot and the second snapshot for a replication of the file system based on either the file-based CT keys or directory-based CT keys. The replication engine 1331 may obtain the CT keys in the CT B-tree 1342, and use the information (e.g., pre-change information) in the CT keys to traverse (or walk) the FSS B-tree 1340, containing the actual changes (or committed changes), to generate deltas. Additionally, as discussed above, the architecture of CTDG system in FIG. 13 can allow the delta generation time to be proportional to the number of changes (i.e., the number of CT keys) between two snapshots, rather than the size of the file system (e.g., traversing all nodes in the FSS B-tree). Further details regarding generating deltas using CT keys may be describe below in relation to FIGS. 19 and 20.

2. Change-Tracking Modes-Directory Level and File Level

Figure 17:
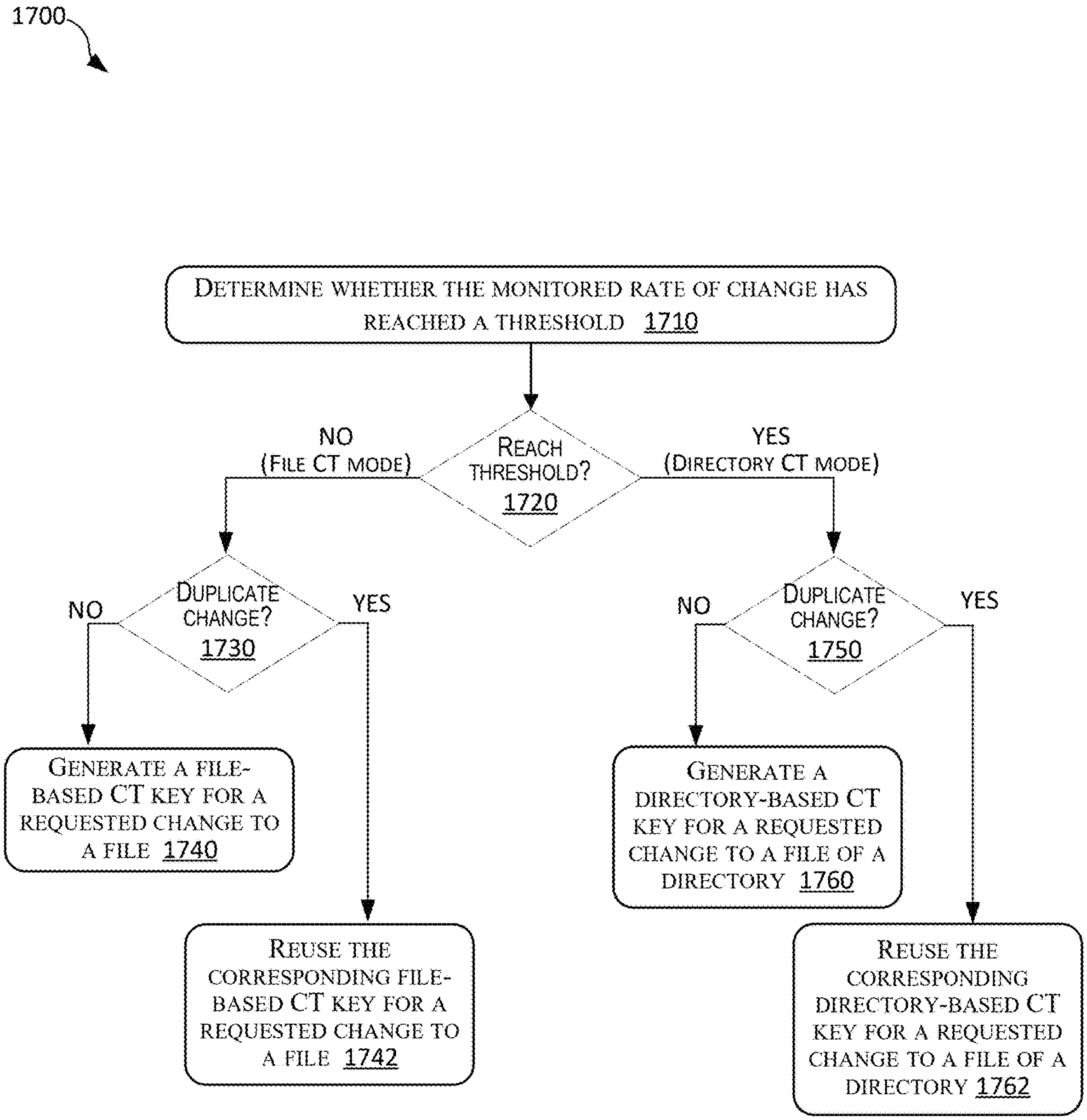
FIG. 17 is an example flowchart depicting the change-tracking mode-switching process for enabled change-tracking, according to some embodiments.

FIG. 17 is an example flowchart depicting the change-tracking mode-switching process for enabled change-tracking, according to some embodiments. FIG. 17 further describes details related to steps 1620-1640 of FIG. 16.

At step 1710, whether the monitored rate of change has reached a threshold may be determined. For example, in FIG. 13, as discussed above in relation to 1620 of FIG. 16, the CT switch 1314 may monitor the rate of change requests (e.g., # of change requests per second) received from the user client 1304, and then determine whether the rate of change has reached a threshold for switching sub-CT modes. A threshold for switching sub-CT modes may include, but not limited to, # of file changes per second, the percentage change of latency (e.g., 10% to 20%) within a period of time, and a change pattern indicating a steep increase instead of a short spike, etc.

At step 1720, if the rate of change has not reached the threshold, the process may proceed to step 1730, which is file-level CT mode. If the rate of change has reached the threshold, the process may proceed to step 1750, which is directory-level CT mode. In some embodiments, the CT mode may stay the same for an epoch (or a replication cycle) and switch toa different mode in the next replication cycle, even if the rate of change has gone above or below the threshold in the middle of a replication cycle.

At step 1730, whether a particular change to a file is a duplicate change may be determined. For example, in FIGS. 13 and 14, the default mode when a replication starts may be file-level CT mode. The CT switch 1314 may have a cache to detect duplicate changes for client 1 1304. The CT switch 1314 may work with a storage node (e.g., 1322 or 1324) to detect duplicate changes coming from multiple clients (e.g., client 1 1304 and client 2 1306). Further details describing duplication detection are described below.

If the requested change is a non-duplicate change (e.g., the first change to a file of the file system), at step 1740, a file-based CT key may be generated for a requested change to a file using the schema discussed in FIG. 15. The file_directory_indicator 1540 may be set to 0 to indicate that the CT key is a file-based CT key.

If the requested change is a duplicate change (e.g., an exact duplicate or a file duplicate change), at step 1742, the corresponding file-based CT key may be reused. For a file duplicate change, the relevant field(s) 1550 of the key structure (i.e., the schema 1500) of the existing corresponding file-based CT key may be updated to reflect the change, but no new file-based CT key may be created.

At step 1750, whether a particular change to a directory is a duplicate change may be determined. For example, in FIGS. 13 and 14, The CT switch 1314 may have a cache to detect duplicate changes for client 1 1304. The CT switch 1314 may work with a storage node (e.g., 1322 or 1324) to detect duplicate changes coming from multiple clients (e.g., client 1 1304 and, client 2 1306).

If the requested change is a non-duplicate change (e.g., the first change to a file of a directory of the file system), at step 1760, a directory-based CT key may be generated for a requested change to the file of the directory using the schema discussed in FIG. 15. The file_directory_indicator 1540 may be set to 1 to indicate that the CT key is a directory-based CT key.

If the requested change is a duplicate change (e.g., an exact duplicate or a directory duplicate change), at step 1762, the corresponding directory-based CT key may be reused. For a directory duplicate change, the relevant field(s) 1550 of the key structure (i.e., the schema 1500) of the existing corresponding directory-based CT key may be updated to reflect the affected file, but no new directory-based CT key may be created.

3. Duplication Detection

Figure 18:
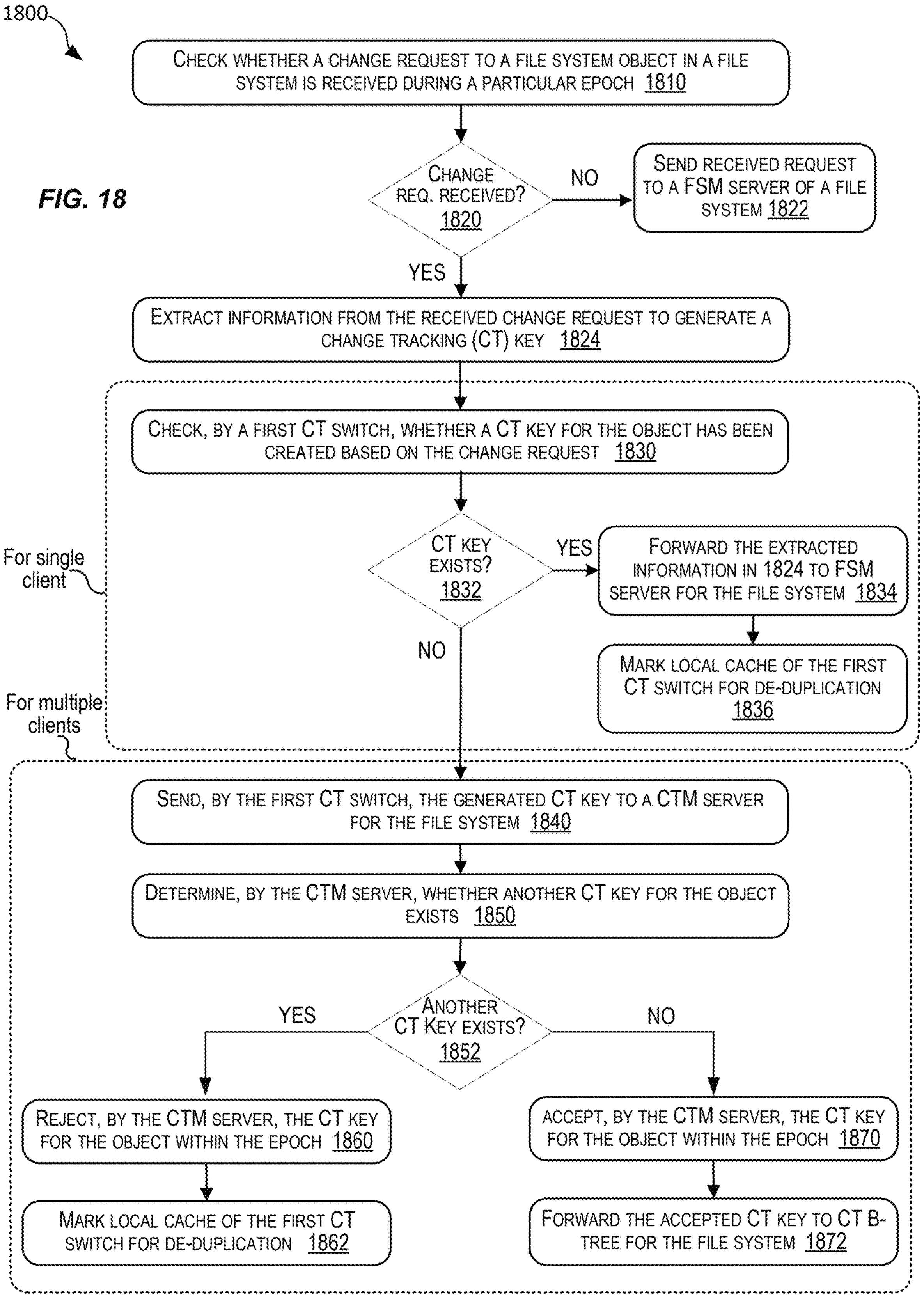
FIG. 18 is an example flowchart depicting a method for detecting duplicate changes and performing de-duplication, according to some embodiments.

FIG. 18 is an example flowchart depicting a method for detecting duplicate changes and performing de-duplication, according to some embodiments. As discussed above, CTDG may detect duplicate changes to the same file or directory of a file system, and also de-duplicate to avoid future duplicates by not generating the same CT keys by the front-end subsystem associated with each client. In FIG. 18, steps 1830-1836 may be related to a single client, while steps 1840-1862 may be related to multiple clients.

At step 1810, whether a change request to a file system object in a file system is received during a particular epoch may be checked. For example, in FIGS. 13 and 14, during a particular epoch, the front-end subsystem 1310 may receive a request (e.g., reading a file or modifying a file) from client 1 1304.

At step 1820, if the received request is not a change request, the process proceeds to step 1822. At step 1822, the received request may be sent or forwarded to an FSM server of a file system. For example, if non-modifying operation (e.g., reading a file) may be forwarded by CT switch 1 (e.g., 1314) to an FSM server (1322*a*), which may further forward the request to back-end subsystem 1330 for accessing FSS B-tree 1340.

] Returning to step 1820, if the received request is a change request, the process may proceed to step 1824. At step 1824, information from the received change request may be extracted to generate a change tracking (CT) key. For example, in FIGS. 13 and 14, a change request from client 1 1304, such as modifying operation (e.g., renaming a file), may have information about which file system, which snapshot number, which file, and the new name to be changed to. These information may be extracted by the CT switch 1 1314 and used to create a CT key with the schema depicted in FIG. 15. The CT key may be file-based CT key and directory-based CT key depending on the sub-CT mode the CT switch 1 1314 is currently performing under.

Steps 1830-1836 may be related to a single client. At step 1830, a first CT switch may check whether a CT key for the file system object has been created based on the change request. For example, in FIG. 13, a local cache in CT switch 1 1314 can be used to temporarily store information about CT keys that have been generated. When receiving a change request from client 1 1304, CT switch 1 1314 may check its local cache to see if a CT key corresponding to the change request has been created. Because both file-based CT key and directory-based CT key use the same schema, and the sub-CT mode does not switch during an epoch, a later change to the same file or directory as a previous change can be easily detected.

At step 1832, if the CT key exists according to CT switch 1's local cache, the process proceeds to step 1834. At step 1834, the extracted information in 1824 may be forwarded to FSM server for the file system, but not a CTM server for the file system. Because the CT key has already been created (i.e., receive subsequent change that is a duplicate—-exact duplicate, file duplicate change, or directory duplicate change), in some embodiments, CT switch 1 1314 may update one or fields in schema of the existing CT key, and also forward the information extracted from the change request (e.g., renaming file name) to FSM server 1322*a*, which may further forward the information to store actual change (based on the change request) in FSS B-tree 1340 in the back-end subsystem 1330.

At step 1836, the local cache of the first CT switch may be marked for de-duplication. For example, CT switch 1 1314 may mark an entry related to the existing CT key in its cache to indicate that a CT key for the particular file or directory that the change request directed to already exists and should not be generated again. In some embodiments, for example, in FIG. 13, once the CTM server 1322*b* captures the information in the CT key (e.g., iNode number allowing to identify an iNode data structure that stores metadata about a file or directory), that captured information remains valid for subsequent changes to the same file or directory.

Returning to step 1832, if the CT key does not exist according to CT switch 1's local cache, the process proceeds to step 1840. The following steps, 1840-1862, may be related to multiple clients. At step 1840, the first CT switch may send the generated CT key in 1830 to a CTM server for the file system. For example, in FIG. 14, CT switch 1 1314 associated with client 1 1304 may send the generated CT key to CTM server 1322*b* for file system 1 because CT switch 1 1314 believes the change request may be a non-duplicate change.

At step 1850, the CTM server may determine whether another CT key for the file system object exists. In some embodiments, the CTM server 1322*b* may include a global change log for all changes made to file system 1. For example, in FIG. 14, CT switch 1 1314 associated with client 1 1304 and CT switch 2 1318 associated with client 2 1306 may both access the same file system (e.g., file system 1), and thus generate CT keys to send to CTM server 1322*b* in storage node 1 1322. Client 1 1304 and client 2 1306 may request the same change to a file or a directory. If client 2 1306 sends its change request with its generated CT key for the file system object to the CTM server 1322*b* first, the global change log of the CTM server 1322*b* may be able to detect another duplicate change request from client 1 1304.

At step 1852, if CTM server determines that another CT key exists (i.e., duplicate CT key exists), the process proceeds to step 1860. At step 1860, the CTM server, may reject the CT key for the file system object within the epoch. For example, in FIG. 14, if client 2 1306 sends its change request with its generated CT key for the file system object to the CTM server 1322*b* before, the CTM server 1322*b* may inform CT switch 1 1314 associated with client 1 1304 that it may reject client 1's change request.

At step 1862, the first CT switch may mark its local cache for de-duplication. For example, in FIG. 14, once the CT switch 1 1314 associated with client 1 1304 receives a response from the CTM server 1322*b* that a duplicate CT key exists due to another client (e.g., client 2 1306), CT switch 1 1314 may mark the corresponding entry related to the duplicate CT key such that it does not generate that CT key again. As discussed above, in some embodiments, for example, in FIG. 14, once the CTM server 1322*b* captures the information in the CT key from client 2 1306 (e.g., iNode number allowing to identify an iNode data structure that stores metadata about a file or directory), that captured information remains valid for subsequent changes to the same file or directory by other clients, including client 1 1304. The backend subsystem 1330 may use the latest state of the file or directory to perform replication.

Returning to step 1852, if CTM server determines that no duplicate CT key exists, the process proceeds to step 1870. At step 1870, the CTM server may accept the CT key for the file system object within the epoch. For example, the CTM server 1322*b* may inform CT switch 1 1314 that the CT key is accepted.

At step 1872, the accepted CT key may be forwarded (or passed) to a CT B-tree server for the file system. For example, CTM server 1322*b* may forward the accepted CT key from CT switch 1 1314 to CT B-tree 1342 for replication use. The replication engine 1331 may use the information in the CT key to perform delta generation (discussed below).

4. Backend Replication (including Delta Generation)

Figure 19:
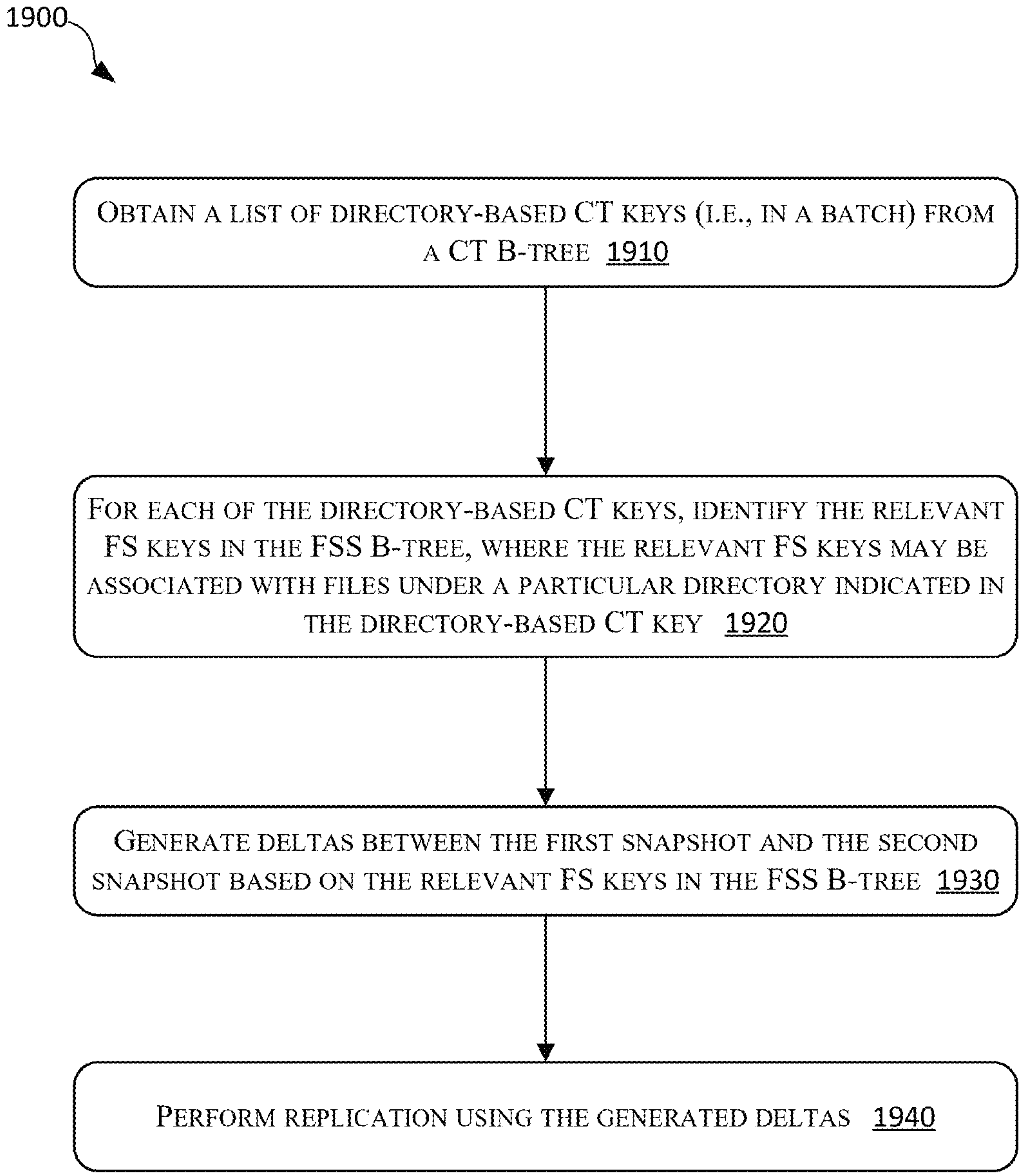
FIG. 19 is an example flowchart depicting an example replication processing using directory-based change-tracking (CT) keys, according to some embodiments.

FIGS. 19 and 20 may further describe details related to steps 1670 of FIG. 16. FIG. 19 is an example flowchart depicting an example replication processing using directory-based change-tracking (CT) keys, according to some embodiments. At step 1910, a list of directory-based CT keys may be obtained from a CT B-tree for a particular epoch. For example, in FIG. 13, the replication engine 1331 may access the CT B-tree 1342 to obtain a list (i.e., in a batch) of directory-based change-tracking (CT) keys for a given epoch. In some embodiments, parallel processing may be performed by the replication engine 1331 by partitioning all CT keys in the CT B-tree 1342 into several ranges and using multiple threads to extract the CT keys in these ranges in parallel. In some embodiments, steps 1910-1940 may be repeated for each list of directory-based CT keys obtained until all CT keys are processed.

At step 1920, for each of the directory-based CT keys, the relevant metadata keys (or FS keys) in the FSS B-tree may be identified, where the relevant FS keys may be associated with files under a particular directory indicated in the directory-based CT key. For example, the replication engine 1331 may use the information (e.g., file system number 1510, snapshot number 1520, parent directory number 1530, etc.) in the schema of each directory-based CT key (i.e., the pre-change information) to find the corresponding FS key (or metadata key) in the FSS B-tree 1340 that contains the parent directory mapped to parent directory number 1530 in the obtained directory-based CT key, and then the files, including their associated key-value pairs, under that parent directory.

At step 1930, deltas between a first snapshot and a second snapshot are generated based on the relevant FS keys in the FSS B-tree. For example, the replication engine 1331 may traverse (or walk) the FSS B-tree 1340 to identify the metadata keys containing changes (i.e., deltas) between two snapshots for replication. In some embodiments, the file-specific information (e.g., 1550, . . . ) in the schema of the directory-based CT key may be used to speed up the B-tree walk of FSS B-tree 1340. Because the replication engine 1331 already knows which specific directories to traverse in the FSS B-tree 1340 based on the information in the directory-based CT key, there is no need to walk the whole FSS B-tree 1340. In step 1940, the replication may be performed using the deltas generated in 1930.

FIG. 20 is an example flowchart depicting an example replication processing using file-based change-tracking (CT) keys, according to some embodiments. At step 2010, the total number of file-based CT keys in a CT B-tree for a particular epoch may be determined. For example, in FIG. 13, the replication engine 1331 may access the CT B-tree 1342 to determine the total number of file-based CT keys for a particular epoch. In some embodiments, the total number of file-based CT keys may not be available. Under such a situation, replication engine 1331 may begin obtaining the file-based CT keys and track the number of CT keys it has obtained.

At step 2020, if the total number of file-based CT keys is equal to or above a threshold, the process proceeds to step 2030. Otherwise, the process proceeds to step 2040. If the total number of file-based CT keys in 2010 is above a threshold or the tracked number of obtained file-based CT keys is above the threshold, the replication engine 1331 may determine that it may be more efficient to perform the regular FSS B-tree walk. The threshold may depend on some factors, such as recovery point objective (RPO), the number of changes compared to the size of the file system, etc. For example, an example threshold may be 100,000 file-based CT keys for a large file system. However, for a smaller file system, if the number of file-based CT keys is above 70~80% of the total FS keys in the file system, the regular FSS B-tree walk may work fine because the cross-checking between CT B-tree 1342 and FSS B-tree 1340 may incur overhead (e.g., back-end I/O traffic).

At step 2030, delta generation may be performed by traversing an FSS B-tree. For example, replication engine 1331 may perform regular FSS B-tree 1340 walk to generate deltas without further obtaining more file-based CT keys from the CT B-tree 1342.

If the total number of file-based CT keys is lower than the threshold, at step 2040, a list of file-based CT keys may be obtained from the CT B-tree. For example, in FIG. 13, the replication engine 1331 may access the CT B-tree 1342 to obtain a list (i.e., in a batch) of file-based change-tracking (CT) keys for a given epoch. In some embodiments, parallel processing may be performed by the replication engine 1331 by partitioning all CT keys in the CT B-tree 1342 into several ranges and using multiple threads to extract the CT keys in these ranges in parallel. In some embodiments, steps 1910-1940 may be repeated for each list of file-based CT keys obtained until all CT keys are processed.

At step 2050, for each of the file-based CT keys, the relevant metadata keys (or FS keys) in the FSS B-tree may be identified. For example, the replication engine 1331 may use the information (e.g., file system number 1510, snapshot number 1520, file specific info 1550, etc.) in the schema of each file-based CT key (i.e., the pre-change information) to find the corresponding FS key (or metadata key) in the FSS B-tree 1340.

Steps 2060-2070 are similar to steps 1930-1940 of FIG. 19, except that the delta generation performed by the replication engine 1331 may use the information in file-based CT keys. In other words, the replication engine 1331 may only need to traverse the metadata keys (or FS keys) corresponding to the obtained file-based CT keys, instead of the whole FSS B-tree 1340.

III. Enabling and Disabling Change Tracking

A. Architecture

As discussed earlier, in a multi-client system, change-tracking may be enabled or disabled for different clients because of various system issues (e.g., I/O errors, network problems, etc.). Multiple clients (using their respective front-end subsystems) accessing a file system may see different progress of snapshots due to network latency or other issues (e.g., patching, deployment, crash).

1. Multiple Clients and Multiple Replications

Figure 21:
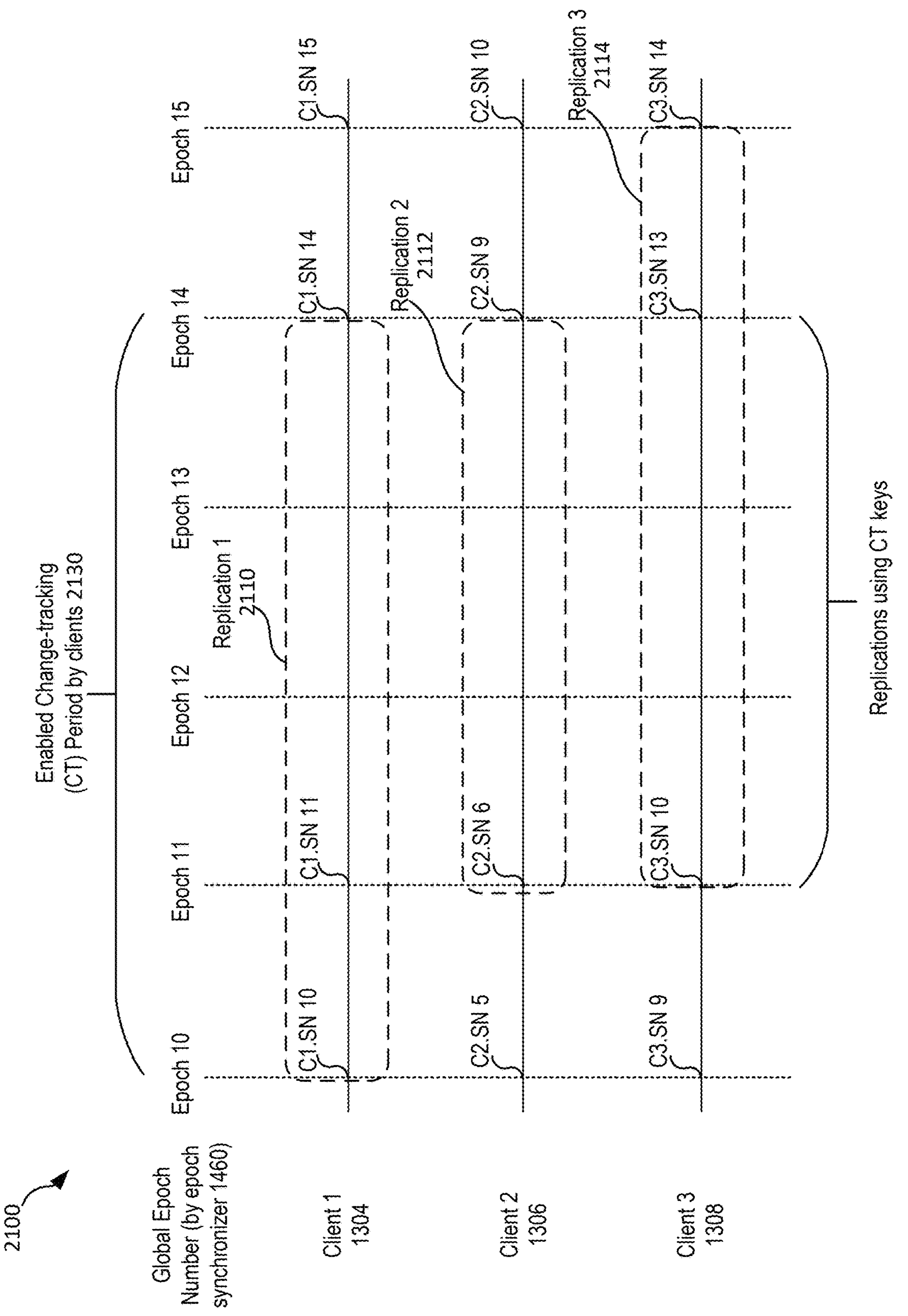
FIG. 21 is an example diagram depicting multiple parallel-running replications in a multi-client CTDG system, according to some embodiments.

FIG. 21 is an example diagram depicting multiple parallel-running replications in a multi-client CTDG system, according to some embodiments. In FIGS. 14 and 21, in some embodiments, CTDG 1300 may be capable of serving multiple clients (e.g., client 1 1304, client 2 1306, client 3 1308, etc.). Each client of the multiple clients may make changes, through its front-end subsystem (e.g., 1310, 1316, . . . ), to the same file system in FSS B-tree 1340 in the back-end subsystem 1330, and thus generates a set of snapshots in the file system, for example, a first set of snapshots (C1.SN 10 to C1.SN 15) for client 1 1304, a second first set of snapshots (C2.SN 5 to C2.SN 10) for client 2 1306, a third first set of snapshots (C3.SN 9 to C3.SN 14) for client 3 1308. A global epoch number (e.g., epoch 10 to epoch 15) may be maintained by an epoch synchronizer 1460 (discussed below). In FIG. 21, client 2 1306 may encounter some problems and stop generating snapshots for some time. However, client 2 may still catch up to the latest epoch number (e.g., epoch 10) when it resumes generating its set of snapshots (e.g., C2.SN5, and more). In some embodiments, once a new snapshot is taken based on changes added or made to an old snapshot of the file system, the new snapshot may become immutable (i.e., cannot be changed).

As shown in FIG. 21, each front-end subsystem associated with a client (e.g., client 1 1304, client 2 1306, client 3 1308, etc.) may enable or disable its CT mode depending on its need (e.g., I/O traffic). When the CT mode for a particular front-end subsystem is enabled, its generated CT keys (either file-based CT keys or directory-based CT keys) may be stored in the same CT B-tree 1342. For example, client 1304 associated with front-end subsystem 1310 having CT mode enabled may make changes to a first set of snapshots (e.g., C1.SN*) in the file system in FSS B-tree 1340, and store its CT keys in the CT B-tree 1342. On the other hand, client 1306 associated with front-end subsystem 1316 having CT mode disabled may make changes to a second set of snapshots (e.g., C2.SN*) in the file system in FSS B-tree 1340. No CT keys are generated for the second set of snapshots.

Additionally, a replication may be performed for each client separately and in parallel based on its set of snapshots by accessing the CT keys stored in CT B-tree 1342 and traversing FSS B-tree 1340 to generate deltas based on the change-tracking information in the retrieved CT keys. For example, replication 1 2110 performed for client 1 1304 may start at epoch 10 and end at epoch 14. Replication 2 2112 performed for client 2 1306 may start at epoch 11 and end at epoch 14. Replication 3 2114 performed for client 3 1308 may start at epoch 11 and end at epoch 15.

Because the CT keys of each client have a file system number 1510 and snapshot number 1520, as shown in FIG. 15, the retrieved CT keys from the CT B-tree 1342 can be sorted and arranged to be next to each other for a particular snapshot number in a particular file system. Thus, the replications performing on the particular snapshot number (or epoch) for multiple clients can use the group of CT keys sorted under the particular snapshot number to traverse (or walk) the FSS B-tree 1340 to generate deltas.

However, if one client (e.g., 1304) has CT mode enabled and generates CT keys for a particular snapshot (e.g., at epoch 10), but another client (e.g., 1306) has not enabled CT for another snapshot (e.g., also at epoch 10), the replications may become quite complicated because the replication engine 1331 may access CT keys in CT B-tree 1342 for client 1304 but not doing so for client 1306. Additionally, because CT keys stored in the CT B-tree 1342 may not be distinguishable among different clients (e.g., 1304 and 1306), replications performing on the particular snapshot number (e.g., epoch 10) may have problems or result in data corruption.

The disclosed techniques may coordinate the enablement/disablement of change tracking by different clients to ensure that all clients have the same CT mode (i.e., enabled or disabled) in a range of snapshots (or epoch numbers), for example, an enabled CT period by clients 2130 between epoch 10 and epoch 14, as shown in FIG. 21. Thus, the replications 1, 2,and 3 (2110, 2112, and 2114) can use change-tracking information (e.g., CT keys) in CT B-tree 1342 for delta generation safely at and after epoch 11 until epoch 14. In some embodiments, replications may delay one epoch to access CT B-tree 1342 to avoid the uncertainty that some clients may enable their CT between epochs. Because these replications have an agreed range of epoch numbers with CT enabled or disabled from all clients, some replications may progress faster than others without waiting for each other. The last replication that reaches the ending epoch (e.g., epoch 14) with CT enabled may clean up or delete the corresponding CT information in CT B-tree 1342.

2. CT Enable/Disable Control and Epoch Synchronizer

Referring to FIG. 14, an epoch synchronizer 1460, which may be part of a file system in the back-end system 1330, may be used to synchronize snapshot generation for each set of snapshots for each client to ensure all clients accessing that file system can generate snapshots (or are in the same epoch) at roughly the same pace or can catch up to the latest central epoch if some clients fall behind (e.g., due to system issues). Additionally, all front-end subsystems may atomically update a central change tracking (CT) record 1450 that can be read by replication engine 1340 of the back-end subsystem 1330 for determining which epoch is safe to start replication in enabled CT mode (i.e., using CT keys in the CT B-tree for traversing/walking FSS B-tree for delta generation). In other words, epoch synchronizer 1460 and central CT record 1450, when working together, allow all clients to agree on an epoch number (e.g., epoch 11 and epoch 14 of FIG. 21) that all clients (or front-end subsystems 1310, 1316, . . . ) are in the same CT mode (i.e., enabled or disabled). And, replication engine 1331, working with epoch synchronizer 1460, may try to ensure all clients have reached the agreed epoch number through epoch synchronizer 1460 before starting replications. Therefore, the replication engine 1331 can safely start replications in enabled CT mode on or after the agreed epoch number (called common epoch number) for all clients. In summary, two conditions should be met when the replication engine 1331 can start a replication under enabled CT mode (i.e., using CT keys in CT B-tree 1342) for a particular client: (1) a common epoch number has been identified, and (2) all clients have advanced/reached to the common epoch number.

In some embodiments, the back-end subsystem 1330 may perform replications with enabled CT (i.e., enabling CT by using CT keys in CT B-tree 1342) for a range of epochs (e.g., epoch 11 to epoch 14 of FIG. 21), and then return back to normal delta generation without using the CT keys in CT B-tree 1342 (i.e., disabled CT after epoch 14). The replications for different clients may proceed at their own pace within that range. In other words, once all replications can start or stop using/consuming CT keys in CT B-tree 1342 at the same epoch number, the consistency of delta generation for these replications can be achieved.

a) Epoch Synchronizer

In FIG. 14, in some embodiments, epoch synchronizer 1460, which may be part of a file system in the back-end system 1330, may utilize a leasing mechanism to synchronize all front-end subsystems 1310, 1316, etc. (associated with clients 1304, 1306, . . . ) to advance with the same epoch numbers when generating their respective set of snapshots in the file system in FSB B-tree 1340. For example, front-end subsystem 1 1310 (or client 1) likes to create a first snapshot (referred to as C1 snapshot 1, or C1.SN1) of its set of snapshot. It may request a lease from epoch synchronizer 1460, which may last for some time (e.g., five seconds). Once epoch synchronizer 1460 gives the lease to front-end subsystem 1, epoch synchronizer 1460 can make a note that the file system has entered epoch number 1 (or epoch 1), and inform front-end subsystem 1 that its C1.SN1 is in epoch 1. If front-end subsystem 1 wants to create a C1.SN2, it may not do so until its lease has expired, and the epoch synchronizer 1460 gives front-end subsystem 1 another lease for creating C1.SN2. At that time, the epoch synchronizer 1460 can indicate that the file system has reached epoch 2, and inform front-end subsystem 1 that its C1.SN2 is in epoch 2. The epoch number maintained by epoch synchronizer 1460 for the file system may be referred to as the global epoch number for that file system.

Similarly, epoch synchronizer 1460 may use the same leasing mechanism for front-end subsystem 2 1316 (or client 2) to maintain client 2's snapshot generation pace, for example, generating C2.SN1 in epoch 1 and C2.SN2 in epoch 2, and so on. As a result, all clients accessing the same file system in FSS B-tree 1340 can generate their respective sets of snapshots in the same epoch numbers (e.g., epoch 1, epoch 2, . . . ).

However, as shown in FIGS. 14 and 21, suppose a front-end subsystem (e.g., client 2 1306 associated with front-end subsystem 2 1316), after creating a snapshot C2.SN4 at epoch 4,may lose communication with the epoch synchronizer 1460 for some time, for example, due to network issues. By the time, the front-end subsystem of client 2 1306 wakes up or reconnects with the epoch synchronizer 1460, other front-end subsystems (e.g., client 1 1304) may have advanced to epoch 10. At the time when client 2 1306 (or front-end subsystem 2 1316) reconnects with the epoch synchronizer 1460 and asks for a new lease, epoch synchronizer 1460 can inform client 2 1306 that its new snapshot (e.g., C2.SN5) will be in epoch 10 although that new snapshot may be its fifth snapshot. As a result, client 2 1306 (or front-end subsystem 2 1316) can be updated to the latest global epoch number (epoch 10) as the other front-end subsystems.

b) CT Enable/Disable Control

Referring to FIG. 14, a central change-tracking (CT) record 1450, which may be part of the shared database (SDB), can be used for CT enable/disable control. The central CT record 1450 may include two fields, CT mode (e.g., a single bit being set to 1 for enabling CT and 0 for disabling CT) and epoch number (e.g., a particular global epoch number that CT was enabled). This central CT record 1450 can be read and updated by CT switch (e.g., 1314, 1318, . . . ) in front-end subsystems 1310 and 1316 associated with clients (e.g., 1304, 1306, . . . ), and read by replication engine 1331 to know when may be safe to start replications in the back-end subsystem 1330 for all clients.

The central CT record 1450 may enable clients to share their history of CT mode and epoch numbers, such that they can adjust their respective CT mode and epoch numbers to reach a common epoch number that all clients are in the same CT mode (e.g., enabled or disabled), such that the replication engine 1331 can use that common epoch number to start the delta generation process of replications for all clients.

In some embodiments, each CT switch (e.g., 1314) of a client's (e.g., 1304) front-end subsystem (e.g., 1310) may have two threads for checking the content of the central CT record 1450 to refresh the local CT record: a polling thread that performs periodic checks, and a user request thread that performs a check upon receiving a user request (e.g., enable/disable CT). A client may update the central CT record 1450 when it wants to change CT mode.

As an example of enabling CT for replications, in FIGS. 14 and 21, suppose client 1 (1304 or 1314) may enable CT at epoch 9 by updating the central CT record 1450 to have CT enabled and epoch 9—i.e., ("CT enabled, epoch 9"). If client 2 (1306 or 1318) which had CT disabled and lost connection with the back-end subsystem 1330 by not advancing its epoch numbers (e.g., staying at epoch 3 when connection was lost—i.e., its local CT record has ("CT disabled, epoch 3")), may recover (or wake up) at some point and check the central CT record 1450 finding out that some other clients (e.g., client 1) have enabled CT at epoch 9. Because client 2's local CT record has a lower epoch number (e.g., epoch 3) than the central CT record 1450 (e.g., epoch 9), it knows it may have fallen behind. Client 2 may check with the epoch synchronizer 1460 to obtain the latest global epoch number, for example, epoch 10, and then update the central CT record 1450 to epoch number 10. After client 2's update, the central CT record 1450 now has ("CT enabled, epoch 10"), which may also be reflected in client 2's local CT record. As a result, client 2 may enable its CT at epoch 10, accordingly. Since both client 1 (1314) and client 2 (1318) have CT enabled (i.e., in the same CT mode) sometime during epoch 10 (i.e., common epoch number), replication engine 1331 can safely use the information in the CT keys in CT B-tree 1342 at epoch 11 (i.e., the common epoch number+1) to traverse FSB B-tree 1340 for delta generation as part of performing replications for both client 1 and client 2. Delaying one epoch to access CT B-tree 1342 can avoid the uncertainty that some clients may enable their CT between epochs. In some embodiments, the replication engine 1331 may work with epoch synchronizer 1460 to ensure all clients' leases have expired at epoch 10 (i.e., all clients have reached epoch 10) before starting replications using CT keys for all clients at epoch 11.

In certain embodiments, since the epoch number (e.g., epoch 9) in the central CT record 1450 is higher than client 2's local epoch number (e.g., epoch 3) when it checks, client 2 may only update its local CT record to be the same value as in the central CT record 1450 ("CT enabled, epoch 9") without the extra step of checking epoch synchronizer. In that situation, the common epoch number may become epoch 9. Thus, replication engine 1331 can start using/consuming CT keys in CT B-tree 1342 at epoch 10.

For an example of disabling CT for replications, suppose the central CT record 1450 may currently have ("CT enabled, epoch 10"). Because the file system may be configured to perform replication under CT for a range of snapshots or epochs (e.g., epoch 11 to epoch 14 shown in FIG. 21), the control plane (CP) of a file system may set the central CT record 1450 to be ("CT disabled, epoch 14") when the global epoch number has reached epoch 14. Any client that checks the central CT record 1450 may immediately disable its CT by updating its local CT record to be ("CT disabled, epoch 14"). Once the replication engine 1331 stops using/consuming CT keys in the CT B-tree 1342, any clients who store CT keys in the CT B-tree 1342 may not be used. In other words, the replication engine 1331 may just perform the regular B-tree walk on FSS b-tree 1340.

In some embodiments, a control plane (CP) of a file system may be responsible for updating the CT mode field of the central CT record, while clients can update only the epoch number in the central CT record 1450. In other words, a client may inform CP about its desire to enable/disable CT mode for CP to update the CT mode field because CP has global visibility fora file system to know whether any issue has occurred in the file system to determine whether to enable/disable CT mode.

B. Flowcharts

1. General Processing Flow

FIG. 22 is an example flowchart depicting a method for enabling and disabling change tracking during replications, according to some embodiments. At step 2210, a central change-tracking record may be created, where the central CT record is used to determine when to use the change-tracking information stored in a first data structure (e.g., CT B-tree 1342). For example, in FIG. 14, a central CT record 1450 may be created by a file system in the CTDG system. The central CT record 1450, which may be part of the shared database (SDB), can be used for CT enable/disable control. An SDB may be for communication between data plane (including front-end subsystems, storage subsystems, and a back-end subsystem) and control plane (not shown) of CTDG system. The central CT record 1450 may be used to determine when replications performed for clients (1304, 1306, . . . ) can use the change-tracking information stored in CT B-tree 1342.

At step 2220, snapshot generation among front-end subsystems, each generating a set of snapshots in a file system may be synchronized. For example, in FIGS. 14 and 21, an epoch synchronizer 1460, which may be part of a file system in the back-end system 1330, may utilize a leasing mechanism to synchronize snapshot generation in a file system requested by all clients (1304-1308) associated with front-end subsystems 1310, 1316, etc., such that all front-end subsystems can advance with the same epoch numbers when generating their respective set of snapshots in the file system in FSB B-tree 1340. For example, in FIG. 21, client 1 1304 and client 2 1306, although generating different snapshot numbers (e.g., C1.SN10 and C2.SN5), can generate their respective snapshots at the same time or pace (e.g., epoch 10 for C1.SN10 and C2.SN5, and epoch 11 for C1.SN11 and C2.SN6, etc.).

At step 2230, each front-end subsystem may control its change-tracking mode individually for tracking changes made to its respective set of snapshots. For example, in FIGS. 14 and 21, client 1 1304 associated with front-end subsystem 1310 can control its CT mode (e.g., whether to enable or disable CT, or even file-level or directory-level if CT is enabled) for its set of snapshots (e.g., C1.SN1, C1.SN2, . . . ). Similarly, client 2 1306 associated with front-end subsystem 1316 can control its CT mode (e.g., whether to enable or disable CT, or even file-level or directory-level if CT is enabled) for its set of snapshots (e.g., C2.SN1, C2.SN2, . . . ).

At step 2240, the central change-tracking record may be used to identify a common snapshot generation time (i.e., a common epoch number) among the sets of snapshots, where the common epoch number is a particular snapshot generation time in which all front-end subsystems are in the same change-tracking mode. For example, in FIGS. 14 and 21, all clients (1304 to 1308), by checking and updating through central CT record 1450, may agree on a common epoch number (e.g., epoch 10) in which all clients have their CT enabled and another common epoch number (e.g., epoch 14) in which all clients have their CT disabled. This may be achieved by using the process or protocol described in FIG. 23.

At step 2250, one or more replications, using change-tracking information, may be performed starting at or after the common snapshot number for the sets of snapshots. For example, as discussed in FIG. 21, replication engine 1331 may start accessing CT keys in CT B-tree 1342 at epoch 11 (i.e., the common epoch number+1) to traverse FSB B-tree 1340 for delta generation as part of performing replications for all clients (1304 to 1308) because delaying one epoch to access CT B-tree 1342 can avoid the uncertainty that some clients may enable their CT between epochs. In some embodiments, the replication engine 1331 may work with epoch synchronizer 1460 to ensure all clients' leases have expired at epoch 10 (i.e., all clients have reached epoch 10) before starting replications using CT keys in CT B-tree 1342 at epoch 11.

In some embodiments, once the one or more replications have started by using the change-tracking information in the CT B-tree 1342 for a particular epoch number, any late arriving CT keys from a client may not be accepted by the CT B-tree 1342 for that epoch number, but can be used for next epoch number.

2. Change-Tracking Enable/Disable Control

Figure 23:
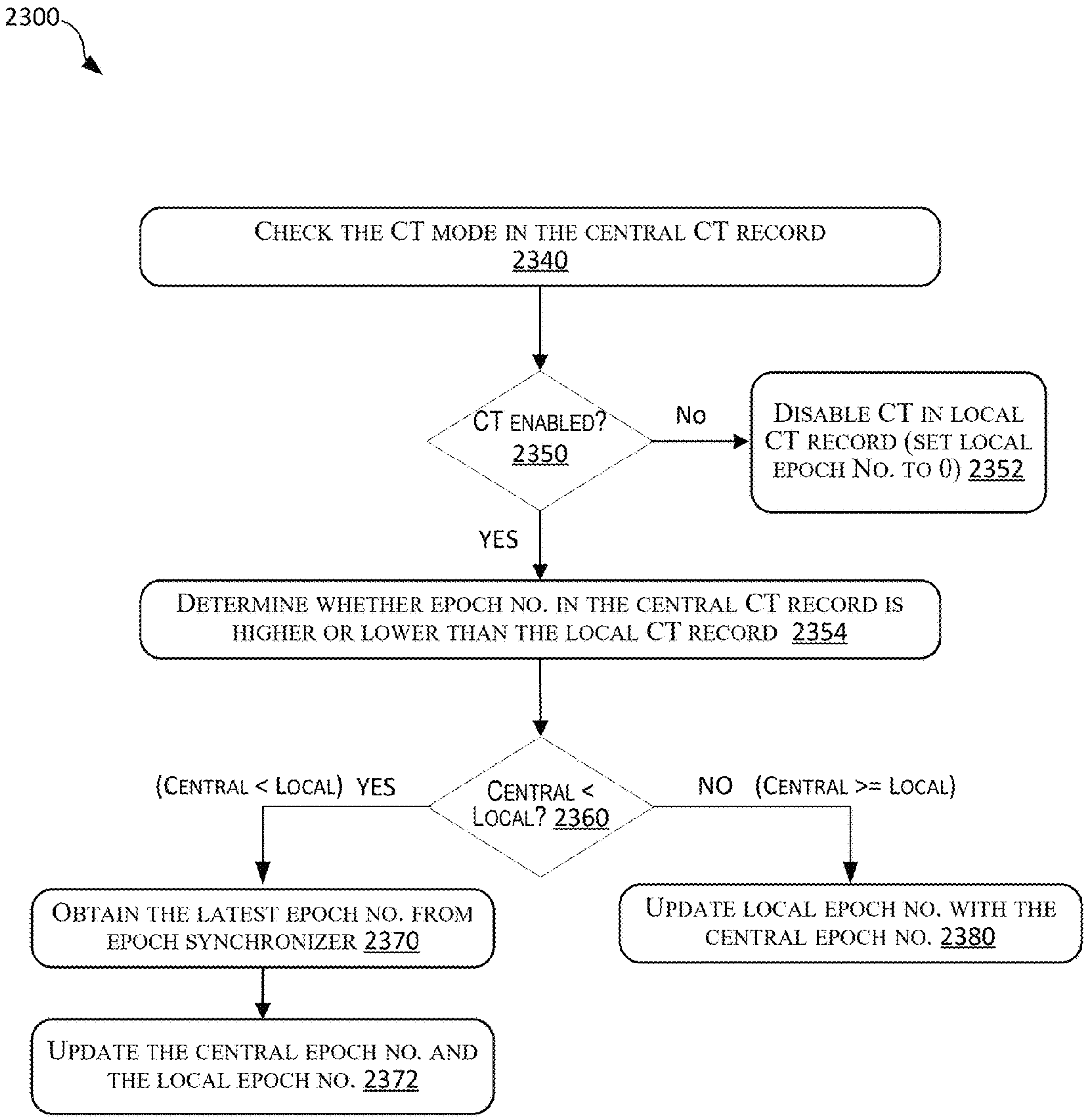
FIG. 23 is an example flowchart depicting a method for enabling and disabling change tracking using a central change-tracking record, according to at least one embodiment.

FIG. 23 is an example flowchart depicting a method for enabling and disabling change tracking using a central change-tracking record, according to at least one embodiment. FIG. 23 may provide further sub-steps for step 2240 in FIG. 22. As discussed above, the central CT record 1450 may enable clients to share their history of CT mode and epoch numbers, such that they can adjust their respective CT mode and epoch numbers to reach a common epoch number in which all clients are in the same CT mode.

At step 2340, the CT mode field in the central CT record may be checked. For example, as discussed above, the central CT record 1450 may include two fields, CT mode field (an example of common change-tracking mode field) and an epoch number field (an example of common snapshot generation time field). The CT mode field may be a single bit that can be set to 1 for enabling CT and 0 for disabling CT. The epoch number in the central CT record may be referred to as central epoch number, which is one of the global epoch numbers maintained by epoch synchronizer 1460. In FIG. 14, the CT switch (1314, 1318, . . . ) of each client (or front-end subsystem) may have a polling thread that can check the CT mode of the central CT record 1450 periodically.

At step 2350, if the CT is disabled in the central CT record 1450, the process proceeds to step 2352. At step 2352, the change tracking in local CT record may be disabled. For example, in FIG. 21, the back-end subsystem 1330 may be configured to perform replication under CT (i.e., enabling CT by using CT keys in CT B-tree 1342) for a range of snapshots (e.g., epoch 11 to epoch 14), and control plane (CP) of a file system may set the central CT record 1450 to be ("CT disabled, epoch 14") when the global epoch number has reached epoch 14. In some embodiments, when system errors occur in CTDG system, the CP may also disable CT by setting CT mode field to false (i.e., disable CT). Any client (i.e., its associated CT switch) that checks the central CT record 1450 may immediately disable its CT by updating its local CT record to be ("CT disabled, epoch 14"). In some embodiments, the local CT record may be set to ("CT disabled, epoch 0") once a client has disabled its CT because the local epoch number may not be used.

Returning to step 2350, if the CT is enabled in the central CT record 1450, the process proceeds to step 2354. At step 2354, whether the epoch number in the central CT record (referred to as central epoch number) is higher or lower than the epoch number in the local CT record (referred to as local epoch number) may be determined.

At step 2360, if the central epoch number is lower than the local epoch number, the process proceeds to step 2370. At step 2370, the latest epoch number may be obtained from epoch synchronizer. For example, if the central epoch number is lower than the local epoch number, that may indicate one client has updated the central CT record 1450 before but has lost connection with the back-end subsystem. As an example, in FIG. 21, client 2 1306 may updated the central CT record 1450 at epoch 8 to be ("CT enabled, epoch 8"), but lost connection with the back-end subsystem 1330. Client 1 1304 currently has CT disabled with a higher local epoch number (e.g., epoch 9) checks the central CT record 1450 may obtain the latest global epoch number (or latest snapshot generation time) from epoch synchronizer 1460, which may be epoch 9 (i.e., if client 1 is up-to-date) or epoch 10 (i.e., if client 1 has minor network delay).

At step 2372, the central epoch number and the local epoch number may be updated. Continuing with the above example, Client 1 1304 may update the central CT record 1450 to be ("CT enabled, epoch 10") with the latest epoch number, and also its local CT record to be the same. Client 1 1304 may also enable CT at epoch 10. As a result, other clients, such as client 2 1306 when checking the central CT record 1450 can update themselves based on the new values in the central CT record 1450. Because the epoch synchronizer 1460 may be aware that client 2 1306 has not reached epoch 10, the replications for clients may not use' CT keys in the CT B-tree 1342 for delta generation yet even the central CT record 1450 has "CT enabled."

Returning to step 2360, if the central epoch number is higher than or equal to the local epoch number, the process proceeds to step 2380. At step 2380, the local epoch number may be updated with the central epoch number. For example, if the central epoch number is higher than a client's local epoch number, it may indicate that the client that checks the central CT record may have just recently reconnected with the back-end subsystem 1330 or restarted. Using the example in step 2370, suppose client 2 1306 lost connection with the back-end subsystem 1330 at epoch 8, and reconnects with the back-end subsystem 1330, it may check the central CT record containing central epoch number 10 updated by Client 1 1304 in step 2372. Because the central epoch number (epoch 10) is higher than client 2's local epoch number (epoch 8), client 2 may only update its local CT record to be the same value as in the central CT record 1450 ("CT enabled, epoch 10"). Once the replication engine 1331 working with epoch synchronizer 1460 finds that all clients have reached epoch 10, the replication engine 1331 may start accessing CT keys in CT B-tree 1342 at epoch 11 for performing replications for all clients.

If the central epoch number is equal to a client's local epoch number, the client may not need to perform any update. In some embodiments, the client may also check the epoch synchronizer 1460 to obtain the latest global epoch number, and update both the central CT record and its local CT record if the latest global epoch number is higher.

IV. Example Cloud Service Provider Infrastructure (CSPI) Architectures

As noted above, infrastructure as a service (IaaS) is one particular type of cloud computing. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (example services include billing software, monitoring software, logging software, load balancing software, clustering software, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In most cases, a cloud computing model will require the participation of a cloud provider. The cloud provider may, but need not be, a third-party service that specializes in providing (e.g., offering, renting, selling) IaaS. An entity might also opt to deploy a private cloud, becoming its own provider of infrastructure services.

In some examples, IaaS deployment is the process of putting a new application, or anew version of an application, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand)) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different challenges for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more inbound/outbound traffic group rules provisioned to define how the inbound and/or outbound traffic of the network will be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed must first be set up. In some instances, the provisioning can be done manually, a provisioning tool may be utilized to provision the resources, and/or deployment tools may be utilized to deploy the code once the infrastructure is provisioned.

FIG. 24 is a block diagram 2400 illustrating an example pattern of an IaaS architecture, according to at least one embodiment. Service operators 2402 can be communicatively coupled to a secure host tenancy 2404 that can include a virtual cloud network (VCN) 2406 and a secure host subnet 2408. In some examples, the service operators 2402 may be using one or more client computing devices, which may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, and being Internet, e-mail, short message service (SMS), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 2406 and/or the Internet.

The VCN 2406 can include a local peering gateway (LPG) 2410 that can be communicatively coupled to a secure shell (SSH) VCN 2412 via an LPG 2410 contained in the SSH VCN 2412. The SSH VCN 2412 can include an SSH subnet 2414, and the SSH VCN 2412 can be communicatively coupled to a control plane VCN 2416 via the LPG 2410 contained in the control plane VCN 2416. Also, the SSH VCN 2412 can be communicatively coupled to a data plane VCN 2418 via an LPG 2410. The control plane VCN 2416 and the data plane VCN 2418 can be contained in a service tenancy 2419 that can be owned and/or operated by the IaaS provider.

The control plane VCN 2416 can include a control plane demilitarized zone (DMZ) tier 2420 that acts as a perimeter network (e.g., portions of a corporate network between the corporate intranet and external networks). The DMZ-based servers may have restricted responsibilities and help keep breaches contained. Additionally, the DMZ tier 2420 can include one or more load balancer (LB) subnet(s) 2422, a control plane app tier 2424 that can include app subnet(s) 2426, a control plane data tier 2428 that can include database (DB) subnet(s) 2430 (e.g., frontend DB subnet(s) and/or backend DB subnet(s)). The LB subnet(s) 2422 contained in the control plane DMZ tier 2420 can be communicatively coupled to the app subnet(s) 2426 contained in the control plane app tier 2424 and an Internet gateway 2434 that can be contained in the control plane VCN 2416, and the app subnet(s) 2426 can be communicatively coupled to the DB subnet(s) 2430 contained in the control plane data tier 2428 and a service gateway 2436 and a network address translation (NAT) gateway 2438. The control plane VCN 2416 can include the service gateway 2436 and the NAT gateway 2438.

The control plane VCN 2416 can include a data plane mirror app tier 2440 that can include app subnet(s) 2426. The app subnet(s) 2426 contained in the data plane mirror app tier 2440 can include a virtual network interface controller (VNIC) 2442 that can execute a compute instance 2444. The compute instance 2444 can communicatively couple the app subnet(s) 2426 of the data plane mirror app tier 2440 to app subnet(s) 2426 that can be contained in a data plane app tier 2446.

The data plane VCN 2418 can include the data plane app tier 2446, a data plane DMZ tier 2448, and a data plane data tier 2450. The data plane DMZ tier 2448 can include LB subnet(s) 2422 that can be communicatively coupled to the app subnet(s) 2426 of the data plane app tier 2446 and the Internet gateway 2434 of the data plane VCN 2418. The app subnet(s) 2426 can be communicatively coupled to the service gateway 2436 of the data plane VCN 2418 and the NAT gateway 2438 of the data plane VCN 2418. The data plane data tier 2450 can also include the DB subnet(s) 2430 that can be communicatively coupled to the app subnet(s) 2426 of the data plane app tier 2446.

The Internet gateway 2434 of the control plane VCN 2416 and of the data plane VCN 2418 can be communicatively coupled to a metadata management service 2452 that can be communicatively coupled to public Internet 2454. Public Internet 2454 can be communicatively coupled to the NAT gateway 2438 of the control plane VCN 2416 and of the data plane VCN 2418. The service gateway 2436 of the control plane VCN 2416 and of the data plane VCN 2418 can be communicatively coupled to cloud services 2456.

In some examples, the service gateway 2436 of the control plane VCN 2416 or of the data plane VCN 2418 can make application programming interface (API) calls to cloud services 2456 without going through public Internet 2454. The API calls to cloud services 2456 from the service gateway 2436 can be one-way: the service gateway 2436 can make API calls to cloud services 2456, and cloud services 2456 can send requested data to the service gateway 2436. But, cloud services 2456 may not initiate API calls to the service gateway 2436.

In some examples, the secure host tenancy 2404 can be directly connected to the service tenancy 2419, which may be otherwise isolated. The secure host subnet 2408 can communicate with the SSH subnet 2414 through an LPG 2410 that may enable two-way communication over an otherwise isolated system. Connecting the secure host subnet 2408 to the SSH subnet 2414 may give the secure host subnet 2408 access to other entities within the service tenancy 2419.

The control plane VCN 2416 may allow users of the service tenancy 2419 to set up or otherwise provision desired resources. Desired resources provisioned in the control plane VCN 2416 may be deployed or otherwise used in the data plane VCN 2418. In some examples, the control plane VCN 2416 can be isolated from the data plane VCN 2418, and the data plane mirror app tier 2440 of the control plane VCN 2416 can communicate with the data plane app tier 2446 of the data plane VCN 2418 via VNICs 2442 that can be contained in the data plane mirror app tier 2440 and the data plane app tier 2446.

In some examples, users of the system, or customers, can make requests, for example create, read, update, or delete (CRUD) operations, through public Internet 2454 that can communicate the requests to the metadata management service 2452. The metadata management service 2452 can communicate the request to the control plane VCN 2416 through the Internet gateway 2434. The request can be received by the LB subnet(s) 2422 contained in the control plane DMZ tier 2420. The LB subnet(s) 2422 may determine that the request is valid, and in response to this determination, the LB subnet(s) 2422 can transmit the request to app subnet(s) 2426 contained in the control plane app tier 2424. If the request is validated and requires a call to public Internet 2454, the call to public Internet 2454 may be transmitted to the NAT gateway 2438 that can make the call to public Internet 2454. Metadata that may be desired to be stored by the request can be stored in the DB subnet(s) 2430.

In some examples, the data plane mirror app tier 2440 can facilitate direct communication between the control plane VCN 2416 and the data plane VCN 2418. For example, changes, updates, or other suitable modifications to configuration may be desired to be applied to the resources contained in the data plane VCN 2418. Via a VNIC 2442, the control plane VCN 2416 can directly communicate with, and can thereby execute the changes, updates, or other suitable modifications to configuration to, resources contained in the data plane VCN 2418.

In some embodiments, the control plane VCN 2416 and the data plane VCN 2418 can be contained in the service tenancy 2419. In this case, the user, or the customer, of the system may not own or operate either the control plane VCN 2416 or the data plane VCN 2418. Instead, the IaaS provider may own or operate the control plane VCN 2416 and the data plane VCN 2418, both of which may be contained in the service tenancy 2419. This embodiment can enable isolation of networks that may prevent users or customers from interacting with other users,' or other customers,' resources. Also, this embodiment may allow users or customers of the system to store databases privately without needing to rely on public Internet 2454, which may not have a desired level of threat prevention, for storage.

In other embodiments, the LB subnet(s) 2422 contained in the control plane VCN 2416 can be configured to receive a signal from the service gateway 2436. In this embodiment, the control plane VCN 2416 and the data plane VCN 2418 may be configured to be called by a customer of the IaaS provider without calling public Internet 2454. Customers of the IaaS provider may desire this embodiment since database(s) that the customers use may be controlled by the IaaS provider and may be stored on the service tenancy 2419, which may be isolated from public Internet 2454.

FIG. 25 is a block diagram 2500 illustrating another example pattern of an IaaS architecture, according to at least one embodiment. Service operators 2502 (e.g., service operators 2402 of FIG. 24) can be communicatively coupled to a secure host tenancy 2504 (e.g., the secure host tenancy 2404 of FIG. 24) that can include a virtual cloud network (VCN) 2506 (e.g., the VCN 2406 of FIG. 24) and a secure host subnet 2508 (e.g., the secure host subnet 2408 of FIG. 24). The VCN 2506 can include a local peering gateway (LPG) 2510 (e.g., the LPG 2410 of FIG. 24) that can be communicatively coupled to a secure shell (SSH) VCN 2512 (e.g., the SSH VCN 2412 of FIG. 24) via an LPG 2410 contained in the SSH VCN 2512. The SSH VCN 2512 can include an SSH subnet 2514 (e.g., the SSH subnet 2414 of FIG. 24), and the SSH VCN 2512 can be communicatively coupled to a control plane VCN 2516 (e.g., the control plane VCN 2416 of FIG. 24) via an LPG 2510 contained in the control plane VCN 2516. The control plane VCN 2516 can be contained in a service tenancy 2519 (e.g., the service tenancy 2419 of FIG. 24), and the data plane VCN 2518 (e.g., the data plane VCN 2418 of FIG. 24) can be contained in a customer tenancy 2521 that may be owned or operated by users, or customers, of the system.

The control plane VCN 2516 can include a control plane DMZ tier 2520 (e.g., the control plane DMZ tier 2420 of FIG. 24) that can include LB subnet(s) 2522 (e.g., LB subnet(s) 2422 of FIG. 24), a control plane app tier 2524 (e.g., the control plane app tier 2424 of FIG. 24) that can include app subnet(s) 2526 (e.g., app subnet(s) 2426 of FIG. 24), a control plane data tier 2528 (e.g., the control plane data tier 2428 of FIG. 24) that can include database (DB) subnet(s) 2530 (e.g., similar to DB subnet(s) 2430 of FIG. 24). The LB subnet(s) 2522 contained in the control plane DMZ tier 2520 can be communicatively coupled to the app subnet(s) 2526 contained in the control plane app tier 2524 and an Internet gateway 2534 (e.g., the Internet gateway 2434 of FIG. 24) that can be contained in the control plane VCN 2516, and the app subnet(s) 2526 can be communicatively coupled to the DB subnet(s) 2530 contained in the control plane data tier 2528 and a service gateway 2536 (e.g., the service gateway 2436 of FIG. 24) and a network address translation (NAT) gateway 2538 (e.g., the NAT gateway 2438 of FIG. 24). The control plane VCN 2516 can include the service gateway 2536 and the NAT gateway 2538.

The control plane VCN 2516 can include a data plane mirror app tier 2540 (e.g., the data plane mirror app tier 2440 of FIG. 24) that can include app subnet(s) 2526. The app subnet(s) 2526 contained in the data plane mirror app tier 2540 can include a virtual network interface controller (VNIC) 2542 (e.g., the VNIC of 2442) that can execute a compute instance 2544 (e.g., similar to the compute instance 2444 of FIG. 24). The compute instance 2544 can facilitate communication between the app subnet(s) 2526 of the data plane mirror app tier 2540 and the app subnet(s) 2526 that can be contained in a data plane app tier 2546 (e.g., the data plane app tier 2446 of FIG. 24) via the VNIC 2542 contained in the data plane mirror app tier 2540 and the VNIC 2542 contained in the data plane app tier 2546.

The Internet gateway 2534 contained in the control plane VCN 2516 can be communicatively coupled to a metadata management service 2552 (e.g., the metadata management service 2452 of FIG. 24) that can be communicatively coupled to public Internet 2554 (e.g., public Internet 2454 of FIG. 24). Public Internet 2554 can be communicatively coupled to the NAT gateway 2538 contained in the control plane VCN 2516. The service gateway 2536 contained in the control plane VCN 2516 can be communicatively coupled to cloud services 2556 (e.g., cloud services 2456 of FIG. 24).

In some examples, the data plane VCN 2518 can be contained in the customer tenancy 2521. In this case, the IaaS provider may provide the control plane VCN 2516 for each customer, and the IaaS provider may, for each customer, set up a unique compute instance 2544 that is contained in the service tenancy 2519. Each compute instance 2544 may allow communication between the control plane VCN 2516, contained in the service tenancy 2519, and the data plane VCN 2518 that is contained in the customer tenancy 2521. The compute instance 2544 may allow resources, that are provisioned in the control plane VCN 2516 that is contained in the service tenancy 2519, to be deployed or otherwise used in the data plane VCN 2518 that is contained in the customer tenancy 2521.

In other examples, the customer of the IaaS provider may have databases that live in the customer tenancy 2521. In this example, the control plane VCN 2516 can include the data plane mirror app tier 2540 that can include app subnet(s) 2526. The data plane mirror app tier 2540 can reside in the data plane VCN 2518, but the data plane mirror app tier 2540 may not live in the data plane VCN 2518. That is, the data plane mirror app tier 2540 may have access to the customer tenancy 2521, but the data plane mirror app tier 2540 may not exist in the data plane VCN 2518 or be owned or operated by the customer of the IaaS provider. The data plane mirror app tier 2540 may be configured to make calls to the data plane VCN 2518 but may not be configured to make calls to any entity contained in the control plane VCN 2516. The customer may desire to deploy or otherwise use resources in the data plane VCN 2518 that are provisioned in the control plane VCN 2516, and the data plane mirror app tier 2540 can facilitate the desired deployment, or other usage of resources, of the customer.

In some embodiments, the customer of the IaaS provider can apply filters to the data plane VCN 2518. In this embodiment, the customer can determine what the data plane VCN 2518 can access, and the customer may restrict access to public Internet 2554 from the data plane VCN 2518. The IaaS provider may not be able to apply filters or otherwise control access of the data plane VCN 2518 to any outside networks or databases. Applying filters and controls by the customer onto the data plane VCN 2518, contained in the customer tenancy 2521, can help isolate the data plane VCN 2518 from other customers and from public Internet 2554.

In some embodiments, cloud services 2556 can be called by the service gateway 2536 to access services that may not exist on public Internet 2554, on the control plane VCN 2516, or on the data plane VCN 2518. The connection between cloud services 2556 and the control plane VCN 2516 or the data plane VCN 2518 may not be live or continuous. Cloud services 2556 may exist on a different network owned or operated by the IaaS provider. Cloud services 2556 may be configured to receive calls from the service gateway 2536 and may be configured to not receive calls from public Internet 2554. Some cloud services 2556 may be isolated from other cloud services 2556, and the control plane VCN 2516 may be isolated from cloud services 2556 that may not be in the same region as the control plane VCN 2516. For example, the control plane VCN 2516 may be located in "Region 1," and cloud service "Deployment 24," may be located in Region 1 and in "Region 2." If a call to Deployment 24 is made by the service gateway 2536 contained in the control plane VCN 2516 located in Region 1, the call may be transmitted to Deployment 24 in Region 1. In this example, the control plane VCN 2516, or Deployment 24 in Region 1, may not be communicatively coupled to, or otherwise in communication with, Deployment 24 in Region 2.

FIG. 26 is a block diagram 2600 illustrating another example pattern of an IaaS architecture, according to at least one embodiment. Service operators 2602 (e.g., service operators 2402 of FIG. 24) can be communicatively coupled to a secure host tenancy 2604 (e.g., the secure host tenancy 2404 of FIG. 24) that can include a virtual cloud network (VCN) 2606 (e.g., the VCN 2406 of FIG. 24) and a secure host subnet 2608 (e.g., the secure host subnet 2408 of FIG. 24). The VCN 2606 can include an LPG 2610 (e.g., the LPG 2410 of FIG. 24) that can be communicatively coupled to an SSH VCN 2612 (e.g., the SSH VCN 2412 of FIG. 24) via an LPG 2610 contained in the SSH VCN 2612. The SSH VCN 2612 can include an SSH subnet 2614 (e.g., the SSH subnet 2414 of FIG. 24), and the SSH VCN 2612 can be communicatively coupled to a control plane VCN 2616 (e.g., the control plane VCN 2416 of FIG. 24) via an LPG 2610 contained in the control plane VCN 2616 and to a data plane VCN 2618 (e.g., the data plane 2418 of FIG. 24) via an LPG 2610 contained in the data plane VCN 2618. The control plane VCN 2616 and the data plane VCN 2618 can be contained in a service tenancy 2619 (e.g., the service tenancy 2419 of FIG. 24).

The control plane VCN 2616 can include a control plane DMZ tier 2620 (e.g., the control plane DMZ tier 2420 of FIG. 24) that can include load balancer (LB) subnet(s) 2622 (e.g., LB subnet(s) 2422 of FIG. 24), a control plane app tier 2624 (e.g., the control plane app tier 2424 of FIG. 24) that can include app subnet(s) 2626 (e.g., similar to app subnet(s) 2426 of FIG. 24), a control plane data tier 2628 (e.g., the control plane data tier 2428 of FIG. 24) that can include DB subnet(s) 2630. The LB subnet(s) 2622 contained in the control plane DMZ tier 2620 can be communicatively coupled to the app subnet(s) 2626 contained in the control plane app tier 2624 and to an Internet gateway 2634 (e.g., the Internet gateway 2434 of FIG. 24) that can be contained in the control plane VCN 2616, and the app subnet(s) 2626 can be communicatively coupled to the DB subnet(s) 2630 contained in the control plane data tier 2628 and to a service gateway 2636 (e.g., the service gateway of FIG. 24) and a network address translation (NAT) gateway 2638 (e.g., the NAT gateway 2438 of FIG. 24). The control plane VCN 2616 can include the service gateway 2636 and the NAT gateway 2638.

The data plane VCN 2618 can include a data plane app tier 2646 (e.g., the data plane app tier 2446 of FIG. 24), a data plane DMZ tier 2648 (e.g., the data plane DMZ tier 2448 of FIG. 24), and a data plane data tier 2650 (e.g., the data plane data tier 2450 of FIG. 24). The data plane DMZ tier 2648 can include LB subnet(s) 2622 that can be communicatively coupled to trusted app subnet(s) 2660 and untrusted app subnet(s) 2662 of the data plane app tier 2646 and the Internet gateway 2634 contained in the data plane VCN 2618. The trusted app subnet(s) 2660 can be communicatively coupled to the service gateway 2636 contained in the data plane VCN 2618, the NAT gateway 2638 contained in the data plane VCN 2618, and DB subnet(s) 2630 contained in the data plane data tier 2650. The untrusted app subnet(s) 2662 can be communicatively coupled to the service gateway 2636 contained in the data plane VCN 2618 and DB subnet(s) 2630 contained in the data plane data tier 2650. The data plane data tier 2650 can include DB subnet(s) 2630 that can be communicatively coupled to the service gateway 2636 contained in the data plane VCN 2618.

The untrusted app subnet(s) 2662 can include one or more primary VNICs 2664(1)-(N) that can be communicatively coupled to tenant virtual machines (VMs) 2666(1)-(N). Each tenant VM 2666(1)-(N) can be communicatively coupled to a respective app subnet 2667(1)-(N) that can be contained in respective container egress VCNs 2668(1)-(N) that can be contained in respective customer tenancies 2670(1)-(N). Respective secondary VNICs 2672(1)-(N) can facilitate communication between the untrusted app subnet(s) 2662 contained in the data plane VCN 2618 and the app subnet contained in the container egress VCNs 2668(1)-(N). Each container egress VCNs 2668(1)-(N) can include a NAT gateway 2638 that can be communicatively coupled to public Internet 2654 (e.g., public Internet 2454 of FIG. 24).

The Internet gateway 2634 contained in the control plane VCN 2616 and contained in the data plane VCN 2618 can be communicatively coupled to a metadata management service 2652 (e.g., the metadata management system 2452 of FIG. 24) that can be communicatively coupled to public Internet 2654. Public Internet 2654 can be communicatively coupled to the NAT gateway 2638 contained in the control plane VCN 2616 and contained in the data plane VCN 2618. The service gateway 2636 contained in the control plane VCN 2616 and contained in the data plane VCN 2618 can be communicatively coupled to cloud services 2656.

In some embodiments, the data plane VCN 2618 can be integrated with customer tenancies 2670. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane app tier 2646. Code to run the function may be executed in the VMs 2666(1)-(N), and the code may not be configured to run anywhere else on the data plane VCN 2618. Each VM 2666(1)-(N) may be connected to one customer tenancy 2670. Respective containers 2671(1)-(N) contained in the VMs 2666(1)-(N) may be configured to run the code. In this case, there can be a dual isolation (e.g., the containers 2671(1)-(N) running code, where the containers 2671(1)-(N) may be contained in at least the VM 2666(1)-(N) that are contained in the untrusted app subnet(s) 2662), which may help prevent incorrect or otherwise undesirable code from damaging the network of the IaaS provider or from damaging a network of a different customer. The containers 2671(1)-(N) may be communicatively coupled to the customer tenancy 2670 and may be configured to transmit or receive data from the customer tenancy 2670. The containers 2671(1)-(N) may not be configured to transmit or receive data from any other entity in the data plane VCN 2618. Upon completion of running the code, the IaaS provider may kill or otherwise dispose of the containers 2671(1)-(N).

In some embodiments, the trusted app subnet(s) 2660 may run code that may be owned or operated by the IaaS provider. In this embodiment, the trusted app subnet(s) 2660 may be communicatively coupled to the DB subnet(s) 2630 and be configured to execute CRUD operations in the DB subnet(s) 2630. The untrusted app subnet(s) 2662 may be communicatively coupled to the DB subnet(s) 2630, but in this embodiment, the untrusted app subnet(s) may be configured to execute read operations in the DB subnet(s) 2630. The containers 2671(1)-(N) that can be contained in the VM 2666(1)-(N) of each customer and that may run code from the customer may not be communicatively coupled with the DB subnet(s) 2630.

In other embodiments, the control plane VCN 2616 and the data plane VCN 2618 may not be directly communicatively coupled. In this embodiment, there may be no direct communication between the control plane VCN 2616 and the data plane VCN 2618. However, communication can occur indirectly through at least one method. An LPG 2610 may be established by the IaaS provider that can facilitate communication between the control plane VCN 2616 and the data plane VCN 2618. In another example, the control plane VCN 2616 or the data plane VCN 2618 can make a call to cloud services 2656 via the service gateway 2636. For example, a call to cloud services 2656 from the control plane VCN 2616 can include a request for a service that can communicate with the data plane VCN 2618.

FIG. 27 is a block diagram 2700 illustrating another example pattern of an IaaS architecture, according to at least one embodiment. Service operators 2702 (e.g., service operators 2402 of FIG. 24) can be communicatively coupled to a secure host tenancy 2704 (e.g., the secure host tenancy 2404 of FIG. 24) that can include a virtual cloud network (VCN) 2706 (e.g., the VCN 2406 of FIG. 24) and a secure host subnet 2708 (e.g., the secure host subnet 2408 of FIG. 24). The VCN 2706 can include an LPG 2710 (e.g., the LPG 2410 of FIG. 24) that can be communicatively coupled to an SSH VCN 2712 (e.g., the SSH VCN 2412 of FIG. 24) via an LPG 2710 contained in the SSH VCN 2712. The SSH VCN 2712 can include an SSH subnet 2714 (e.g., the SSH subnet 2414 of FIG. 24), and the SSH VCN 2712 can be communicatively coupled to a control plane VCN 2716 (e.g., the control plane VCN 2416 of FIG. 24) via an LPG 2710 contained in the control plane VCN 2716 and to a data plane VCN 2718 (e.g., the data plane 2418 of FIG. 24) via an LPG 2710 contained in the data plane VCN 2718. The control plane VCN 2716 and the data plane VCN 2718 can be contained in a service tenancy 2719 (e.g., the service tenancy 2419 of FIG. 24).

The control plane VCN 2716 can include a control plane DMZ tier 2720 (e.g., the control plane DMZ tier 2420 of FIG. 24) that can include LB subnet(s) 2722 (e.g., LB subnet(s) 2422 of FIG. 24), a control plane app tier 2724 (e.g., the control plane app tier 2424 of FIG. 24) that can include app subnet(s) 2726 (e.g., app subnet(s) 2426 of FIG. 24), a control plane data tier 2728 (e.g., the control plane data tier 2428 of FIG. 24) that can include DB subnet(s) 2730 (e.g., DB subnet(s) 2630 of FIG. 26). The LB subnet(s) 2722 contained in the control plane DMZ tier 2720 can be communicatively coupled to the app subnet(s) 2726 contained in the control plane app tier 2724 and to an Internet gateway 2734 (e.g., the Internet gateway 2434 of FIG. 24) that can be contained in the control plane VCN 2716, and the app subnet(s) 2726 can be communicatively coupled to the DB subnet(s) 2730 contained in the control plane data tier 2728 and to a service gateway 2736 (e.g., the service gateway of FIG. 24) and a network address translation (NAT) gateway 2738 (e.g., the NAT gateway 2438 of FIG. 24). The control plane VCN 2716 can include the service gateway 2736 and the NAT gateway 2738.

The data plane VCN 2718 can include a data plane app tier 2746 (e.g., the data plane app tier 2446 of FIG. 24), a data plane DMZ tier 2748 (e.g., the data plane DMZ tier 2448 of FIG. 24), and a data plane data tier 2750 (e.g., the data plane data tier 2450 of FIG. 24). The data plane DMZ tier 2748 can include LB subnet(s) 2722 that can be communicatively coupled to trusted app subnet(s) 2760 (e.g., trusted app subnet(s) 2660 of FIG. 26) and untrusted app subnet(s) 2762 (e.g., untrusted app subnet(s) 2662 of FIG. 26) of the data plane app tier 2746 and the Internet gateway 2734 contained in the data plane VCN 2718. The trusted app subnet(s) 2760 can be communicatively coupled to the service gateway 2736 contained in the data plane VCN 2718, the NAT gateway 2738 contained in the data plane VCN 2718, and DB subnet(s) 2730 contained in the data plane data tier 2750. The untrusted app subnet(s) 2762 can be communicatively coupled to the service gateway 2736 contained in the data plane VCN 2718 and DB subnet(s) 2730 contained in the data plane data tier 2750. The data plane data tier 2750 can include DB subnet(s) 2730 that can be communicatively coupled to the service gateway 2736 contained in the data plane VCN 2718.

The untrusted app subnet(s) 2762 can include primary VNICs 2764(1)-(N) that can be communicatively coupled to tenant virtual machines (VMs) 2766(1)-(N) residing within the untrusted app subnet(s) 2762. Each tenant VM 2766(1)-(N) can run code in a respective container 2767(1)-(N), and be communicatively coupled to an app subnet 2726 that can be contained in a data plane app tier 2746 that can be contained in a container egress VCN 2768. Respective secondary VNICs 2772(1)-(N) can facilitate communication between the untrusted app subnet(s) 2762 contained in the data plane VCN 2718 and the app subnet contained in the container egress VCN 2768. The container egress VCN can include a NAT gateway 2738 that can be communicatively coupled to public Internet 2754 (e.g., public Internet 2454 of FIG. 24).

The Internet gateway 2734 contained in the control plane VCN 2716 and contained in the data plane VCN 2718 can be communicatively coupled to a metadata management service 2752 (e.g., the metadata management system 2452 of FIG. 24) that can be communicatively coupled to public Internet 2754. Public Internet 2754 can be communicatively coupled to the NAT gateway 2738 contained in the control plane VCN 2716 and contained in the data plane VCN 2718. The service gateway 2736 contained in the control plane VCN 2716 and contained in the data plane VCN 2718 can be communicatively coupled to cloud services 2756.

In some examples, the pattern illustrated by the architecture of block diagram 2700 of FIG. 27 may be considered an exception to the pattern illustrated by the architecture of block diagram 2600 of FIG. 26 and may be desirable for a customer of the IaaS provider if the IaaS provider cannot directly communicate with the customer (e.g., a disconnected region). The respective containers 2767(1)-(N) that are contained in the VMs 2766(1)-(N) for each customer can be accessed in real-time by the customer. The containers 2767(1)-(N) may be configured to make calls to respective secondary VNICs 2772(1)-(N) contained in app subnet(s) 2726 of the data plane app tier 2746 that can be contained in the container egress VCN 2768. The secondary VNICs 2772(1)-(N) can transmit the calls to the NAT gateway 2738 that may transmit the calls to public Internet 2754. In this example, the containers 2767(1)-(N) that can be accessed in real-time by the customer can be isolated from the control plane VCN 2716 and can be isolated from other entities contained in the data plane VCN 2718. The containers 2767(1)-(N) may also be isolated from resources from other customers.

In other examples, the customer can use the containers 2767(1)-(N) to call cloud services 2756. In this example, the customer may run code in the containers 2767(1)-(N) that requests a service from cloud services 2756. The containers 2767(1)-(N) can transmit this request to the secondary VNICs 2772(1)-(N) that can transmit the request to the NAT gateway that can transmit the request to public Internet 2754. Public Internet 2754 can transmit the request to LB subnet(s) 2722 contained in the control plane VCN 2716 via the Internet gateway 2734. In response to determining the request is valid, the LB subnet(s) can transmit the request to app subnet(s) 2726 that can transmit the request to cloud services 2756 via the service gateway 2736.

It should be appreciated that IaaS architectures 2400, 2500, 2600, 2700 depicted in the figures may have other components than those depicted. Further, the embodiments shown in the figures are only some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

Figure 28:
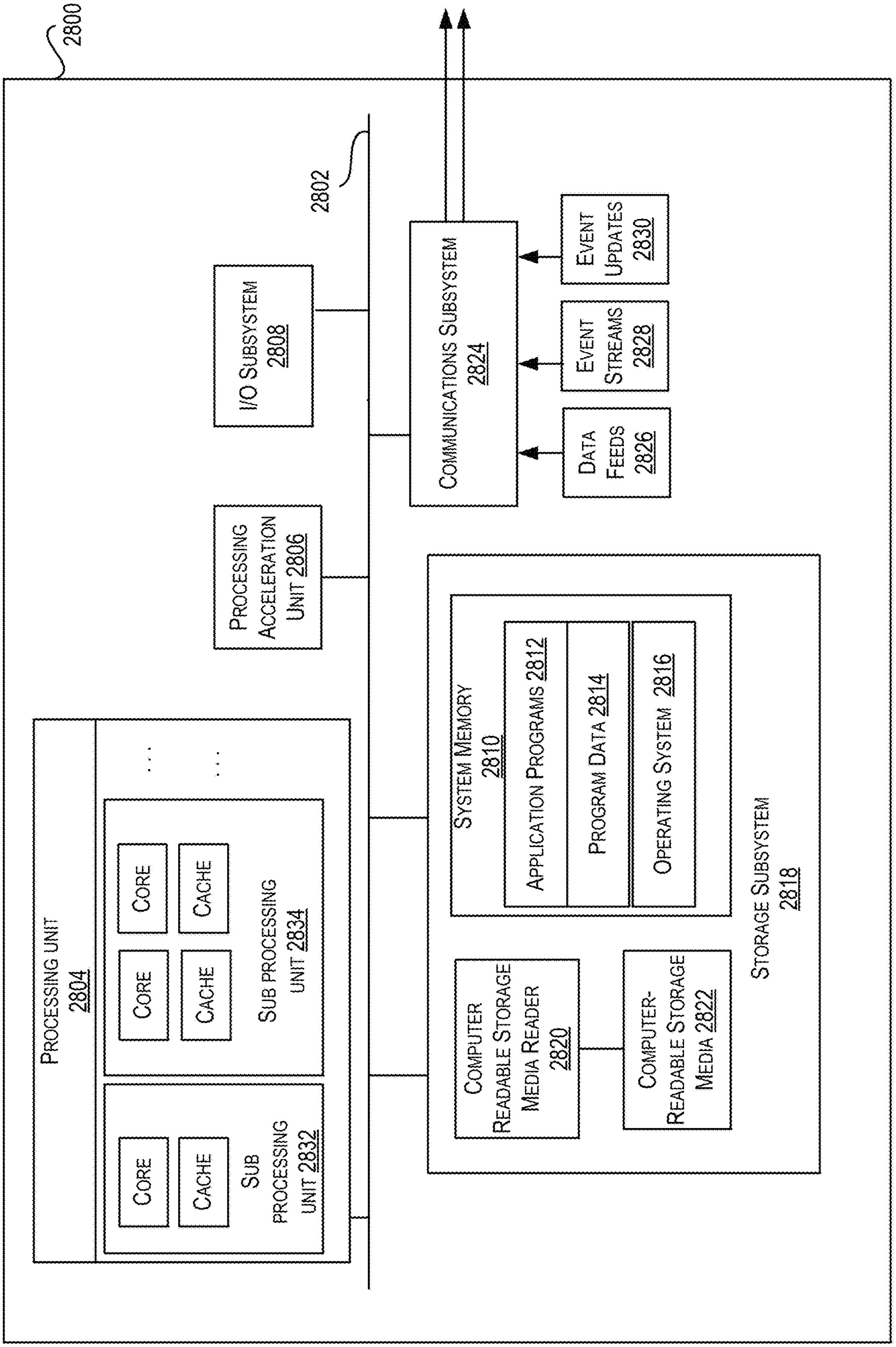
FIG. 28 is a block diagram illustrating an example computer system, according to at least one embodiment.

FIG. 28 illustrates an example computer system 2800, in which various embodiments may be implemented. The system 2800 may be used to implement any of the computer systems described above. As shown in the figure, computer system 2800 includes a processing unit 2804 that communicates with a number of peripheral subsystems via a bus subsystem 2802. These peripheral subsystems may include a processing acceleration unit 2806, an I/O subsystem 2808, a storage subsystem 2818 and a communications subsystem 2824. Storage subsystem 2818 includes tangible computer-readable storage media 2822 and a system memory 2810.

Bus subsystem 2802 provides a mechanism for letting the various components and subsystems of computer system 2800 communicate with each other as intended. Although bus subsystem 2802 is shown schematically as a single bus, alternative embodiments of the bus subsystem may utilize multiple buses. Bus subsystem 2802 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 2804, which can be implemented as one or more integrated circuits (e.g., a conventional microprocessor or microcontroller), controls the operation of computer system 2800. One or more processors may be included in processing unit 2804. These processors may include single core or multicore processors. In certain embodiments, processing unit 2804 may be implemented as one or more independent processing units 2832 and/or 2834 with single or multicore processors included in each processing unit. In other embodiments, processing unit 2804 may also be implemented as a quad-core processing unit formed by integrating two dual-core processors into a single chip.

In various embodiments, processing unit 2804 can execute a variety of programs in response to program code and can maintain multiple concurrently executing programs or processes. At any given time, some or all of the program code to be executed can be resident in processor(s) 2804 and/or in storage subsystem 2818. Through suitable programming, processor(s) 2804 can provide various functionalities described above. Computer system 2800 may additionally include a processing acceleration unit 2806, which can include a digital signal processor (DSP), a special-purpose processor, and/or the like.

I/O subsystem 2808 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 2800 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 2800 may comprise a storage subsystem 2818 that provides a tangible non-transitory computer-readable storage medium for storing software and data constructs that provide the functionality of the embodiments described in this disclosure. The software can include programs, code modules, instructions, scripts, etc., that when executed by one or more cores or processors of processing unit 2804 provide the functionality described above. Storage subsystem 2818 may also provide a repository for storing data used in accordance with the present disclosure.

As depicted in the example in FIG. 28, storage subsystem 2818 can include various components including a system memory 2810, computer-readable storage media 2822, and a computer readable storage media reader 2820. System memory 2810 may store program instructions that are loadable and executable by processing unit 2804. System memory 2810 may also store data that is used during the execution of the instructions and/or data that is generated during the execution of the program instructions. Various different kinds of programs may be loaded into system memory 2810 including but not limited to client applications, Web browsers, mid-tier applications, relational database management systems (RDBMS), virtual machines, containers, etc.

System memory 2810 may also store an operating system 2816. Examples of operating system 2816 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, and Palm® OS operating systems. In certain implementations where computer system 2800 executes one or more virtual machines, the virtual machines along with their guest operating systems (GOSs) may be loaded into system memory 2810 and executed by one or more processors or cores of processing unit 2804.

System memory 2810 can come in different configurations depending upon the type of computer system 2800. For example, system memory 2810 may be volatile memory (such as random access memory (RAM)) and/or non-volatile memory (such as read-only memory (ROM), flash memory, etc.) Different types of RAM configurations may be provided including a static random access memory (SRAM), a dynamic random access memory (DRAM), and others. In some implementations, system memory 2810 may include a basic input/output system (BIOS) containing basic routines that help to transfer information between elements within computer system 2800, such as during start-up.

Computer-readable storage media 2822 may represent remote, local, fixed, and/or removable storage devices plus storage media for temporarily and/or more permanently containing, storing, computer-readable information for use by computer system 2800 including instructions executable by processing unit 2804 of computer system 2800.

Computer-readable storage media 2822 can include any appropriate media known or used in the art, including storage media and communication media, such as but not limited to, volatile and non-volatile, removable, and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media.

By way of example, computer-readable storage media 2822 may include a hard disk drive that reads from or writes to non-removable, nonvolatile magnetic media, a magnetic disk drive that reads from or writes to a removable, nonvolatile magnetic disk, and an optical disk drive that reads from or writes to a removable, nonvolatile optical disk such as a CD ROM, DVD, and Blu-Ray® disk, or other optical media. Computer-readable storage media 2822 may include, but is not limited to, Zip® drives, flash memory cards, universal serial bus (USB) flash drives, secure digital (SD) cards, DVD disks, digital video tape, and the like. Computer-readable storage media 2822 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 2800.

Machine-readable instructions executable by one or more processors or cores of processing unit 2804 may be stored on a non-transitory computer-readable storage medium. Anon-transitory computer-readable storage medium can include physically tangible memory or storage devices that include volatile memory storage devices and/or non-volatile storage devices. Examples of non-transitory computer-readable storage medium include magnetic storage media (e.g., disk or tapes), optical storage media (e.g., DVDs, CDs), various types of RAM, ROM, or flash memory, hard drives, floppy drives, detachable memory drives (e.g., USB drives), or other type of storage device.

Communications subsystem 2824 provides an interface to other computer systems and networks. Communications subsystem 2824 serves as an interface for receiving data from and transmitting data to other systems from computer system 2800. For example, communications subsystem 2824 may enable computer system 2800 to connect to one or more devices via the Internet. In some embodiments communications subsystem 2824 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof)), global positioning system (GPS) receiver components, and/or other components. In some embodiments communications subsystem 2824 can provide wired network connectivity (e.g., Ethernet) in addition to or instead of a wireless interface.

In some embodiments, communications subsystem 2824 may also receive input communication in the form of structured and/or unstructured data feeds 2826, event streams 2828, event updates 2830, and the like on behalf of one or more users who may use computer system 2800.

By way of example, communications subsystem 2824 may be configured to receive data feeds 2826 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 2824 may also be configured to receive data in the form of continuous data streams, which may include event streams 2828 of real-time events and/or event updates 2830, that may be continuous or unbounded in nature with no explicit end. Examples of applications that generate continuous data may include, for example, sensor data applications, financial tickers, network performance measuring tools (e.g., network monitoring and traffic management applications), clickstream analysis tools, automobile traffic monitoring, and the like.

Communications subsystem 2824 may also be configured to output the structured and/or unstructured data feeds 2826, event streams 2828, event updates 2830, and the like to one or more databases that may be in communication with one or more streaming data source computers coupled to computer system 2800.

Computer system 2800 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 2800 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Although specific embodiments have been described, various modifications, alterations, alternative constructions, and equivalents are also encompassed within the scope of the disclosure. Embodiments are not restricted to operation within certain specific data processing environments, but are free to operate within a plurality of data processing environments. Additionally, although embodiments have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments have been described using a particular combination of hardware and software, it should be recognized that other combinations of hardware and software are also within the scope of the present disclosure. Embodiments may be implemented only in hardware, or only in software, or using combinations thereof. The various processes described herein can be implemented on the same processor or different processors in any combination. Accordingly, where components or services are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments, and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known for carrying out the disclosure. Variations of those preferred embodiments may become apparent to those of ordinary skill in the art upon reading the foregoing description. Those of ordinary skill should be able to employ such variations as appropriate and the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A method, comprising:

creating, by a computing system, a first data structure storing change-tracking information used by one or more replications performed by a file system;

controlling, by a first sub-system of the computing system, a first change-tracking mode for tracking changes made to a first set of snapshots in a file system;

controlling, by a second sub-system of the computing system, a second change-tracking mode for tracking changes made to a second set of snapshots in the file system, the first change-tracking mode and the second change-tracking mode configured to effectuate storing change-tracking information in the first data structure;

identifying, by the computing system, a common snapshot generation time between the first set of snapshots and the second set of snapshots, the common snapshot generation time being a particular snapshot generation time in which both the first change-tracking mode and the second change-tracking mode are in a same mode; and creating, by the computing system, a central change-tracking record comprising a common change-tracking mode field and a common snapshot generation time field, wherein identifying the common snapshot generation time comprises:

verifying, by the computing system, that the first sub-system and the second sub-system have reached the common snapshot generation time.

2. The method of claim 1, wherein the first change-tracking mode enables change-tracking.

3. The method of claim 2, wherein the first sub-system of the file system generates a first portion of the change-tracking information being stored in the first data structure in accordance with the first change-tracking mode being enabled, and 5 wherein the second sub-system of the file system generates a second portion of the change-tracking information being stored in the first data structure in accordance with the second change-tracking mode being enabled.

4. The method of claim 1, wherein change-tracking information used by the one or more replications performed by the file system further comprises:

accessing the change-tracking information stored in the first data structure to generate deltas based on the first set of snapshots for a first replication of the one or more replications; and accessing the change-tracking information stored in the first data structure to generate deltas based on the second set of snapshots for a second replication of the one or more replications, wherein the first replication and the second replication are performed in parallel.

5. The method of claim 4, further comprising searching for committed changes to the file system in a second data structure based at least in part on the change-tracking information stored in the first data structure.

6. The method of claim 1, wherein identifying the common snapshot generation time further comprises:

synchronizing snapshot generation between the first sub-system and the second sub-system, such that both the first sub-system and the second sub-system generate snapshots at a same pace; and updating a value of the common snapshot generation time field in the central change-tracking record atomically to a latest snapshot generation time by either the first sub-system or the second sub-system.

7. The method of claim 6, wherein the mode in the common change-tracking mode field is set by the file system, the first sub-system or the second sub-system.

8. The method of claim 6, further comprising performing the one or more replications at the common snapshot generation time using the mode in the common change-tracking mode field after verifying both the first sub-system and the second sub-system have reached the common snapshot generation time.

9. The method of claim 1, wherein the change-tracking information stored in the first data structure comprises information indicating changes not yet committed to the file system.

10. A non-transitory computer-readable medium storing computer-executable instructions that, when executed by one or more processors of a computing system, cause the one or more processors to perform operations comprising:

creating, by a computing system, a first data structure storing change-tracking information used by one or more replications performed by a file system;

controlling, by a first sub-system of the computing system, a first change-tracking mode for tracking changes made to a first set of snapshots in a file system;

controlling, by a second sub-system of the computing system, a second change-tracking mode for tracking changes made to a second set of snapshots in the file system, the first change-tracking mode and the second change-tracking mode configured to effectuate storing change-tracking information in the first data structure;

identifying, by the computing system, a common snapshot generation time between the first set of snapshots and the second set of snapshots, the common snapshot generation time being a particular snapshot generation time in which both the first change-tracking mode and the second change-tracking mode are in a same mode; and creating, by the computing system, a central change-tracking record comprising a common change-tracking mode field and a common snapshot generation time field, wherein identifying the common snapshot generation time comprises:

verifying, by the computing system, that the first sub-system and the second sub-system have reached the common snapshot generation time.

11. The non-transitory computer-readable medium of claim 10, wherein the first change-tracking mode enables change-tracking, wherein the first sub-system of the file system generates a first portion of the change-tracking information being stored in the first data structure in accordance with the first change-tracking mode being enabled, and wherein the second sub-system of the file system generates a second portion of the change-tracking information being stored in the first data structure in accordance with the second change-tracking mode being enabled.

12. The non-transitory computer-readable medium of claim 10, wherein change-tracking information used by the one or more replications performed by the file system further comprises:

accessing the change-tracking information stored in the first data structure to generate deltas based on the first set of snapshots for a first replication of the one or more replications; and accessing the change-tracking information stored in the first data structure to generate deltas based on the second set of snapshots for a second replication of the one or more replications, wherein the first replication and the second replication are performed in parallel.

13. The non-transitory computer-readable medium of claim 12, wherein the operations further comprise searching for committed changes to the file system in a second data structure based at least in part on the change-tracking information stored in the first data structure.

14. The non-transitory computer-readable medium of claim 10, wherein identifying the common snapshot generation time further comprises:

synchronizing snapshot generation between the first sub-system and the second sub-system, such that both the first sub-system and the second sub-system generate snapshots at a same pace; and updating value of the common snapshot generation time field in the central change-tracking record atomically to a latest snapshot generation time by either the first sub-system or the second sub-system.

15. The non-transitory computer-readable medium of claim 14, wherein the operations further comprise performing the one or more replications at the common snapshot generation time using the mode in the common change-tracking mode field after verifying both the first sub-system and the second sub-system have reached the common snapshot generation time.

16. A computing system, comprising:

one or more processors; and one or more non-transitory computer readable media storing computer-executable instructions that, when executed by the one or more processors of the computing system, cause the computing system to:

create a first data structure storing change-tracking information used by one or more replications performed by a file system;

control, by a first sub-system, a first change-tracking mode for tracking changes made to a first set of snapshots in a file system;

control, by a second sub-system, a second change-tracking mode for tracking changes made to a second set of snapshots in the file system, the first change-tracking mode and the second change-tracking mode configured to effectuate storing change-tracking information in the first data structure;

identify a common snapshot generation time between the first set of snapshots and the second set of snapshots, the common snapshot generation time being a particular snapshot generation time in which both the first change-tracking mode and the second change-tracking mode are in a same mode; and create a central change-tracking record comprising a common change-tracking mode field and a common snapshot generation time field, wherein identifying the common snapshot generation time comprises:

verifying that the first sub-system and the second sub-system have reached the common snapshot generation time.

17. The computing system of claim 16, wherein the first change-tracking mode enables change-tracking or disabling change-tracking, wherein the first sub-system of the file system generates a first portion of the change-tracking information being stored in the first data structure in accordance with the first change-tracking mode being enabled, and wherein the second sub-system of the file system generates a second portion of the change-tracking information being stored in the first data structure in accordance with the second change-tracking mode being enabled.

18. The computing system of claim 16, wherein change-tracking information used by the one or more replications performed by the file system further comprises:

accessing the change-tracking information stored in the first data structure to generate deltas based on the first set of snapshots for a first replication of the one or more replications; and accessing the change-tracking information stored in the first data structure to generate deltas based on the second set of snapshots for a second replication of the one or more replications, wherein the first replication and the second replication are performed in parallel.

19. The computing system of claim 16, wherein identifying the common snapshot generation time further comprises:

synchronizing snapshot generation between the first sub-system and the second sub-system, such that both the first sub-system and the second sub-system generate snapshots at a same pace; and updating value of the common snapshot generation time field in the central change-tracking record atomically to a latest snapshot generation time by either the first sub-system or the second sub-system.

20. The computing system of claim 19, further comprising performing the one or more replications at value in the common snapshot generation time field using the mode in the common change-tracking mode field after verifying both the first sub-system and the second sub-system have reached the common snapshot generation time.

* * * * *